United States Patent [19]
Hayashi et al.

[11] Patent Number: 6,120,898
[45] Date of Patent: *Sep. 19, 2000

[54] HEMATITE PARTICLES AND MAGNETIC RECORDING MEDIUM USING HEMATITE PARTICLES AS NON-MAGNETIC PARTICLES FOR A NON-MAGNETIC UNDERCOAT LAYER

[75] Inventors: Kazuyuki Hayashi; Keisuke Iwasaki; Hiroko Morii; Yasuyuki Tanaka, all of Hiroshima, Japan

[73] Assignee: Toda Kogyo Corporation, Hiroshima-ken, Japan

[*] Notice: This patent is subject to a terminal disclaimer.

[21] Appl. No.: 09/004,720

[22] Filed: Jan. 8, 1998

[30] Foreign Application Priority Data

Jan. 8, 1997 [JP] Japan ..................................... 9-013459
Mar. 19, 1997 [JP] Japan ..................................... 9-085895

[51] Int. Cl.[7] ...................................................... C09C 1/24
[52] U.S. Cl. .......................... 428/402; 428/403; 428/900; 106/456; 106/459
[58] Field of Search ..................................... 428/402, 403, 428/900; 106/456, 459

[56] References Cited

U.S. PATENT DOCUMENTS 4,006,090  2/1977  Beck .
4,840,677  6/1989  Ostertag .................................. 106/456
5,750,250  5/1998  Hayashi et al. ......................... 428/328

FOREIGN PATENT DOCUMENTS 0 660 309 A1   6/1995   European Pat. Off. .
0 742 550 A2  11/1996   European Pat. Off. .

*Primary Examiner*—Stevan A. Resan
*Attorney, Agent, or Firm*—Nixon & Vanderhye

[57] ABSTRACT

The present invention relates to acicular hematite particles containing aluminum of 0.05 to 50% by weight, calculated as Al, having an average major axial diameter of not more than 0.3 μm and a pH value of the particles of not less than 8, and containing soluble sodium salts of not more than 300 ppm soluble sodium, calculated as Na, and soluble sulfates of not more than 150 ppm soluble sulfate, calculated as $SO_4$, which have an excellent dispersibility in a binder resin, and a magnetic recording medium which uses the hematite particles as non-magnetic particles for a non-magnetic undercoat layer, which has small light transmittance, smooth surface, high strength and high durability, and which is capable of suppressing the deterioration in the magnetic properties caused by a corrosion of the magnetic particles containing as a main ingredient in the magnetic recording layer.

6 Claims, No Drawings

HEMATITE PARTICLES AND MAGNETIC RECORDING MEDIUM USING HEMATITE PARTICLES AS NON-MAGNETIC PARTICLES FOR A NON-MAGNETIC UNDERCOAT LAYER

BACKGROUND OF THE INVENTION

The present invention relates to hematite particles and a magnetic recording medium using hematite particles as non-magnetic particles for a non-magnetic undercoat layer. More particularly, the present invention relates to high-density acicular hematite particles which have an excellent dispersibility in a binder resin, and a magnetic recording medium which uses the hematite particles as non-magnetic particles for a non-magnetic undercoat layer, which has small light transmittance, smooth surface, high strength and high durability, and which is capable of suppressing the deterioration in the magnetic properties caused by a corrosion of the magnetic particles containing as a main ingredient (hereinafter refer to as "magnetic iron-based metal particles") in the magnetic recording layer.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles will first be described.

The properties which magnetic particles are required to have in order to satisfy the above-described demands on a magnetic recording medium, are a high coercive force and a large saturation magnetization.

As magnetic particles suitable for high-output and high-density recording, acicular magnetic iron-based metal particles which are obtained by heat-treating acicular goethite particles or acicular hematite particles in a reducing gas are widely known.

Although acicular magnetic iron-based metal particles have a high coercive force and a large saturation magnetization, since the acicular magnetic iron-based metal particles used for a magnetic recording medium are very fine particles having a particle size of not more than 1 $\mu$m, particularly, 0.01 to 0.3 $\mu$m, such particles easily corrode, and the magnetic properties thereof are deteriorated, especially, the saturation magnetization and the coercive force are reduced.

Therefore, in order to maintain the characteristics of a magnetic recording medium which uses magnetic iron-based metal particles as the magnetic particles, over a long period, it is strongly demanded to suppress the corrosion of acicular magnetic iron-based metal particles as much as possible.

A reduction in the thickness of a magnetic recording layer will now be described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder,* published by Sogo Gijutsu Center Co., Ltd. (1982), ". . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, ". . . the surface roughness of a hardened magnetic layer depends on the surface roughness of the substrate (back surface roughness) so largely as to be approximately proportional, . . . , since the magnetic layer is formed on the substrate, the more smooth the surface of the substrate is, the more uniform and larger head output is obtained and the more the S/N ratio is improved."

Secondly, there has been caused a problem in the strength of a non-magnetic substrate such as a base film with a tendency of the reduction in the thickness of the non-magnetic substrate in response to the demand for a thinner magnetic layer. This fact is described, for example, on page 77 of the above-described *Development of Magnetic Materials and Technique for High Dispersion of Magnetic Powder,* ". . . Higher recording density is a large problem assigned t the present magnetic tape. This is important in order to shorten the length of the tape so as to miniaturize the size of a cassette and to enable long-time recording. For this purpose, it is necessary to reduce the thickness of a substrate . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded . . . ."

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the substrate are now in strong demand.

There is no end to a demand for a higher performance in recent magnetic recording media. Since the above-described reduction in the thickness of a magnetic recording layer and a non-magnetic substrate lowers the durability of the surface of the magnetic recording layer and the magnetic recording medium, an improvement of the durability of the surface of the magnetic recording layer and the magnetic recording medium is in strong demand.

This fact is described in Japanese Patent Application Laid-Open (KOKAI) No. 5-298679, ". . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N . . . . However, the coefficient of friction between the magnetic layer and an apparatus during the travel of the magnetic tape increases, so that there is a tendency of the magnetic layer of the magnetic recording medium being damaged or exfoliated even in a short time. Especially, in a video tape, since the magnetic recording medium travels at a high speed in contact with the video head, the ferromagnetic particles are apt to be dropped from the magnetic layer, thereby causing clogging on the magnetic head. Therefore, an improvement in the running stability of the magnetic layer of a magnetic recording medium is expected . . . ."

Various efforts have been made to improve the base for a magnetic recording layer with a demand for a thinner magnetic recording layer and a thinner non-magnetic substrate. A magnetic recording medium having at least one undercoat layer (hereinunder referred to "non-magnetic undercoat layer") comprising a binder resin and non-magnetic iron-based metal particles such as hematite particles which are dispersed therein, on a non-magnetic substrate such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), 9-22524 (1997), etc.)

For example, Japanese Patent Application Laid-Open (KOKAI) No. 5-182177 (1993) discloses a magnetic recording medium comprising: a non-magnetic substrate; a non-magnetic undercoat layer formed on the non-magnetic substrate and produced by dispersing inorganic particles in a binder resin; and a magnetic layer formed on the non-magnetic undercoat layer and produced by dispersing ferromagnetic particles in a binder resin while the non-magnetic undercoat layer is wet; wherein the magnetic layer has a thickness of not more than 1.0 μm in a dried state, the non-magnetic undercoat layer contains non-magnetic inorganic particles with surface layers coated with an inorganic oxide, the inorganic oxide coating the surfaces of the non-magnetic inorganic particles contained in the non-magnetic undercoat layer is at least one selected from the group consisting of $Al_2O_3$, $SiO_2$ and $ZrO_2$, and the amount of the inorganic oxide coating the non-magnetic inorganic particles is 1 to 21 wt % in the case of $Al_2O_3$, 0.04 to 20 wt % in the case of $SiO_2$, and 0.05 to 15 wt % in the case of $ZrO_2$, base on the total weigh of the magnetic inorganic particles.

Japanese Patent Application Laid-Open (KOKAI) No. 6-60362 (1994) discloses a non-magnetic undercoat layer for a magnetic recording medium formed on a non-magnetic substrate, comprising a coating film composition containing non-magnetic particles and a binder resin; wherein the non-magnetic particles are non-magnetic particles constituted by acicular α-$Fe_2O_3$ particles coated with an Al compound, and the non-magnetic particles constituted by acicular α-$Fe_2O_3$ particles coated with an Al compound have an average major axial diameter of 0.05 to 0.25 μm, an average minor axial diameter of 0.010 to 0.035 μm, a particle size distribution of not more than 1.40 in geometrical standard deviation, and an aspect ratio (major axial diameter/minor axial diameter) of 2 to 20.

However, the above-described non-magnetic particles are not particles which contain aluminum substantially uniformly from the central portions to the surfaces of the particles but particles which have an aluminum compound on the surfaces thereof.

A magnetic recording medium which has small light transmittance, high strength, smooth surface and higher durability, and which is capable of suppressing a corrosion of the acicular magnetic iron-based metal particles dispersed in the magnetic recording layer, with reduction of the thickness of not only the magnetic recording layer but also the non-magnetic substrate is now in the strongest demand, but no such magnetic recording medium which sufficiently satisfies these conditions have ever been obtained.

The above-described magnetic recording media composed of a non-magnetic substrate and a non-magnetic undercoat layer produced by dispersing non-magnetic particles in a binder resin and formed on a non-magnetic substrate, have a small light transmittance, a smooth surface and a high strength, but the durability thereof is inconveniently poor.

This fact is described in Japanese Patent Application Laid-Open (KOKAI) No. 5-182177 (1993), ". . . Although the problem of surface roughness is solved by providing a magnetic layer as an upper layer after forming a thick non-magnetic undercoat layer on the surface of a substrate, the problem of the abrasion of a head and the problem of durability are not solved and still remain. This is considered to be caused because a thermoset resin is ordinarily used as a binder of the undercoat layer so that the magnetic layer is brought into contact with a head or other members without any cushioning owing to the hardened undercoat layer, and a magnetic recording medium having such an undercoat layer has a considerably poor flexibility.

In addition, it has been pointed out that in the known magnetic recording media, the magnetic iron-based metal particles which are dispersed in the magnetic recording layer cause a corrosion after production, thereby greatly deteriorating the magnetic properties.

Also, the demand for the enhancement of the surface smoothness in a magnetic recording medium has become increasingly stronger, and the thinner magnetic recording layer, the smoother surface is strongly demanded.

As a result of studies undertaken by the present inventors so as to solve the above-described problems, it has been found that by using specific acicular hematite particles as the non-magnetic particles for a non-magnetic undercoat layer of a magnetic recording medium, the obtained magnetic recording medium has small light transmittance, smooth surface, high strength and high durability, and it is capable of suppressing the deterioration in the magnetic properties by preventing a corrosion of the magnetic particles in a magnetic recording layer. The present invention has been achieved on the basis of this finding.

SUMMARY OF THE INVENTION

Accordingly, it is an object of the present invention to provide acicular hematite particles suitable as non-magnetic particles for a non-magnetic undercoat layer of a magnetic recording medium which has small light transmittance, smooth surface, high strength and high durability, and which is capable of suppressing the deterioration in the magnetic properties caused by a corrosion of the magnetic particles, especially, magnetic iron-based metal particles, contained in the magnetic recording layer.

It is another object of the present invention to provide a magnetic recording medium which has small light transmittance, high strength, smoother surface, and higher durability, and which is capable of suppressing the deterioration in the magnetic properties caused by a corrosion of the magnetic particles, especially, magnetic iron-based metal particles, contained in a magnetic recording layer.

To accomplish the aims, in an aspect of the present invention, there are provided acicular hematite particles containing aluminum of 0.05 to 50% by weight, calculated as Al, having an average major axial diameter of not more than 0.3 $\mu$m and a pH value of the particles of not less than 8, and containing soluble sodium salts of not more than 300 ppm soluble sodium, calculated as Na, and soluble sulfates of not more than 150 ppm soluble sulfate, calculated as $SO_4$.

In a second aspect of the present invention, there is provided acicular hematite particles containing aluminum of 0.05 to 50% by weight, calculated as Al; having a coating comprising at least one selected from the group consisting of a hydroxide of aluminum, an oxide of aluminum, a hydroxide of silicon and an oxide of silicon, which is coated on the surfaces of said acicular hematite particles; having an average major axial diameter of not more than 0.3 $\mu$m and a pH value of the particles of not less than 8; and containing soluble sodium salts of not more than 300 ppm soluble sodium, calculated as Na, and soluble sulfates of not more than 150 ppm soluble sulfate, calculated as $SO_4$.

In a third aspect of the present invention, there is provided a magnetic recording medium comprising: a non-magnetic substrate; a non-magnetic undercoat layer comprising a coating film composition comprising non-magnetic acicular hematite particles set forth in first or second aspect and a binder resin, which is formed on said non-magnetic substrate; and a magnetic recording layer comprising a coating film composition comprising magnetic particles containing iron as a main ingredient and a binder resin, which is formed on said non-magnetic undercoat layer.

In a fourth aspect of the present invention, there is provided magnetic recording medium comprising: a non-magnetic substrate; a non-magnetic undercoat layer comprising a coating film composition comprising non-magnetic acicular hematite particles and a binder resin, which is formed on said non-magnetic substrate; and a magnetic recording layer comprising a coating film composition comprising magnetic particles containing iron as a main ingredient and a binder resin, which is formed on said non-magnetic undercoat layer, wherein said non-magnetic acicular hematite particles contain 0.05 to 50 wt % of aluminum, calculated as Al, within the particle, have an average major axial diameter of not more than 0.3 $\mu$m, a pH value of said particles of not less than 8, and contain soluble sodium salts of not more than 300 ppm soluble sodium, calculated as Na and soluble sulfates of not more than 150 ppm soluble sulfate, calculated as $SO_4$; and said magnetic particles containing iron as a main ingredient comprising iron and aluminum of 0.05 to 10% by weight, calculated as Al.

In a fifth aspect of the present invention, there is provided a magnetic recording medium comprising: a non-magnetic substrate; a non-magnetic undercoat layer comprising a coating film composition comprising non-magnetic acicular hematite particles set forth in first or second aspect and a binder resin, which is formed on said non-magnetic substrate; and a magnetic recording layer comprising a coating film composition comprising binder resin and magnetic particles containing iron as a main ingredient comprising 50 to 99% by weight of iron, 0.05 to 10% by weight of aluminum, and at least one selected from the group consisting of Co, Ni, P, Si, B, Nd, La and Y, which is formed on said non-magnetic undercoat layer.

In a sixth aspect of the present invention, there is provided a magnetic recording medium comprising: a non-magnetic substrate; a non-magnetic undercoat layer comprising a coating film composition comprising non-magnetic acicular hematite particles set forth in first or second aspect and a binder resin, which is formed on said non-magnetic substrate; and a magnetic recording layer comprising a coating film composition comprising a binder resin and magnetic particles containing iron as a main ingredient comprising 50 to 99% by weight of iron, 0.05 to 10% by weight of aluminum, and at least one rare earth metal selected from the group consisting of Nd, La and Y, which is formed on said non-magnetic undercoat layer.

In a seventh aspect of the present invention, there is provided a magnetic recording medium comprising: a non-magnetic substrate; a non-magnetic undercoat layer comprising a coating film composition comprising non-magnetic acicular hematite particles set forth in second aspect and a binder resin, which is formed on said non-magnetic substrate; and a magnetic recording layer comprising a coating film composition comprising a binder resin and magnetic particles containing iron as a main ingredient comprising iron as a main ingredient comprising iron and aluminum of 0.05 to 10% by weight, calculated as Al, which is formed on said non-magnetic undercoat layer.

DETAILED DESCRIPTION OF THE INVENTION

The constitution of the present invention will be explained in more detail.

Acicular hematite particles (1) as non-magnetic particles according to the present invention will first be described.

The acicular hematite particles according to the present invention contain 0.05 to 50 wt % of aluminum (calculated as Al) approximately uniformly within the particles.

It is possible to obtain acicular hematite particles containing aluminum approximately uniformly within the particles by in case where acicular goethite particles are produced by passing an oxygen-containing gas such as air into a suspension containing the iron-containing precipitate such as iron hydroxide, iron carbonate or the like obtained by reacting a ferrous salt with an alkali hydroxide and/or an alkali carbonate, passing of the oxygen-containing gas into the suspension in the presence of the aluminum compound, thereby producing acicular goethite particles containing aluminum substantially uniformly from the central portions to the surfaces of the particles, and dehydrating the acicular goethite particles.

When the aluminum content within the acicular hematite particles is less than 0.05 wt % (calculated as Al), a magnetic recording medium having a non-magnetic undercoat layer containing such acicular hematite particles does not have a sufficient durability. If the aluminum content exceeds 50 wt %, although a magnetic recording medium having the non-magnetic undercoat layer containing such acicular hematite particles has a sufficient durability, the durability-improving effect becomes saturated, so that it is meaningless to add aluminum more than necessary. From the point of view of durability of a magnetic recording medium, the aluminum content therein is preferably 0.5 to 50 wt %, more preferably 1.0 to 50 wt %.

The acicular hematite particles in the present invention have an aspect ratio (average major axial diameter/average minor axial diameter) (hereinunder referred to merely as "aspect ratio") of not less than 2:1, preferably not less than 3:1. The upper limit of the aspect ratio is ordinarily 20:1, preferably 10:1 with the consideration of the dispersibility in the vehicle. The shape of the acicular particles here may have not only acicular but also spindle-shaped, rice ball-shaped or the like.

If the aspect ratio is less than 2:1, it is difficult to obtain a desired film strength of the magnetic recording medium.

The average major axial diameter of the acicular hematite particles of the present invention is not more than 0.3 μm, preferably 0.005 to 0.3 μm. If the average major axial diameter exceeds 0.3 μm, the particle size is so large as to impair the surface smoothness. On the other hand, if the average major axial diameter is less than 0.005 μm, dispersion in the vehicle may be unfavorably apt to be difficult. With the consideration of the dispersibility in the vehicle and the surface smoothness of the coated film, the more preferable average major axial diameter is 0.02 to 0.2 μm.

The average minor axial diameter of the acicular hematite particles of the present invention is preferably 0.0025 to 0.15 μm. If the average minor axial diameter is less than 0.0025 μm, dispersion in the vehicle may be unfavorably difficult. On the other hand if the average minor axial diameter exceeds 0.15 μm, the particle size may be apt to become so large as to impair the surface smoothness. With the consideration of the dispersibility in the vehicle and the surface smoothness of the coated film, the more preferable average minor axial diameter is 0.01 to 0.10 μm.

The pH value of the acicular hematite particles of the present invention is not less than 8. If it is less than 8, the magnetic iron-based metal particles contained in the magnetic recording layer formed on the non-magnetic undercoat layer are gradually corroded, thereby causing a deterioration in the magnetic properties. With the consideration of a corrosion preventive effect on the magnetic iron-based metal particles, the pH value of the particles is preferably not less than 8.5, more preferably not less than 9.0. The upper limit is ordinarily 12, preferably 11, more preferably 10.5.

The content of soluble sodium salts in the acicular hematite particles of the present invention is not more than 300 ppm soluble sodium (calculated as Na). If it exceeds 300 ppm, the magnetic iron-based metal particles contained in the magnetic recording layer formed on the non-magnetic undercoat layer are gradually corroded, thereby causing a deterioration in the magnetic properties. In addition, the dispersion property of the acicular hematite particles in the vehicle is easily impaired, and the preservation of the magnetic recording medium is deteriorated and efflorescence is sometimes caused in a highly humid environment. With the consideration of a corrosion preventive effect on the magnetic iron-based metal particles, the content of soluble sodium salt is preferably not more than 250 ppm, more preferably not more than 200 ppm, even more preferably not more than 150 ppm. From the point of view of industry such as productivity, the lower limit thereof is preferably about 0.01 ppm.

The content of soluble sulfate in the acicular hematite particles of the present invention is not more than 150 ppm soluble sulfate (calculated as $SO_4$). If it exceeds 150 ppm, the magnetic iron-based metal particles contained in the magnetic recording layer formed on the non-magnetic undercoat layer are gradually corroded, thereby causing a deterioration in the magnetic properties. In addition, the dispersion property of the acicular hematite particles in the vehicle is easily impaired, and the preservation of the magnetic recording medium is deteriorated and efflorescence is sometimes caused in a highly humid environment. With the consideration of a corrosion preventive effect on the magnetic iron-based metal particles, the content of soluble sulfate is preferably not more than 70 ppm, more preferably not more than 50 ppm. From the point of view of industry such as productivity, the lower limit thereof is preferably about 0.01 ppm.

The BET specific surface area of the acicular hematite particle of the present invention is ordinarily not less than 35 $m^2/g$. If it is less than 35 $m^2/g$, the acicular hematite particles may be coarse or sintering may be sometimes caused between particles, which are apt to exert a deleterious influence on the surface smoothness of the coated film. The BET surface area is more preferably not less than 40 $m^2/g$, even more preferably not less than 45 $m^2/g$, and the upper limit thereof is ordinarily 300 $m^2/g$. The upper limit is preferably 100 $m^2/g$, more preferably 80 $m^2/g$ with the consideration of the dispersibility in the vehicle.

The major axial diameter distribution of the acicular hematite particles of the present invention is preferably not more than 1.50 in geometrical standard deviation. If it exceeds 1.50, the coarse particles existent sometimes exert a deleterious influence on the surface smoothness of the coated film. The major axial diameter distribution is more preferably not more than 1.40, even more preferably not more than 1.35 in geometrical standard deviation with the consideration of the surface smoothness of the coated film. From the point of view of industrial productivity, the major axial diameter distribution of the acicular hematite particles obtained is ordinarily 1.01 in geometrical standard deviation.

In the acicular hematite particles of the present invention, the degree of densification is high. The degree of densification represented by the ratio of the specific surface area $S_{BET}$ measured by a BET method and the surface area $S_{TEM}$ calculated from the major axial diameter and the minor axial diameter which were measured from the particles in an electron micrograph is ordinarily 0.5 to 2.5.

With the consideration of the surface smoothness of the coated film and the dispersibility in the vehicle, the $S_{BET}/S_{TEM}$ value is preferably 0.7 to 2.0, more preferably 0.8 to 1.6.

The resin adsorptivity of the acicular hematite particles of the present invention is ordinarily not less than 70%, preferably not less than 75%, more preferably not less than 80%.

The amount of sintering preventive existent on the surfaces of the acicular hematite particles of the present invention varies depending upon various conditions such as the kind of sintering preventive, the pH value thereof in an aqueous alkali solution and the heating temperature, it is ordinarily not more than 10 wt %, preferably 0.05 to 10 wt % based on the total weight of the particles.

The surfaces of the acicular hematite particles of the present invention may be coated with at least one selected from the group consisting of a hydroxide of aluminum, an oxide of aluminum, a hydroxide of silicon and an oxide of silicon. When the acicular hematite particles coated with the above-described coating material are dispersed in a vehicle, they have an affinity with the binder resin and it is easy to obtain a desired dispersibility.

The amount of aluminum hydroxide, aluminum oxide, silicon hydroxide or silicon oxide used as the coating material is ordinarily not less than 50 wt %, preferably 0.01 to 50 wt % (calculated as Al or $SiO_2$). If it is less than 0.01 wt %, the dispersibility improving effect may be insufficient. If the amount exceeds 50.00 wt %, the coating effect becomes saturated, so that it is meaningless to add a coating material more than necessary. From the point of view of dispersibility in the vehicle, the preferable amount of coating material is preferably 0.05 to 20 wt % (calculated as Al or $SiO_2$).

Various properties of the acicular hematite particles coated with a coating material of the present invention, such as aspect ratio, average major axial diameter, average minor axial diameter, pH value, the content of soluble sodium salt, content of soluble sulfate, BET specific surface area, major axial diameter distribution, degree of densification, resin adsorptivity and amount of sintering preventive are approximately equivalent in values to those of the acicular hematite particles of the present invention the surfaces of which are not coated with a coating material.

The process for producing the acicular hematite particles according to the present invention will now be described.

In order to produce the acicular hematite particles of the present invention, acicular goethite particles containing aluminum within the particles are produced. Acicular goethite particles are produced by an ordinary method such as (A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.; (B) a method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto after aging the suspension, if necessary; (C) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution; and (D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

The acicular goethite particles containing aluminum within the particles are obtained by passing the oxygen-containing gas such as air into the suspension of the iron-containing precipitate or aqueous solution of the ferrous salt, alkali hydroxide or alkali carbonate, which contain an aluminum compound.

It is essential that an aluminum compound is existent in the above-mentioned suspension or aqueous solution before passing the oxygen-containing gas such as air thereinto in the process for producing the goethite particles. To state this concretely, an aluminum compound may be added to any of the aqueous ferrous salt solution, the aqueous alkali hydroxide solution, the aqueous alkali carbonate solution and the suspension containing an iron-containing precipitate. It is the more preferable to add an aluminum compound to the aqueous ferrous salt solution.

Elements other than Fe and Al such as Ni, Zn, P and Si, which are generally added in order to enhance various properties of the particles such as the major axial diameter, the minor axial diameter and the aspect ratio, may be added during the reaction system for producing the goethite particles.

The acicular goethite particles obtained have an average major axial diameter of ordinarily 0.005 to 0.4 μm, an average minor axial diameter of ordinarily 0.0025 to 0.20 μm and a BET specific of about ordinarily 50 to 250 $m^2/g$, and contain ordinarily soluble sodium salts of 300 to 1500 ppm soluble sodium (calculated as Na) and ordinarily soluble sulfates of 100 to 3000 ppm soluble sulfate (calculated as $SO_4$).

High-density acicular hematite particles containing aluminum within the particles are obtained by heating the acicular goethite particles containing aluminum within the particles at a temperature as high as not less than 550° C. In order to obtain high-density acicular hematite particles which retain the shapes of the acicular goethite particles, it is preferable to obtain low-density acicular hematite particles containing aluminum within the particles by heat-treating the acicular goethite particles at a low temperature, for example, 250 to 500° C. and then to heat the low-density acicular hematite particles at a high temperature, for example, not less than 550° C.

It is preferred to coat the particles with a sintering preventive before the heat-treatment at a low temperature or a high temperature in order to obtain high-density acicular hematite particles which retain the shapes of the acicular goethite particles. The acicular goethite particles coated with a sintering preventive contain soluble sodium salts of ordinarily 500 to 2000 ppm soluble sodium (calculated as Na) and soluble sulfates of ordinarily 300 to 3000 ppm soluble sulfate (calculated as $SO_4$), and have the BET specific surface area of ordinarily about 50 to 250 $m^2/g$. The coating treatment using a sintering preventive is composed of the steps of: adding a sintering preventive to an aqueous suspension containing the acicular goethite particles, mixing and stirring the suspension, filtering out the particles, washing the particles with water, and drying the particles.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum borate, alkali aluminate such as sodium aluminate, and alumina sol, and titanium compounds such as titanyl sulfate may be exemplified.

The acicular hematite particles containing aluminum within the particles are obtained by heat-treating the acicular goethite particles containing aluminum within the particles at a temperature of 250 to 850° C.

The low-density acicular hematite particles obtained by heat-treating the acicular goethite particles coated with a sintering preventive at a temperature of 250 to 500° C. have an average major axial diameter of ordinarily 0.005 to 0.30 $\mu$m, an average minor axial diameter of ordinarily 0.0025 to 0.15 $\mu$m, a BET specific surface area of ordinarily about 70 to 350 m$^2$/g and contain soluble sodium salts of ordinarily 500 to 2000 ppm soluble sodium (calculated as Na) and soluble sulfates of ordinarily 300 to 4000 ppm soluble sulfate (calculated as SO$_4$). If the temperature for heat-treating the goethite particles is less than 250° C., the dehydration reaction takes a long time. On the other hand, if the temperature exceeds 500° C., the dehydration reaction is abruptly brought out, so that it is difficult to retain the shapes because the sintering between particles is caused. The low-density acicular hematite particles obtained by heat-treating the goethite particles at a low temperature are low-density particles having a large number of dehydration pores through which H$_2$O is removed from the goethite particles and the BET specific surface area thereof is about 1.2 to 2 times larger than that of the acicular hematite particles as the starting material.

The low-density hematite particles are then heat-treated at a temperature of not less than 550° C. to obtain a high-density acicular hematite particles. The upper limit of the heating temperature is preferably 850° C. The high-density hematite particles contain soluble sodium salts of ordinarily 500 to 4000 ppm soluble sodium (calculated as Na) and soluble sulfates of ordinarily 300 to 5000 ppm soluble sulfate (calculated as SO$_4$), and the BET specific surface area thereof is ordinarily about 35 to 150 m$^2$/g.

If the heat-treating temperature is less than 550° C., since the densification is insufficient, a large number of dehydration pores exist within and on the surface of the hematite particles, so that the dispersion in the vehicle is insufficient. Further, when the non-magnetic undercoat layer is formed from these particles, it is difficult to obtain a coated film having a smooth surface. On the other hand, if the temperature exceeds 850° C., although the densification of the hematite particles is sufficient, since sintering is caused on and between particles, the particle size increases, so that it is difficult to obtain a coated film having a smooth surface.

The acicular hematite particles are pulverized by a dry-process, and formed into a slurry. The slurry is then pulverized by a wet-process so as to deagglomerate coarse particles. In the wet-pulverization, ball mill, sand grinder, colloid mill or the like is used until coarse particles having a particle size of at least 44 $\mu$m are substantially removed. That is, the wet-pulverization is carried out until the amount of the coarse particles having a particle size of not less than 44 $\mu$m becomes to not more than 10% by weight, preferably not more than 5% by weight, more preferably 0% by weight based on the total weight of the particles. If the amount of the coarse particles having a particle size of not less than 44 $\mu$m is more than 10% by weight, the effect of treating the particles in an aqueous alkali solution at the next step is not attained.

The acicular hematite particles with coarse particles removed therefrom are heat-treated in a slurry at a temperature of not less than 80° C. after the pH value of the slurry is adjusted to not less than 13 by adding an aqueous alkali solution such as sodium hydroxide.

The concentration of the alkali suspension containing the acicular hematite particles and having a pH value of not less than 13 is preferably 50 to 250 g/liter.

If the pH value of the alkali suspension containing the acicular hematite particles is less than 13, it is impossible to effectively remove the solid crosslinking caused by the sintering preventive which exists on the surfaces of the hematite particles, so that it is impossible to wash out the soluble sodium slat, soluble sulfate, etc. existing within and on the surfaces of the particles. The upper limit of the pH value is ordinarily about 14. If the effect of removing the solid crosslinking caused by the sintering preventive which exists on the surfaces of the hematite particles, the effect of washing out the soluble sodium slat, soluble sulfate, etc., and the effect of removing the alkali which adheres to the surfaces of hematite particles in the process of the heat-treatment of the aqueous alkali solution are taken into consideration, the preferable pH value is in the range of 13.1 to 13.8.

The heat-treating temperature in the aqueous alkali solution is preferably not less than 80° C., more preferably not less than 90° C. If the temperature is less than 80° C., it is difficult to effectively remove the solid crosslinking caused by the sintering preventive which exists on the surfaces of the hematite particles. The upper limit of the heating temperature is preferably 103° C., more preferably 100° C. If the heating temperature exceeds 103° C., although it is possible to effectively remove the solid crosslinking, since an autoclave or the like is necessary or solution boils under a normal pressure, it is not advantageous from the point of view of industry.

The acicular hematite particles heat-treated in the aqueous alkali solution are thereafter filtered out and washed with water by an ordinary method so as to remove the soluble sodium salt and soluble sulfate which are washed out of the interiors and the surfaces of the particles and the alkali adhered to the surfaces of the hematite particles in the process of heat-treatment with the aqueous alkali solution, and then dried.

As the method of washing the particles with water, a method generally industrially used such as a decantation method, a dilution method using a filter thickener and a method of passing water into a filter press is adopted.

If the soluble sodium salt and soluble sulfate which are contained within the hematite particles are washed out with water, even if soluble sodium salt and soluble sulfate adhere to the surfaces when the surfaces of the hematite particles are coated with a coating material in a subsequent step, for example, the later-described coating step, they can be easily removed by water washing.

The acicular hematite particles of the present invention are filtered out and washed with water by an ordinary method after they are heat-treated in the aqueous alkali solution. Thereafter, the acicular hematite particles may be coated with at least one selected from the group consisting of a hydroxide of aluminum, an oxide of aluminum, a hydroxide of silicon and an oxide of silicon, if necessary.

In order to coat the hematite particles, an aluminum compound and/or a silicon compound is added to and mixed with an aqueous suspension under stirring which is obtained by dispersing the cake, slurry or dried particles of the acicular hematite particles into an aqueous solution. The pH value of the mixed solution is adjusted, if necessary. The acicular particles thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coating, the same aluminum compounds as those described above as the sintering preventive are usable.

The amount of aluminum compound added is 0.01 to 50.00 wt % (calculated as Al) based on the weight of the acicular hematite particles. If the amount is less than 0.01 wt %, the improvement of the dispersibility in the vehicle may be insufficient. On the other hand, if the amount exceeds 50.00 wt %, the coating effect becomes saturated, so that it is meaningless to add an aluminum compound more than necessary.

As the silicon compound, the same silicon compounds as those described above as the sintering preventive are usable.

The amount of silicon compound added is 0.01 to 50.00 wt % (calculated as $SiO_2$) based on the weight of the acicular hematite particles. If the amount is less than 0.01 wt %, the improvement of the dispersibility in the vehicle may be insufficient. On the other hand, if the amount exceeds 50.00 wt %, the coating effect becomes saturated, so that it is meaningless to add an silicon compound more than necessary.

When both an aluminum compound and a silicon compound are used, the amount thereof used is preferably 0.01 to 50.00 wt % (calculated as Al and $SiO_2$) based on the weight of the acicular hematite particles.

A magnetic recording medium according to the present invention will now be explained.

The magnetic medium of according to the present invention comprises a non-magnetic substrate, a non-magnetic undercoat layer and a magnetic recording layer.

The non-magnetic undercoat layer in the present invention is produced by forming a coating film on the non-magnetic substrate and drying the coating film. The coating film is formed by applying a non-magnetic coating film composition which contains acicular hematite particles, a binder resin and a solvent, to the surface of the non-magnetic substrate.

As the non-magnetic substrate, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic substrate varies depending upon the material, but it is ordinarily about 1.0 to 300 $\mu$m, preferably 2.0 to 200 $\mu$m. In the case of a magnetic disc, polyethylene terephthalate is ordinarily used as the non-magnetic substrate. The thickness thereof is ordinarily 50 to 300 $\mu$m, preferably 60 to 200 $\mu$m. In the case of a magnetic tape, when polyethylene terephthalate is used as the non-magnetic substrate, the thickness thereof is ordinarily 3 to 100 $\mu$m, preferably 4 to 20 $\mu$m. When polyethylene naphthalate is used, the thickness thereof is ordinarily 3 to 50 $\mu$m, preferably 4 to 20 $\mu$m. When polyamide is used, the thickness thereof is ordinarily 2 to 10 $\mu$m, preferably 3 to 7 $\mu$m.

The thickness of the undercoat layer obtained by coating the non-magnetic substrate with a coating film composition and drying the coating film, is ordinarily 0.2 to 10.0 $\mu$m, preferably 0.5 to 5.0 $\mu$m. If the thickness is less than 0.2 $\mu$m, not only it is impossible to ameliorate the surface roughness of the base film but also the strength is insufficient.

As the binder resin in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate resin, electron radiation curing acryl urethane resin and mixtures thereof. Each of these resin binders may contain a functional group such as —OH, —COOH, —$SO_3M$, —$OPO_2M_2$ and —$NH_2$, wherein M represents H, Na or K. With the consideration of the dispersibility of the particles, a binder resin containing a functional group —COOH or —$SO_3M$ is preferable.

The mixing ratio of the acicular hematite particles with the binder resin is ordinarily 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

The gloss of the coated film of the non-magnetic undercoat layer containing acicular hematite particles according to the present invention is ordinarily 180 to 280%, preferably 190 to 280%, more preferably 200 to 280% and the surface roughness Ra thereof is ordinarily 1.0 to 12.0 nm, preferably 1.0 to 10.0 nm, more preferably 2.0 to 9.0 nm, even more preferably 2.0 to 8.0 nm. The Young's modulus (relative value to a commercially available video tape: AV T-120 produced by Victor Company of Japan, Limited) thereof is ordinarily 125 to 150, preferably 127 to 150, more preferably 130 to 150.

The magnetic recording medium according to the present invention is produced by forming the non-magnetic undercoat layer formed on the non-magnetic substrate, forming a coating film on the non-magnetic undercoat layer by applying a coating film composition containing magnetic iron-based metal particles, a binder resin and a solvent, and drying the coating film to obtain a magnetic recording layer.

The magnetic particles containing iron as a main ingredient, that is, magnetic iron-based metal particles used in the present invention comprises iron and at least one selected from the group consisting of Co, Al, Ni, P, Si, Zn, Ti, Cu, B, Nd, La and Y. Further, the following magnetic iron-based metal particles may be exemplified.

1) Magnetic iron-based metal particles comprises iron; and Co of ordinarily 0.05 to 40 wt %, preferably 1.0 to 35 wt %, more preferably 3 to 30 wt % (calculated as Co) based on the weight of the magnetic iron-based metal particles.

2) Magnetic iron-based metal particles comprises iron; and Al of ordinarily 0.05 to 10 wt %, preferably 0.1 to 7 wt % (calculated as Al) based on the weight of the magnetic iron-based metal particles.

3) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and Al of ordinarily 0.05 to 10 wt %, preferably 0.1 to 7 wt % (calculated as Al) based on the weight of the magnetic iron-based metal particles.

4) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

5) Magnetic iron-based metal particles comprises iron; Al of ordinarily 0.05 to 10 wt %, preferably 0.1 to 7 wt % (calculated as Al) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

6) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

7) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and at least one selected from the group consisting of Ni, P, Si, Zn, Ti, Cu and B of ordinarily 0.05 to 10 wt %, preferably 0.1 to 7 wt % (calculated as the corresponding element) based on the weight of the magnetic iron-based metal particles.

8) Magnetic iron-based metal particles comprises iron; Al of ordinarily 0.05 to 10 wt %, preferably 0.1 to 7 wt % (calculated as Al) based on the weight of the magnetic iron-based metal particles; and at least one selected from the group consisting of Ni, P, Si, Zn, Ti, Cu and B of ordinarily 0.05 to 10 wt %, preferably 0.1 to 7 wt % (calculated as the corresponding element) based on the weight of the magnetic iron-based metal particles.

9) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; and at least one selected from the group consisting of Ni, P, Si, Zn, Ti, Cu and B of ordinarily 0.05 to 10 wt %, preferably 0.1 to 7 wt % (calculated as the corresponding element) based on the weight of the magnetic iron-based metal particles.

10) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si, Zn, Ti, Cu and B of ordinarily 0.05 to 10 wt %, preferably 0.1 to 7 wt % (calculated as the corresponding element) based on the weight of the magnetic iron-based metal particles.

11) Magnetic iron-based metal particles comprises iron; Al of ordinarily 0.05 to 10 wt %, preferably 0.1 to 7 wt % (calculated as Al) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si, Zn, Ti, Cu and B of ordinarily 0.05 to 10 wt %, preferably 0.1 to 7 wt % (calculated as the corresponding element) based on the weight of the magnetic iron-based metal particles.

12) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si/Zn, Ti, Cu and B of ordinarily 0.05 to 10 wt %, preferably 0.1 to 7 wt % (calculated as the corresponding element) based on the weight of the magnetic iron-based metal particles.

The iron content in the particles is the balance, and is preferably 50 to 99 wt %, more preferably 60 to 95 wt % (calculated as Fe) based on the weight of the magnetic iron-based metal particles.

The magnetic iron-based metal particles comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is preferable from the point of the durability of the magnetic recording medium. Further, the magnetic iron-based metal particles comprising iron, Al and at least one rare-earth metal such as Nd, La and Y is more preferable.

With respect to the existing position of aluminum of ordinarily 0.05 to 10 wt % (calculated as Al) based on the weight of the magnetic iron-based metal particles, it may be contained only in the core and inside portions, or in the surface portion of the magnetic iron-based metal particles. Alternatively, aluminum may be approximately uniformly contained in the magnetic iron-based metal particles from the core portion to the surface. An aluminum-coating layer may be formed on the surfaces of the particles. In addition, any of these positions may be combined. In the consideration of the effect of improving the surface property of the magnetic recording layer or the durability of the magnetic recording medium, magnetic iron-based metal particles uniformly containing aluminum from the core portion to the surface and coated with an aluminum-coating layer are more preferable.

When the content of aluminum is less than 0.05 wt % (calculated as Al), the adsorption of the resin to the magnetic iron-based metal particles in the vehicle may not be said sufficient, so that it may be difficult to produce a magnetic recording layer or a magnetic recording medium having a high durability. When the content of aluminum exceeds 10 wt %, the effect of improving the durability of the magnetic recording layer or the magnetic recording medium is observed, but the effect is saturated and it is meaningless to add aluminum more than necessary. Further more, the magnetic characteristics of the magnetic iron-based metal particles may be sometimes deteriorated due to an increase in the aluminum as a non-magnetic component. The existing amount of aluminum of the magnetic iron-based metal particles is preferably 0.1 to 7% by weight.

It is more preferable to produce a magnetic recording medium of the present invention using the magnetic iron-based metal particles containing Al and a rare-earth metal such as Nd, La and Y therein, because the magnetic recording layer or magnetic recording medium produced is apt to have a more excellent durability. Especially, magnetic iron-based metal particles containing Al and Nd therein are the even more preferable.

The acicular magnetic iron-based alloy particles containing aluminum within the particles are produced, as is well known, by adding an aluminum compound at an appropriate stage during the above-described process for producing acicular goethite particles to produce acicular goethite particles containing aluminum at desired positions of the particles, and heat-treating, at a temperature of 300 to 500° C., the goethite particles or the acicular hematite particles containing aluminum at desired positions within the particles which are obtained by dehydrating the goethite particles.

The acicular magnetic iron-based metal particles coated with aluminum are produced by heat-treating, at a temperature of 300 to 500° C., the acicular goethite particles coated with an oxide or hydroxide of aluminum, or the acicular hematite particles coated with the oxide-or hydroxide of aluminum which are obtained by dehydrating the goethite particles.

The acicular magnetic iron-based metal particles used in the present invention have an average major axial diameter of ordinarily 0.01 to 0.50 μm, preferably 0.01 to 0.30 μm, more preferably 0.01 to 0.20 μm, an average minor axial diameter of ordinarily 0.0007 to 0.17 μm, preferably 0.003 to 0.10 μm, and an aspect ratio of ordinarily not less than 3:1, preferably and not less than 5:1. The upper limit of the aspect ratio is ordinarily 15:1, preferably 10:1 with the consideration of the dispersibility in the vehicle. The shape of the acicular magnetic iron-based metal particles may have not only acicular but also a spindle-shaped, rice ball-shaped or the like.

As to the magnetic properties of the acicular magnetic iron-based metal particles used in the present invention, the coercive force is preferably 1200 to 3200 oe, more preferably 1500 to 2500 oe, and the saturation magnetization is ordinarily preferably 100 to 170 emu/g, more preferably 130 to 170 emu/g with the consideration of the properties such as high-density recording.

The resin adsorptivity of the acicular magnetic iron-based metal particles used in the present invention is ordinarily not less than 65%, preferably not less than 68%, more preferably not less than 70%, most preferably not less than 80%.

As the binder resin for the magnetic recording layer, the same binder resin as that used for the production of the non-magnetic undercoat layer is usable.

The thickness of the magnetic recording layer obtained by applying the film-coating composition to the non-magnetic undercoat layer and dried, is ordinarily in the range of 0.01 to 5.0 μm. If the thickness is less than 0.01 μm, uniform coating may be difficult, so that unfavorable phenomenon such as unevenness on the coating surface is observed. On the other hand, when the thickness exceeds 5.0 μm, it may be difficult to obtain desired signal recording property due to an influence of diamagnetism. The preferable thickness is in the range of 0.05 to 1.0 μm.

The mixing ratio of the acicular magnetic iron-based metal particles with the binder resin in the magnetic recording layer is ordinarily 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer.

The magnetic recording medium according to the present invention has a coercive force of ordinarily 900 to 3500 oe, preferably 1000 to 3500 oe, more preferably 1500 to 3500 Oe; a squareness (residual magnetic flux density Br/saturation magnetic flux density Bm) of ordinarily 0.85 to 0.95, preferably 0.86 to 0.95, more preferably 0.87 to 0.95; a gloss (of the coating film) of ordinarily 190 to 300%, preferably 200 to 300%, more preferably 210 to 300%; a surface roughness Ra (of the coating film) of ordinarily not more than 12.0 nm, preferably 1.0 to 11.0 nm, more preferably 2.0 to 10.0 nm, even more preferably 2.0 to 9.0 nm, most preferably 2.0 to 8.0 nm; a Young's modulus (relative value to a commercially available video tape: AV T-120 produced by Victor Company of Japan, Limited) of ordinarily not less than 130, preferably not less than 132; and a linear adsorption coefficient (of the coating film) of ordinarily 1.10 to 2.00 $\mu m^{-1}$, preferably 1.20 to 2.00 $\mu m^{-1}$. As to the durability, the running durability is ordinarily not less than 11 minutes, preferably not less than 15 minutes, more preferably not less than 20 minutes. In case using the magnetic iron-based metal particles containing Al as magnetic particles for the magnetic recording layer, the running durability is ordinarily not less than 18 minutes, preferably not less than 20 minutes, more preferably not less than 22 minutes. Also, the scratch resistance is ordinarily A or B, preferably A, when evaluated into four ranks: A, B, C and D.

The corrosiveness represented by a percentage (%) of change in the coercive force is ordinarily not more than 10.0%, preferably not more than 9.5%, more preferably not more than 8.0%, and the corrosiveness represented by a percentage (%) of change in the saturation magnetic flux density Bm is ordinarily not more than 10.0%, preferably not more than 9.5%, more preferably not more than 8.0%.

What is an important in the present invention is the fact that when the high-purity acicular hematite particles containing 0.05 to 50 wt % of aluminum (calculated as Al) within the particles, which have an average major axial diameter of not more than 0.3 μm, a pH value of not less than 8, which contain soluble sodium salts of not more than 300 ppm soluble sodium (calculated as Na) and soluble sulfates of not more than 150 ppm soluble sulfate (calculated as $SO_4$) are used as the non-magnetic particles for a non-magnetic undercoat layer, it is possible to enhance the strength of the substrate and the surface smoothness of the non-magnetic undercoat layer owing to the excellent dispersibility of the particles into a binder resin, and that when a magnetic recording medium is formed by using the non-magnetic undercoat layer, it is possible to-reduce the light transmittance, to enhance the strength and to make the surface of the magnetic recording layer more smooth.

The reason why the strength of the substrate is enhanced and the surface of the non-magnetic undercoat layer is made more smooth is considered to be as follows. Since the binder resin adsorptivity of the acicular hematite particles containing aluminum within the particles in the vehicle is enhanced, as will be shown in later-described examples, the degree of adhesion of the acicular hematite particles in the non-magnetic undercoat layer or the non-magnetic undercoat layer itself to the non-magnetic substrate is enhanced. Since it is possible to sufficiently remove the soluble sodium and the soluble sulfate, which agglomerate hematite particles by firmly crosslinking, by washing the particles with water, the agglomerates are separated into substantially discrete particles, so that acicular hematite particles having an excellent dispersion in the vehicle are obtained.

This fact will be explained in the following. The goethite particles as the starting material are produced by various methods, as described above. When the material for producing acicular goethite particles is ferrous sulfate in any method, a large amount of sulfate [$SO_4^{--}$] naturally exists in the goethite suspension.

Especially, when goethite particles are produced from an acidic solution, since water-soluble sulfate such as $Na_2SO_4$ is simultaneously produced and an alkali metal such as $K^+$, $NH_4^+$ and $Na^+$ are contained in the goethite suspension, a deposit containing an alkali metal and a sulfate is easily produced. This deposit is represented by $RFe_3(SO_4)(OH)_6$ ($R=K^+$, $NH_4^+$, $Na^+$). Such a deposit is a slightly soluble sulfuric acid-containing salt and cannot be removed by an ordinary water washing method. This slightly soluble salt becomes a soluble sodium salt or a soluble sulfate in the next heat-treatment step. The soluble sodium salt and soluble sulfate are firmly combined with the interiors or the surfaces of the acicular hematite particles by a sintering preventive, which is essential for preventing the deformation of the acicular hematite particles and sintering between particles in the heat-treatment at a high temperature for the densification of the particles and which is crosslinking the acicular hematite particles. In this manner, agglomeration between acicular hematite particles becomes further firmer. As a result, the soluble sulfate and the soluble sodium salt, especially, imprisoned in the interiors of the particles or the agglomerates become very difficult to remove by an ordinary water washing method.

When acicular goethite particles are produced in an aqueous alkali solution by using ferrous sulfate and sodium hydroxide, $Na_2SO_4$ is simultaneously produced as a sulfate and NaOH exists in the mother liquor. Since they are both soluble, if the acicular goethite particles are adequately washed with water, $Na_2SO_4$ and NaOH ought to be removed. However, since the crystallinity of acicular goethite particles is generally small, the water-washing effect is poor, and when the particles are washed with water by an ordinary method, the particles still contain water-soluble contents such as a soluble sulfate [$SO_4^{--}$] and a soluble sodium salt [$Na^+$]. The water-soluble contents are firmly combined with the interiors or the surfaces of the acicular hematite particles by the sintering preventive which is crosslinking the particles, as described above, and the agglomeration between acicular hematite particles becomes further firmer. As a result, the soluble sulfate and the soluble sodium salt, especially, imprisoned in the interiors of the particles or the agglomerates become very difficult to remove by an ordinary water washing method.

It is considered that when the hematite particles in which the soluble sodium salt and the soluble sulfate are firmly combined with the interiors or the surfaces of the particles via the soluble sintering preventive, as described above, are pulverized by a wet-process so as to deagglomerate coarse particles, and heat-treated in the aqueous alkali solution having a pH value of not less than 13 at a temperature of not less than 80° C., the aqueous alkali solution sufficiently permeates into the interiors of the hematite particles, so that the binding strength of the sintering preventive which is firmly combined with the interiors and the surfaces of the particles, and the interiors of the agglomerates is gradually weakened, and the crosslinking is dissociated from the interiors and the surfaces of the particles and the interiors of the agglomerates, and simultaneously, the water-soluble sodium salt and the water-soluble sulfate are easily removed by water washing.

What is also important in the present invention is the fact that since the particles having a pH value of not less than 8, and containing soluble sodium salts of not more than 300 ppm soluble sodium (calculated as Na) and soluble sulfates of not more than 150 ppm soluble sulfate (calculated as $SO_4$) are used as the non-magnetic particles for the non-magnetic undercoat layer, it is possible to suppress the deterioration in the magnetic properties which is caused by the corrosion of the acicular magnetic iron-based metal particles dispersed in the magnetic recording layer.

It is considered that the deterioration in the magnetic properties which is caused by the corrosion of the acicular magnetic iron-based metal particles dispersed in the magnetic recording layer is suppressed because the contents of the soluble sodium salt and the soluble sulfate, which accelerate the corrosion of a metal, in the acicular hematite particles are small and the pH value of the hematite particles themselves is as high as not less than 8.

Actually, it is confirmed that a progress of corrosion of acicular magnetic iron-based metal particles was suppressed by a synergistic effect of a small soluble content and a pH value of not less than 8, from the fact that the advantages of the present invention was not attained in any of the cases of (i) heat-treating the hematite particles after wet-pulverization in a slurry with the pH value adjusted to less than 13 at a temperature of not less than 80° C., (ii) heat-treating the hematite particles in a slurry with the pH value adjusted to not less than 13 at a temperature of less than 80° C., and (iii) heat-treating the hematite particles containing coarse particles without being pulverized by a wet-process in a slurry with the pH value adjusted to not less than 13 at a temperature of not less than 80° C., as shown in later-described examples and comparative examples.

In addition, what is still another important in the present invention is that the surfaces of the magnetic recording layer and the magnetic recording medium of the present invention have an excellent durability.

The reason why the durability of the surfaces of the magnetic recording layer and the magnetic recording medium is enhanced is not clear yet, but it is considered that it is due to the effect of using the acicular hematite particles containing aluminum uniformly within the particles, having a pH value of not less than 8 and containing a small amount of soluble sodium salt and soluble sulfate as the non-magnetic particles. More specifically, it is considered that since the resin adsorptivity of the acicular hematite particles containing aluminum uniformly within the particles in the vehicles are enhanced due to the use of the above-described particles, as will be shown in later-described examples, the degree of adhesion of the acicular hematite particles in the non-magnetic undercoat layer or the non-magnetic undercoat layer itself to the non-magnetic substrate is enhanced.

When the acicular hematite particles of the present invention are used as the non-magnetic particles containing aluminum substantially uniformly within the particles for a non-magnetic undercoat layer, it is possible to produce a non-magnetic undercoat layer excellent in the strength of the substrate and the surface smoothness, and when a magnetic medium is produced by using the non-magnetic undercoat layer, it is possible to provide a magnetic medium having a small light transmittance, a smooth surface, a high strength and an excellent durability. That is, the acicular hematite particles are preferable as the non-magnetic particles for a non-magnetic undercoat layer of a high-density magnetic recording medium.

Especially, the magnetic medium of the present invention having a non-magnetic undercoat layer using the hematite particles of the present invention has a small light transmittance, a smooth surface, a high strength and an excellent durability and it is capable of suppressing the deterioration in the magnetic properties caused by a corrosion of the acicular magnetic iron-based metal particles in the magnetic recording layer. That is, the magnetic medium is preferable as a high-density magnetic medium.

Furthermore, due to the synergistic effect of using the acicular non-magnetic particles containing aluminum uniformly within the particles as the non-magnetic particles for the non-magnetic undercoat layer, and using the acicular magnetic iron-based metal particles containing aluminum as the magnetic particles for the magnetic recording layer, the durability is more excellent. That is, the magnetic medium is preferable as a high-density magnetic medium.

EXAMPLES

The present invention is described in more detail by Examples and Comparative Examples, but the Examples are only illustrative and, therefore, not intended to limit the scope of this invention.

Various properties of the lithium-iron oxide particles—produced according to the present invention were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the solid content was passed through the sieve of 325 meshes (mesh size: 44 $\mu$m).

(2) The average major axial diameter and the average minor axial diameter of the particles are expressed by the average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(3) The geometrical standard deviation ($\sigma$g) of particle size distribution of the major axial diameter was obtained by the following method. The major axial diameters of the particles were measured from the magnified electron microphotograph in the above-mentioned (2). The actual major axial diameters of the particles and the number of particles were obtained from the calculation on the basis of the measured values. On logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation ($\sigma$g) was measured from the following formula:

Geometrical standard deviation ($\sigma$g)={major axial diameter ($\mu$m) corresponding to 84.13% under integration sieve}/{major axial diameter (geometrical average diameter) corresponding to 50% under integration sieve}.

The smaller the geometrical standard deviation, the more excellent the particle size distribution of the major axial diameters of the particles.

(4) The specific surface area is expressed by the value measured by a BET method.

(5) The degree of denseness of the particles is represented by $S_{BET}/S_{TEM}$ as described above. $S_{BET}$ is a specific surface area measured by the above-described BET method. $S_{TEM}$ is a value calculated from the average major axial diameter d cm and the average minor axial diameter w cm measured from the electron microphotograph described in (2) on the assumption that a particle is a rectangular parallellopiped in accordance with the following formula:

$$S_{TEM} (m^2/g)=\{(4 \cdot d \cdot w^- + 2w^2)/(d \cdot w^2 \cdot \rho_p)\} \times 10^{-4}$$

wherein $\rho_p$ is the true specific gravity of the hematite particles, and 5.2 g/cm$^3$ was used.

Since $S_{TEM}$ is a specific surface area of a particle having a smooth surface without any dehydration pore within or on the surface thereof, the closer $S_{BET}/S_{TEM}$ of particles is to 1, it means, the smoother surface the particles have without any dehydration pore within or in the surface thereof, in other words, the particles are high-density particles.

(6) The content of each of Co, Al, Ti, P, Si, B and Nd was measured from fluorescent X-ray analysis.

(7) The pH value of the particles was measured in the following method. 5 g of the sample was weighed into a 300-ml triangle flask, and 100 ml of pure water was added. The suspension was heated and after keeping the boiled state for 5 minutes, it was corked and left to cool to an ordinary temperature. After adding pure water which was equivalent to the pure water lost by boiling, the flask was corked again, shaken for 1 minute, and left to stand for 5 minutes. The pH value of the supernatant obtained was measured in accordance JIS Z 8802-7.

(8) The contents of soluble sodium salts and soluble sulfates were measured by measuring the Na content and $SO_4^{2-}$ content in the filtrate obtained by filtering the supernatant liquid produced for the measurement of pH value which is described above through filter paper No. 5C, by using an Inductively Coupled Plasma Emission Spectrophotometer (manufactured by Seiko Instruments and Electronics, Ltd.).

(9) The viscosity of the coating film composition was obtained by measuring the viscosity of the coating film composition at 25° C. at a shear rate D of 1.92 sec$^{-1}$ by using an E type viscometer EMD-R (manufactured by Tokyo Keiki, Co., Ltd.).

(10) The resin adsorotivity of the particles represents the degree at which a resin is adsorbed to the particles. The closer to 100 the value obtained in the following manner, the better.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer resin having a sodium sulfonate group dissolved therein were charged into a 100-ml polyethylene bottle together with 120 g of 3 mmφ steel beads. The particles and the solvent were mixed and dispersed by a paint shaker for 60 minutes.

Thereafter, 50 g of the coating film composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin sharged as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%) = [(Wa-We)/Wa] \times 100.$$

The higher T value, the firmer the resin adsorption to the particles surfaces in the vehicle and the more favorable.

(11) The gloss of the surface of the coating film of each of the non-magnetic undercoat layer and the magnetic recording layer was measured at an angle of incidence of 45° by a glossmeter UGV-5D (manufactured by Suga Shikenki, Co., Ltd.).

(12) The surface roughness Ra is expressed by the average value of the center-line average roughness of the profile curve of the surface of the coating film by using "Surfcom-575A" (manufactured by Tokyo Seimitsu Co., Ltd.).

(13) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: A few scratches
C: Many scratches
D: A great many scratches

(14) The strength of the coating film was expressed the Young's modulus obtained by "Autograph" (produced by Shimazu Seisakusho Ltd.). The Young's modulus was expressed by the ratio of the Young's modulus of the coating film to that of a commercially available video tape "AV T-120" (produce by Victor Company of Japan, Limited). The higher the relative value, the more favorable.

(15) The magnetic properties were measured under an external magnetic field of 10 kOe by "Vibration Sample Magnetometer VSM-3S-15 (manufactured by Toei Kogyo, Co., Ltd.)".

(16) The light transmittance is expressed by the linear adsorption coefficient measured by using "Photoelectric Spectrophotometer UV-2100" (manufactured by Shimazu Seisakusho, Ltd.). The linear adsorption coefficient is defined by the following formula, and the larger the value, the more difficult it is for the magnetic sheet to transmit light:

$$\text{Linear adsorption coefficient } (\mu m^{-1}) = \{1\ n\ (1/t)\}/FT$$

wherein represent a light transmittance (–) at λ=900 nm, and FT represents thickness (μm) of the coating film composition of the film used for the measurement.

(17) The thickness of each of the non-magnetic substrate, the non-magnetic undercoat layer and the magnetic recording layer constituting the magnetic recording medium was measured in the following manner by using a Digital Electronic Micrometer R351C (manufactured by Anritsu Corp.)

The thickness (A) of a non-magnetic substrate was first measured. Similarly, the thickness (B) (B=the sum of the thicknesses of the non-magnetic substrate and the non-magnetic undercoat layer) of a substrate obtained by forming a non-magnetic undercoat layer on the non-magnetic substrate was measured. Furthermore, the thickness (C) (C=the sum of the thicknesses of the non-magnetic substrate, the non-magnetic undercoat layer and the magnetic recording layer) of a magnetic recording medium obtained by forming a magnetic recording layer on the non-magnetic undercoat layer was measured. The thickness of the non-magnetic undercoat layer is expressed by B–A, and the thickness of the magnetic recording layer is expressed by C–B.

(18) The change in the magnetic properties with passage of time of a magnetic recording medium caused by the corrosion of the magnetic iron-based metal particles was examined as follows.

The magnetic recording medium was allowed to stand in an environment of a temperature of 60° C. and a relative humidity of 90% for 14 days, and the coercive force and the saturation magnetic flux density were measured before and after standing. A change in each characteristic was divided by the value before standing, and represented by percentage as a percentage of change.

(19) The light transmittance of a magnetic sheet is expressed by the linear adsorption coefficient measured by using "Photoelectric Spectrophotometer UV-2100" (manufactured by Shimazu Seisakusho, Ltd.), The linear adsorption coefficient is defined by the following formula:

$$\text{Linear adsorption coefficient } (\mu m^{-1}) = \{1\ n\ (1/t)\}/FT$$

wherein t represents light transmittance (–) at λ=900 nm, and FT represents thickness (μm) of the coating film composition of the film used for the measurement.

The larger the value, the more difficult it is for the magnetic sheet to transmit light.

As a blank for measuring the linear adsorption coefficient, the same non-magnetic base film as that of the above-mentioned magnetic sheet, was used.

Example 1

<Production of spindle-shaped hematite particles>

1200 g of spindle-shaped goethite particles containing 0.61 wt % of aluminum (calculated as Al) uniformly within the particles (average major axial diameter: 0.153 μm, average minor axial diameter: 0.0196 μm, aspect ratio: 7.80, BET specific surface area: 175.2 m$^2$/g, content of soluble sodium salts: 1130 ppm soluble sodium (calculated as Na), content of soluble sulfates: 522 ppm soluble sulfate (calculated as SO$_4$), pH value of the particles: 7.9, geometrical standard deviation: 1.32), obtained from an aqueous ferrous sulfate solution, an aqueous aluminum sulfate solution and an aqueous sodium carbonate solution according to the method (B) was suspended in water so as to obtain a slurry, and the concentration of the solid content was adjusted 8 g/liter. 150 liter of the slurry was heated to 60° C. and the pH value of the slurry was adjusted to 9.0 by adding a 0.1-N aqueous NaOH solution.

To the alkali slurry was gradually added 30.0 g of #3 water glass as a sintering preventive, and after the end of addition, the obtained mixture was aged for 60 minutes. The pH value of the slurry was then adjusted to 5.8 by adding a 0.1-N acetic acid solution. Thereafter, the particles were filtered out, washed with water, dried and pulverized by an ordinary method, thereby producing spindle-shaped goethite particles coated with a silicon oxide and containing aluminum uniformly within the particles. The SiO$_2$ content in the spindle-shaped goethite particles was 0.72 wt %.

1000 g of the spindle-shaped goethite particles obtained were charged into a stainless steel rotary furnace, and heat-treated and dehydrated in the air at 300° C. for 60 minutes while rotating the furnace, to obtain low-density spindle-shaped hematite particles containing aluminum uniformly within the particles. The thus-obtained low-density spindle-shaped hematite particles had an average major axial diameter of 0.115 μm, an average minor axial diameter of 0.0177 μm, an aspect ratio of 6.50, a BET specific surface area (S$_{BET}$) of 187.3 m$^2$/g, and a S$_{BET}$/S$_{TEM}$ value of densification of 4.00. The goethite particles contained soluble sodium salts of 1361 ppm soluble sodium (calculated as Na) and soluble sulfates of 568 ppm soluble sulfate (calculated as SO$_4$). The Al content was 0.67 wt %, the pH value of the particles was 7.8 and the geometrical standard deviation thereof was 1.34. The SiO$_2$ content in the low-density spindle-shaped hematite particles was 0.81 wt %.

650 g of the low-density spindle-shaped hematite particles were then charged into a ceramic rotary furnace, and heat-treated in the air at 640° C. for 20 minutes while rotating the furnace so as to conduct the sealing of dehydration pores. The thus-obtained high-density spindle-shaped hematite particles containing aluminum uniformly within the particles had an average major axial diameter of 0.110 μm, an average minor axial diameter of 0.0186 μm, an aspect ratio of 5.91, a BET specific surface area (S$_{BET}$) of 54.6 m$^2$/g, and a S$_{BET}$/S$_{TEM}$ value of densification of 1.22. The hematite particles contained soluble sodium salts of 3553 ppm soluble sodium (calculated as Na) and soluble sulfates of 3998 ppm soluble sulfate (calculated as SO$_4$). The pH value of the particles was 5.8 and the geometrical standard deviation was 1.36. The SiO$_2$ content in the hematite particles was 0.82 wt %. The resin adsorptivity thereof was 23.8%.

After 800 g of the high-density spindle-shaped hematite particles obtained were roughly pulverized by a Nara mill in advance, the obtained particles were charged into 4.7 l of pure water and peptized by a homomixer (manufactured by Tokushu-kika Kogyo, CO., Ltd.) for 60 minutes.

The slurry of the high-density spindle-shaped hematite particles obtained was then mixed and dispersed for 3 hours at an axial rotation frequency of 2000 rpm while being circulated by a horizontal SGM (Dispermat SL, manufactured by S. C. Adichem, CO., Ltd.). The spindle-shaped hematite particles in the slurry remaining on a sieve of 325 meshes (mesh size: 44 μm) was 0% by weight.

The concentration of the high-density spindle-shaped hematite particles in the slurry was adjusted to 100 g/liter, and 6N-aqueous NaOH solution was added to 7 liter of the slurry under stirring so as to adjust the pH value to 13.3. The slurry was then heated to 95° C. under stirring, and was held for 3 hours at 95° C.

The slurry was then washed with water by a decantation method and the pH value of the slurry was adjusted to 10.5. When the concentration of the slurry at this point was checked so as to ensure the accuracy, it was 98 g/liter.

2 liter of the slurry washed with water was filtered through a Buchner filter, and pure water was passed until the electric conductivity of the filtrate became not more than 30 μs. The particles were then dried by an ordinary method and pulverized so as to obtain the target spindle-shaped hematite particles. The spindle-shaped hematite particles obtained contained 0.67 wt % of aluminum (calculated as Al) uniformly within the particles, and had an average major axial diameter of 0.110 μm, a minor axial diameter of 0.0185 μm, an aspect ratio of 5.95, a geometric standard deviation σg of particle size (major axial diameter) of 1.35, a BET specific surface (S$_{BET}$) of 54.0 m$^2$/g, a S$_{BET}$/S$_{TEM}$ value of densification of 1.20 and a pH value of the particles of 9.0. The spindle-shaped hematite particles contained soluble sodium salts of 138 ppm soluble sodium (calculated as Na) and soluble sulfates of 35 ppm soluble sulfate (calculated as SO$_4$). The resin adsorptivity thereof was 79.8%.

Example 2

<Production of a non-magnetic undercoat layer>

12 g of the spindle-shaped hematite particles containing 0.67 wt % of aluminum (calculated as Al) uniformly within the particles obtained in the Example 1 were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt %) obtained was kneaded by a plasto-mill for 30 minutes.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the obtained mixture was mixed and dispersed by a paint shaker for 6 hours to obtain a coating film composition.

The thus-obtained coating film composition containing hematite particles was as follows:

| | |
|---|---|
| Spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The viscosity of the obtained coating film composition was 384 cP. The coating film composition obtained containing hematite particles was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.5 μm.

The gloss of the coating film of the non-magnetic undercoat layer was 206%, the surface roughness Ra was 5.9 nm, and the Young's modulus (relative value) was 121.

<Production of a magnetic recording layer>

12 g of acicular magnetic iron-based metal particles (average major axial diameter: 0.11 μm, average minor axial diameter: 0.018 μm, aspect ratio: 6.10, coercive force: 1880 Oe, saturation magnetization: 128 emu/g), 1.2 g of a polishing agent (AKR-30: trade name, produced by Sumitomo Chemical Co., Ltd.), 0.12 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plasto-mill for 30 minutes to obtain a kneaded material.

The thus-obtained kneaded material was charged into a 140 ml-glass bottle together with 95 g of 1.5 mmϕ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the mixture was mixed and dispersed by a paint shaker for 6 hours.

The thus-obtained magnetic coating film composition was as follows:

| | |
|---|---|
| Iron-based alloy particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid: butyl stearate 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating film composition obtained was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the magnetic recording layer was 1.1 μm.

The magnetic tape obtained had a coercive force of 1960 Oe, a squareness (Br/Bm) of 0.87, a gloss of 235%, a surface roughness Ra of 6.0 nm, a Young's modulus (relative value) of 133, a linear absorption coefficient of 1.21, a running durability of 25.6 minutes, and a scratch resistance of A. Changes in the coercive force and the saturation magnetic flux density Bm with passage of time were 5.0%, and 4.2%, respectively.

Examples 3 to 17, Comparative Examples 1 to 15
<Types of acicular goethite particles>

The precursors 1 to 8 shown in Table 1 were used as the precursors for producing acicular hematite particles.

<Production of low-density acicular hematite particles>

Low-density acicular hematite particles were obtained in the same way as in Example 1 except for varying the kind of acicular goethite particles as the precursors, the kind and amount of sintering preventive, and heating and dehydration temperature and time. The particles obtained in Comparative Example 4 were goethite particles.

The main producing conditions and various properties are shown in Tables 2 to 5.

Examples 18 to 32, Comparative Examples 16 to 29

<Production of high-density acicular hematite particles>

High-density acicular hematite particles were obtained in the same way as in Example 1 except for varying the kind of low-density hematite particles, and the heating temperature and time for densification.

The main producing conditions and various properties are shown in Tables 6 and 7.

Examples 33 to 47, Comparative Examples 30 to 38

<Treatment of acicular hematite particles in an aqueous alkali solution>

Acicular hematite particles were obtained in the same way as in Example 1 except for varying the kind of high-density acicular hematite particles, whether or not the wet-pulverization process was conduced, whether or not the heat-treatment in the aqueous alkali solution was conducted, the pH value of the slurry, and the heating time and temperature.

The main producing conditions and various properties are shown in Tables 8 to 11.

Example 48
<Surface coating of spindle-shaped hematite particles>

The concentration of the slurry having a pH value 10.5 which was obtained in Example 33 by washing the particles in an aqueous alkali solution after heat-treatment with water by a decantation method was 98 g/liter. 5 liter of the slurry was re-heated to 60° C., and 907 ml (equivalent to 5.0 wt % (calculated as Al) based on the spindle-shaped hematite particles) of a 1.0-N $NaAlO_2$ solution was added to the slurry, and the mixture was held for 30 minutes. Thereafter, the pH value of the mixture was adjusted to 8.3 by using acetic acid. The particles were then filtered out, washed with water, dried and pulverized in the same way as in Example 1, thereby obtaining spindle-shaped hematite particles coated with a coating material.

The main producing conditions and various properties are shown in Tables 12 and 13.

Examples 49 to 62

Acicular hematite particles coated with a coating material were obtained in the same way as in Example 48 except for varying the kind of acicular hematite particles, and the kind and the amount of surface treating material.

The main producing conditions and various properties are shown in Table 12 and 13.

Examples 63 to 92, Comparative Examples 39 to 54

<Production of a non-magnetic undercoat layer>

A non-magnetic undercoat layer was obtained in the same way as in Example 2 by using the acicular hematite particles obtained in Examples 33 to 62, Comparative Examples 1, 3, 16 to 19, 24 and 30 to 38.

The main producing conditions and various properties are shown in Tables 14 to 16.

Examples 93 to 122, Comparative Examples 55 to 70

<Production of a magnetic recording medium using magnetic iron-based metal particles>

A magnetic recording medium using magnetic iron-based metal particles was obtained in the same way as in Example 2 except for varying the kind of non-magnetic undercoat layer obtained in Examples 63 to 92 and Comparative Examples 39 to 54 and the kind of acicular magnetic iron-based metal particles.

The main producing conditions and various properties are shown in Tables 17 to 19.

Example 123

<Production of spindle-shaped hematite particles>

1200 g of spindle-shaped goethite particles containing 0.83 wt % of aluminum (calculated as Al) uniformly within the particles (average major axial diameter: 0.178 μm, average minor axial diameter: 0.0225 μm, aspect ratio: 7.91, BET specific surface area: 160.3 m²/g, soluble sodium salts: 1232 ppm soluble sodium.(calculated as Na), soluble sulfates: 621 ppm soluble sulfate (calculated as $SO_4$), pH value of the particles: 6.7, geometrical standard deviation: 1.33) obtained from an aqueous ferrous sulfate solution, an aqueous aluminum sulfate solution and an aqueous sodium carbonate solution by the method (B) was suspended in water so as to obtain a slurry, and the concentration of the solid content was adjusted to 8 g/liter. 150 liter of the slurry was heated to 60° C. and the pH value of the slurry was adjusted to 9.0 by adding a 0.1-N aqueous NaOH solution.

To the alkali slurry was gradually added 36.0 g of #3 water glass as a sintering preventive, and after the end of addition, the mixture was aged for 60 minutes. The pH value of the slurry was then adjusted to 6.0 by adding a 0.5-N acetic acid solution. Thereafter, the particles were filtered out, washed with water, dried and pulverized by an ordinary method, thereby producing spindle-shaped goethite particles coated with a silicon oxide and containing aluminum uniformly within the particles. The $SiO_2$ content in the spindle-shaped goethite particles was 0.86 wt %.

1000 g of the spindle-shaped goethite particles obtained were charged into a stainless steel rotary furnace, and heat-treated and dehydrated in the air at 350° C. for 30 minutes while rotating the furnace, to obtain low-density spindle-shaped hematite particles. The thus-obtained low-density spindle-shaped hematite particles had an average major axial diameter of 0.134 μm, an average minor axial diameter of 0.0194 μm, an aspect ratio of 6.91, a BET specific surface area ($S_{BET}$) of 168.3 m²/g, and a $S_{BET}/S_{TEM}$ value of densification of 3.96. The goethite particles contained soluble sodium salts of 1123 ppm soluble sodium (calculated as Na) and soluble sulfates of 465 ppm soluble sulfate (calculated as $SO_4$). The Al content was 0.91 wt %, the pH value of the particles was 6.3 and the geometrical standard deviation was 1.34. The $SiO_2$ content in the low-density spindle-shaped hematite particles was 0.94 wt %.

900 g of the low-density spindle-shaped hematite particles were then charged into a ceramic rotary furnace, and heat-treated in the air at 630° C. for 30 minutes while rotating the furnace so as to conduct the sealing of dehydration pores. The thus-obtained high-density spindle-shaped hematite particles containing aluminum uniformly within the particles had an average major axial diameter of 0.129 μm, an average minor axial diameter of 0.0206 μm, an aspect ratio of 6.26, a BET specific surface area ($S_{BET}$) of 46.6 m²/g, and a $S_{BET}/S_{TEM}$ value of densification of 1.16. The hematite particles contained soluble sodium salts of 2864 ppm soluble sodium (calculated as Na) and soluble sulfates of 2956 ppm soluble sulfate (calculated as $SO_4$). The pH value of the particles was 5.4 and the geometrical standard deviation was 1.36. The $SiO_2$ content in the hematite particles was 0.94 wt %. The resin adsorptivity thereof was 21.6%.

After 800 g of the high-density spindle-shaped hematite particles obtained were roughly pulverized by a Nara mill in advance, the obtained spindle-shaped hematite particles were charged into 4.7 liter of pure water and peptized by a homomixer (manufactured by Tokushu-kika Kogyo, CO., Ltd.) for 60 minutes.

The slurry of the high-density spindle-shaped hematite particles obtained was then mixed and dispersed for 3 hours at an axial rotation frequency of 2000 rpm while being circulated by a horizontal SGM (Dispermat SL, manufactured d by S.C. Adichem, CO., Ltd.). The spindle-shaped hematite particles in the slurry remaining on a sieve of 325 meshes (mesh size: 44 μm) was 0% by weight.

The concentration of the high-density spindle-shaped hematite particles in the slurry was adjusted to 100 g/liter, and a 6N-aqueous NaOH solution was added to 7 liter of the slurry under stirring so as to adjust the pH value to 13.3. The slurry was then heated to 95° C. under stirring, and was held for 3 hours at 95° C.

The slurry was then washed with water by a decantation method and the pH value of the slurry was adjusted to 10.5. When the concentration of the slurry at this point was checked so as to ensure the accuracy, it was 96 g/liter.

2 liter of the slurry washed with water was filtered through a Buchner filter, and the pure water was passed until the electric conductivity of the filtrate became not more than 30 μs. The particles were then dried by an ordinary method and pulverized so as to obtain the target spindle-shaped hematite particles. The spindle-shaped hematite particles obtained contained 0.91 wt % of aluminum (calculated as Al) uniformly within the particles, and had an average major axial diameter of not more than 0.128 μm, a minor axial diameter of 0.0206 μm, a specific ratio of 6.21, a geometric standard deviation σg of particle size (major axial diameter) of 1.35, a BET specific surface ($S_{BET}$) of 47.1 m²/g, a $S_{BET}/S_{TEM}$ value of densification of 1.17 and a pH value of the particles of 9.1. The spindle-shaped hematite particles contained soluble sodium salts of 112 ppm soluble sodium (calculated as Na) and soluble sulfates of 41 ppm of soluble sulfate (calculated as $SO_4$). The resin adsorptivity thereof was 86.3%.

Example 124

<Production of a non-magnetic undercoat layer>

12 g of the spindle-shaped hematite particles containing 0.91 wt % of aluminum (calculated as Al) uniformly within the particles obtained were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt %) obtained was kneaded by a plasto-mill for 30 minutes.

A coating film composition was obtained in the same way as in Example 2 by using the kneaded material obtained.

The viscosity of the coating film composition obtained was 435 cP. The coating film composition obtained containing hematite particles was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.4 μm. The gloss of the coating film of the non-magnetic undercoat layer was 211%, the surface roughness Ra was 6.2 nm, and the Young's modulus (relative value) was 131.

<Production of a magnetic recording layer>

12 g of acicular magnetic iron-based metal particles (average major axial diameter: 0.104 μm, average minor axial diameter: 0.0158 μm, aspect ratio: 6.58, coercive force: 1905 Oe, saturation magnetization: 138 emu/g, geometric standard deviation: 1.35, resin adsorptivity: 80.1%), which contained 1.12 wt % of aluminum in the central portion, 2.55 wt % of aluminum in the surface layer portion, and 0.48 wt % of aluminum on the surface coating (calculated as Al), respectively, and further contained 0.36 wt % of Nd, 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plasto-mill for 30 minutes to obtain a kneaded material.

A magnetic tape was produced in the same way as in Example 2 by using the kneaded material obtained. The thickness of the magnetic recording layer of the magnetic tape was 1.1 μm.

The magnetic tape obtained by forming the magnetic recording layer on the non-magnetic undercoat layer had a coercive force of 1981 Oe, a squareness (Br/Bm) of 0.88, a gloss of 228%, a surface roughness Ra of 6.0 nm, a Young's modulus (relative value) of 132, a linear absorption coefficient of 1.23, a running durability of 30.0 minutes, and a scratch resistance of A.

Changes in the coercive force and the saturation magnetic flux density Bm with passage time were 3.4% and 4.5%, respectively.

Examples 125 to 133, Comparative Examples 71 to 84

<Kinds of acicular goethite particles>

The following starting materials (I) to (V) were prepared as the precursors for the production of acicular hematite particles. The main producing conditions and various properties are shown in Table 20.

<Production of low-density acicular hematite particles>

Low-density acicular hematite particles were produced in the same way as in Example 123 except for varying the kind of acicular goethite particles, the kind and amount of sintering preventive, the heating temperature and time. The particle obtained in Comparative Example 74 were goethite particles.

The main producing conditions and various properties are shown in Tables 21 to 24.

Examples 134 to 142, Comparative Examples 85 to 97

<Production of high-density acicular hematite particles>

High-density acicular hematite particles were produced in the same way as in Example 123 except for varying the kind of low-density acicular hematite particles, and the heating temperature and time for densification.

The main producing conditions and various properties are shown in Tables 25 and 26.

Examples 143 to 151, Comparative Examples 98 to 105

<Treatment of acicular hematite Particles in an aqueous alkali solution>

Acicular hematite particles were obtained in the same way as in Example 123 except for varying the kind of high-density acicular hematite particles, whether or not the wet-pulverization process was conducted, whether or not the heat-treatment in the aqueous alkali solution was conducted, the pH value of the slurry, and the heating time and temperature.

The main producing conditions and various properties are shown in Tables 27 to 30.

Example 152

<Surface coating of acicular hematite particles>

The concentration of the slurry having a pH value 10.5 which was obtained in Example 143 by washing the particles in an aqueous alkali solution after heat-treatment with water by a decantation method was 96 g/liter. 5 liter of the slurry was re-heated to 60° C., and 533 ml (equivalent to 3.0 wt % (calculated as Al) based on the acicular hematite particles) of a 1.0-N $NaAlO_2$ solution was added to the slurry, and the mixture was held for 60 minutes. Thereafter, the pH value of the mixture was adjusted to 8.2 by using acetic acid. The particles were then filtered out, washed with water, dried and pulverized in the same way as in Example 123, thereby obtaining acicular hematite particles coated with a coating material.

The main producing conditions and various properties are shown in Tables 31 and 32.

Examples 153 to 160

Acicular hematite particles coated with a coating material were obtained in the same way as in Example 152 except for varying the kind of acicular hematite particles, and the kind and the amount of surface treating material.

The main producing conditions and various properties are shown in Tables 31 and 32.

Examples 161 to 178, Comparative Examples 106 to 120

<Production of a non-magnetic undercoat layer>

A non-magnetic undercoat layer was obtained in the same way as in Example 124 by using the acicular hematite particles obtained in Examples 143 to 160, acicular hematite particles as the starting material (V), and the acicular hematite particles obtained in Comparative Examples 73, 85 to 88, 93 and 98 to 105.

The main producing conditions and various properties are shown in Tables 33 and 34.

Examples 179 to 191, Comparative Examples 121 to 134

<Production of a magnetic recording medium>

4 kinds of magnetic iron-based metal particles (a) to (d) shown in in Table 35 were used.

A magnetic recording medium using magnetic iron-based metal particles was obtained in the same way as in Example 124 except for varying the kind of non-magnetic undercoat layer and the kind of acicular magnetic iron-based metal particles.

The main producing conditions and various properties are shown in Tables 36 and 37.

TABLE 1

| Kind of precursors | Precursor 1 | Precursor 2 | Precursor 3 | Precursor 4 |
|---|---|---|---|---|
| Production of acicular goethite particles | | | | |
| Production method | B | B | D | C |
| Kind of Al added | Aluminum sulfate | Aluminum sulfate | Aluminum nitrate | Aluminum acetate |
| Acicular goethite particles | | | | |
| Average major axial diameter (μm) | 0.179 | 0.228 | 0.246 | 0.196 |
| Aspect ratio (–) | 7.6 | 7.9 | 8.1 | 7.7 |
| Geometric standard deviation σg (–) | 1.35 | 1.32 | 1.30 | 1.38 |
| BET specific surface area (m²/g) | 146.0 | 101.0 | 85.3 | 95.1 |
| Al content (wt %) | 0.60 | 1.12 | 0.84 | 0.20 |
| Soluble Na salt (ppm) | 389 | 453 | 1389 | 365 |
| Soluble sulfate (ppm) | 235 | 564 | 2323 | 890 |
| pH value of particles (–) | 7.9 | 7.3 | 6.1 | 5.5 |

| Kind of precursors | Precursor 5 | Precursor 6 | Precursor 7 | Precursor 8 |
|---|---|---|---|---|
| Production of acicular goethite particles | | | | |
| Production method | B | B | A | B |
| Kind of Al added | Aluminum sulfate | Aluminum sulfate | Sodium aluminate | Aluminum sulfate |
| Acicular goethite particles | | | | |
| Average major axial diameter (μm) | 0.150 | 0.235 | 0.216 | 0.258 |
| Aspect ratio (–) | 7.4 | 8.4 | 8.8 | 8.6 |
| Geometric standard deviation σg (–) | 1.42 | 1.30 | 1.40 | 1.35 |
| BET specific surface area (m²/g) | 186.4 | 65.6 | 75.1 | 60.6 |
| Al content (wt %) | 0.46 | 2.89 | 4.05 | 0.005 |
| Soluble Na salt (ppm) | 456 | 399 | 1189 | 325 |
| Soluble sulfate (ppm) | 367 | 412 | 268 | 525 |
| pH value of particles (–) | 7.1 | 6.8 | 8.4 | 7.0 |

(Note) PRODUCTION METHOD:
(A): A method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.
(B): A method of producing spindle-shaped goethite particles by oxidizing a suspension containing $FeCO_3$ which is obtained by reacting an aqueous ferrous salt solution with an aoueous alkali carbonate solution, by passing an oxygen-containing gas thereinto after aging the suspension, if necessary.
(C): A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution.

TABLE 1-continued (D): A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

TABLE 2

| | Example 3 | Example 4 | Example 5 | Example 6 |
|---|---|---|---|---|
| Kind of acicular goethite particles | Precursors in Examples | Precursor 1 | Precursor 1 | Precursor 2 |
| Sintering preventive | | | | |
| Kind | #3 Water glass | hexametaphosphate Soda | #3 Water glass/ phosphoric acid | Phosphoric acid |
| Amount added (wt %) | $SiO_2$: 0.75 | P: 0.60 | $SiO_2$: 1.25/ P: 1.00 | P: 1.50 |
| Heating and dehydration | | | | |
| Temperature (° C.) | 300 | 350 | 380 | 350 |
| Time (min.) | 60 | 60 | 60 | 60 |

| | Example 7 | Example 8 | Example 9 | Example 10 |
|---|---|---|---|---|
| Kind of acicular goethite particles | Precursor 2 | Precursor 3 | Precursor 3 | Precursor 4 |
| Sintering preventive | | | | |
| Kind | Sodium aluminate | hexametaphosphate Soda | Boric acid | #3 Water glass |
| Amount added (wt %) | Al: 3.00 | P: 1.20 | B: 1.60 | $SiO_2$: 1.00 |
| Heating and dehydration | | | | |
| Temperature (° C.) | 330 | 330 | 350 | 320 |
| Time (min.) | 120 | 120 | 90 | 60 |

| | Example 11 | Example 12 | Example 13 | Example 14 |
|---|---|---|---|---|
| Kind of acicular goethite particles | Precursor 4 | Precursor 5 | Precursor 5 | Precursor 6 |
| Sintering preventive | | | | |
| Kind | Phosphoric acid | hexametaphosphate Soda | #3 Water glass/ hexametaphosphate soda | #3 Water glass |
| Amount added (wt %) | P: 1.00 | P: 7.00 | $SiO_2$: 0.75/ P: 1.25 | $SiO_2$: 1.50 |
| Heating and | | | | |

TABLE 2-continued

| dehydration | | | | |
|---|---|---|---|---|
| Temperature (° C.) | 300 | 380 | 350 | 350 |
| Time (min.) | 30 | 120 | 90 | 60 |

| | Example 15 | Example 16 | Example 17 |
|---|---|---|---|
| Kind of acicular goethite particles | Precursor 6 | Precursor 7 | Precursor 7 |
| Sintering preventive | | | |
| Kind | Titanyl sulfate/ Phosphoric acid | hexameta- phosphate Soda | Aluminum sulfate |
| Amount added (wt %) | Ti: 3.35 P: 2.20 | P: 1.00 | Al: 3.25 |
| Heating and dehydration | | | |
| Temperature (° C.) | 375 | 310 | 330 |
| Time (min.) | 60 | 30 | 60 |

TABLE 3

| | Example 3 | Example 4 | Example 5 | Example 6 |
|---|---|---|---|---|
| Low-density hematite particles | | | | |
| Average major axial diameter (μm) | 0.115 | 0.133 | 0.140 | 0.166 |
| Average minor axial diameter (μm) | 0.0178 | 0.0218 | 0.0221 | 0.0263 |
| Geometric standard deviation σg (–) | 1.35 | 1.33 | 1.33 | 1.37 |
| Aspect ratio (–) | 6.46 | 6.10 | 6.33 | 6.31 |
| $S_{BET}$ (m²/g) | 187.3 | 150.5 | 160.8 | 143.9 |
| $S_{TEM}$ (m²/g) | 46.6 | 38.2 | 37.6 | 31.6 |
| $S_{BET}/S_{TEM}$ (–) | 4.02 | 3.94 | 4.28 | 4.56 |
| Al content (wt %) | 0.67 | 0.67 | 0.67 | 1.25 |
| Amount of sintering preventive (wt %) | SiO₂: 0.83 | P: 0.66 | SiO₂: 1.38 P: 1.10 | P: 1.60 |
| Soluble Na salt (ppm) | 1361 | 1897 | 1835 | 1768 |
| Soluble sulfate (ppm) | 568 | 1321 | 1189 | 1443 |
| pH value of particles (–) | 7.9 | 7.1 | 7.3 | 7.0 |

| | Example 7 | Example 8 | Example 9 | Example 10 |
|---|---|---|---|---|
| Low-density hematite particles | | | | |
| Average major axial diameter (μm) | 0.168 | 0.204 | 0.206 | 0.147 |
| Average minor axial diameter (μm) | 0.0260 | 0.0291 | 0.0290 | 0.0242 |
| Geometric standard deviation σg (–) | 1.36 | 1.41 | 1.40 | 1.35 |
| Aspect ratio (–) | 6.46 | 7.01 | 7.10 | 6.07 |
| $S_{BET}$ (m²/g) | 134.8 | 125.9 | 145.0 | 145.9 |
| $S_{TEM}$ (m²/g) | 31.9 | 28.3 | 28.4 | 34.4 |
| $S_{BET}/S_{TEM}$ (–) | 4.23 | 4.45 | 5.11 | 4.24 |
| Al content (wt %) | 1.25 | 0.93 | 0.93 | 0.22 |
| Amount of sintering preventive (wt %) | Al: 3.24 | P: 1.30 | B: 1.75 | SiO₂: 1.11 |
| Soluble Na salt (ppm) | 1689 | 2567 | 3109 | 1123 |
| Soluble sulfate (ppm) | 1567 | 1011 | 980 | 760 |
| pH value of particles (–) | 6.8 | 7.9 | 8.3 | 7.8 |

TABLE 3-continued

| | Example 11 | Example 12 | Example 13 | Example 14 |
|---|---|---|---|---|
| Low-density hematite particles | | | | |
| Average major axial diameter (μm) | 0.147 | 0.107 | 0.097 | 0.190 |
| Average minor axial diameter (μm) | 0.0240 | 0.0181 | 0.0191 | 0.0287 |
| Geometric standard deviation σg (–) | 1.36 | 1.41 | 1.44 | 1.32 |
| Aspect ratio (–) | 6.13 | 5.91 | 5.08 | 6.62 |
| $S_{BET}$ (m²/g) | 156.9 | 257.5 | 246.2 | 98.8 |
| $S_{TEM}$ (m²/g) | 34.7 | 46.1 | 44.2 | 28.8 |
| $S_{BET}/S_{TEM}$ (–) | 4.53 | 5.59 | 5.57 | 3.43 |
| Al content (wt %) | 0.22 | 0.51 | 0.52 | 3.22 |
| Amount of sintering preventive (wt %) | P: 1.09 | P: 7.28 | SiO₂: 0.83 P:1.36 | SiO₂: 1.68 |
| Soluble Na salt (ppm) | 1324 | 1324 | 1145 | 876 |
| Soluble sulfate (ppm) | 689 | 1126 | 1123 | 888 |
| pH value of particles (–) | 8.0 | 6.5 | 6.9 | 6.0 |

| | Example 15 | Example 16 | Example 17 |
|---|---|---|---|
| Low-density hematite particles | | | |
| Average major axial diameter (μm) | 0.192 | 0.176 | 0.177 |
| Average minor axial diameter (μm) | 0.0278 | 0.0251 | 0.0255 |
| Geometric standard deviation σg (–) | 1.32 | 1.36 | 1.37 |
| Aspect ratio (–) | 6.91 | 7.01 | 6.94 |
| $S_{BET}$ (m²/g) | 101.8 | 126.8 | 136.9 |
| $S_{TEM}$ (m²/g) | 29.7 | 32.8 | 32.3 |
| $S_{BET}/S_{TEM}$ (–) | 3.43 | 3.86 | 4.23 |
| Al content (wt %) | 3.22 | 4.50 | 4.51 |
| Amount of sintering preventive (wt %) | Ti: 3.55 P:2.41 | P: 1.11 | Al: 3.58 |
| Soluble Na salt (ppm) | 769 | 1452 | 1562 |
| Soluble sulfate (ppm) | 658 | 467 | 576 |
| pH value of particles (–) | 6.1 | 8.1 | 8.0 |

TABLE 4

| | Comp. Example 1 | Comp. Example 2 | Comp. Example 3 | Comp. Example 4 |
|---|---|---|---|---|
| Kind of acicular goethite particles | Precursors in Examples | Precursors in Examples | Precursors in Examples | Precursors in Examples |
| Sintering preventive | | | | |
| Kind | — | — | #3 Water glass | Phosphoric acid |
| Amount added (wt %) | — | — | SiO₂: 1.00 | P: 1.00 |
| Heating and dehydration | | | | |
| Temperature (° C.) | 320 | 350 | 350 | — |

TABLE 4-continued

| Time (min.) | 60 | 60 | 60 | — |
|---|---|---|---|---|
| | Comp. Example 5 | Comp. Example 6 | Comp. Example 7 | Comp. Example 8 |
| Kind of acicular goethite particles | Precursors in Examples | Precursors in Examples | Precursors in Examples | Precursors in Examples |
| Sintering preventive | | | | |
| Kind | Phosphoric acid | Phosphoric acid | #3 Water glass | #3 Water glass |
| Amount added (wt %) | P: 1.25 | P: 1.00 | $SiO_2$: 1.50 | $SiO_2$: 1.00 |
| Heating and dehydration | | | | |
| Temperature (° C.) | 330 | 310 | 320 | 350 |
| Time (min.) | 30 | 30 | 90 | 60 |
| | Comp. Example 9 | Comp. Example 10 | Comp. Example 11 | Comp. Example 12 |
| Kind of acicular goethite particles | Precursors in Examples | Precursor 6 | Precursor 6 | Precursor 6 |
| Sintering preventive | | | | |
| Kind | Phosphoric acid | hexametaphosphate Soda | #3 Water glass | Sodium aluminate |
| Amount added (wt %) | P: 1.00 | P: 2.00 | $SiO_2$: 1.75 | Al: 1.50 |
| Heating and dehydration | | | | |
| Temperature (° C.) | 300 | 380 | 350 | 330 |
| Time (min.) | 30 | 90 | 90 | 30 |
| | Comp. Example 13 | Comp. Example 14 | Comp. Example 15 | |
| Kind of acicular goethite particles | Precursor 6 | Precursor 6 | Precursor 8 | |
| Sintering preventive | | | | |
| Kind | Titanyl sulfate | Phosphoric acid | Phosphoric acid | |
| Amount added (wt %) | Ti: 1.00 | P: 1.00 | P: 1.50 | |
| Heating and dehydration | | | | |
| Temperature (° C.) | 325 | 330 | 350 | |
| Time (min.) | 45 | 60 | 90 | |

TABLE 5

| | Comp. Example 1 | Comp. Example 2 | Comp. Example 3 | Comp. Example 4 |
|---|---|---|---|---|
| Low-density hematite particles | | | | |
| Average major axial diameter ($\mu$m) | 0.114 | 0.113 | 0.115 | — |
| Average minor axial diameter ($\mu$m) | 0.0178 | 0.0177 | 0.0176 | — |
| Geometric standard deviation σg (−) | 1.35 | 1.33 | 1.33 | — |
| Aspect ratio (−) | 6.40 | 6.38 | 6.53 | — |
| $S_{BET}$ (m$^2$/g) | 187.3 | 150.5 | 160.8 | — |
| $S_{TEM}$ (m$^2$/g) | 46.6 | 46.9 | 47.1 | — |
| $S_{BET}/S_{TEM}$ (−) | 4.02 | 3.21 | 3.42 | — |
| Al content (wt %) | 0.67 | 0.67 | 0.67 | — |
| Amount of sintering preventive (wt %) | — | — | $SiO_2$: 1.09 | P: 1.10 |
| Soluble Na salt (ppm) | 980 | 889 | 1256 | — |
| Soluble sulfate (ppm) | 635 | 589 | 789 | — |
| pH value of particles (−) | 7.8 | 6.8 | 6.8 | — |
| Resin adsorptivity (%) | 15.6 | — | 17.6 | — |
| | Comp. Example 5 | Comp. Example 6 | Comp. Example 7 | Comp. Example 8 |
| Low-density hematite particles | | | | |
| Average major axial diameter ($\mu$m) | 0.116 | 0.115 | 0.117 | 0.114 |
| Average minor axial diameter ($\mu$m) | 0.0175 | 0.0176 | 0.0177 | 0.0178 |
| Geometric standard deviation σg (−) | 1.34 | 1.35 | 1.35 | 1.35 |
| Aspect ratio (−) | 6.63 | 6.53 | 6.61 | 6.40 |
| $S_{BET}$ (m$^2$/g) | 134.8 | 125.9 | 145.0 | 145.9 |
| $S_{TEM}$ (m$^2$/g) | 47.3 | 47.1 | 46.7 | 46.6 |
| $S_{BET}/S_{TEM}$ (−) | 2.85 | 2.68 | 3.10 | 3.13 |
| Al content (wt %) | 0.67 | 0.68 | 0.67 | 0.67 |
| Amount of sintering preventive (wt %) | P: 1.36 | P: 1.10 | $SiO_2$: 1.65 | $SiO_2$: 1.11 |
| Soluble Na salt (ppm) | 1156 | 999 | 1678 | 1123 |
| Soluble sulfate (ppm) | 675 | 567 | 768 | 760 |
| pH value of particles (−) | 6.3 | 7.1 | 7.7 | 7.3 |
| Resin adsorptivity (%) | — | — | — | — |
| | Comp. Example 9 | Comp. Example 10 | Comp. Example 11 | Comp. Example 12 |
| Low-density hematite particles | | | | |
| Average major axial diameter ($\mu$m) | 0.116 | 0.197 | 0.195 | 0.190 |
| Average minor axial diameter ($\mu$m) | 0.0174 | 0.0288 | 0.0289 | 0.0291 |
| Geometric standard deviation σg (−) | 1.36 | 1.33 | 1.33 | 1.32 |
| Aspect ratio (−) | 6.67 | 6.84 | 6.75 | 6.53 |
| $S_{BET}$ (m$^2$/g) | 156.9 | 257.5 | 246.2 | 98.8 |
| $S_{TEM}$ (m$^2$/g) | 47.5 | 28.7 | 28.6 | 28.5 |
| $S_{BET}/S_{TEM}$ (−) | 3.30 | 8.98 | 8.61 | 3.47 |
| Al content (wt %) | 0.66 | 3.22 | 3.23 | 3.21 |
| Amount of sintering preventive (wt %) | P: 1.09 | P: 2.21 | $SiO_2$: 1.80 | Al: 1.65 |
| Soluble Na salt (ppm) | 1022 | 1324 | 1145 | 876 |
| Soluble sulfate (ppm) | 689 | 675 | 548 | 888 |
| pH value of particles (−) | 7.2 | 7.5 | 7.2 | 6.0 |
| Resin adsorptivity (%) | — | — | — | — |
| | Comp. Example | Comp. Example | Comp. Example | |

TABLE 5-continued

|  | 13 | 14 | 15 |
|---|---|---|---|
| Low-density hematite particles | | | |
| Average major axial diameter (μm) | 0.192 | 0.197✓ | 0.211 |
| Average minor axial diameter (μm) | 0.0298 | 0.0277 | 0.0293 |
| Geometric standard deviation σg (–) | 1.33 | 1.32 | 1.36 |
| Aspect ratio (–) | 6.44 | 7.11 | 7.20 |
| $S_{BET}$ (m²/g) | 101.8 | 136.9 | 126.6 |
| $S_{TEM}$ (m²/g) | 27.8 | 29.7 | 28.1 |
| $S_{BET}/S_{TEM}$ (–) | 3.66 | 4.61 | 4.51 |
| Al content (wt %) | 3.20 | 3.23 | 0.006 |
| Amount of sintering preventive (wt %) | Ti: 1.10 | P: 1.09 | P: 1.63 |
| Soluble Na salt (ppm) | 1361 | 1897 | 1835 |
| Soluble sulfate (ppm) | 2343 | 576 | 872 |
| pH value of particles (–) | 5.3 | 8.0 | 6.8 |
| Resin adsorptivity (%) | — | — | — |

TABLE 6

|  | Example 18 | Example 19 | Example 20 | Example 21 |
|---|---|---|---|---|
| Kind of low-density acicular hematite particles | Example 3 | Example 4 | Example 5 | Example 6 |
| Densification | | | | |
| Temperature (° C.) | 700 | 700 | 680 | 730 |
| Time (min.) | 30 | 30 | 60 | 15 |
| High-density acicular hematite particles | | | | |
| Average major axial diameter (μm) | 0.115 | 0.132 | 0.138 | 0.165 |
| Average minor axial diameter (μm) | 0.0179 | 0.0220 | 0.0223 | 0.0263 |
| Geometric standard deviation σg (–) | 1.35 | 1.34 | 1.34 | 1.37 |
| Aspect ratio (–) | 6.42 | 6.00 | 6.19 | 6.27 |
| $S_{BET}$ (m²/g) | 58.3 | 51.1 | 48.9 | 40.7 |
| $S_{TEM}$ (m²/g) | 46.3 | 37.9 | 37.3 | 31.6 |
| $S_{BET}/S_{TEM}$ (–) | 1.26 | 1.35 | 1.31 | 1.29 |
| Al content (wt %) | 0.67 | 0.67 | 0.67 | 1.25 |
| Amount of sintering preventive (wt %) | $SiO_2$: 0.84 | P: 0.67 | $SiO_2$: 1.38 P: 1.10 | P: 1.61 |
| Soluble Na salt (ppm) | 1633 | 2466 | 2018 | 1968 |
| Soluble sulfate (ppm) | 3378 | 3963 | 3448 | 3607 |
| pH value of particles (–) | 5.3 | 5.7 | 5.8 | 5.1 |

|  | Example 22 | Example 23 | Example 24 | Example 25 |
|---|---|---|---|---|
| Kind of low-density acicular hematite particles | Example 7 | Example 8 | Example 9 | Example 10 |
| Densification | | | | |
| Temperature (° C.) | 650 | 700 | 690 | 700 |
| Time (min.) | 60 | 45 | 30 | 60 |
| High-density acicular hematite particles | | | | |
| Average major axial diameter (μm) | 0.168 | 0.200 | 0.204 | 0.145 |
| Average minor axial diameter (μm) | 0.0261 | 0.0294 | 0.0291 | 0.0244 |
| Geometric standard deviation σg (–) | 1.37 | 1.42 | 1.41 | 1.35 |
| Aspect ratio (–) | 6.44 | 6.80 | 7.01 | 5.94 |
| $S_{BET}$ (m²/g) | 45.3 | 41.8 | 42.5 | 51.0 |
| $S_{TEM}$ (m²/g) | 31.8 | 28.1 | 28.3 | 34.2 |
| $S_{BET}/S_{TEM}$ (–) | 1.43 | 1.49 | 1.50 | 1.49 |
| Al content (wt %) | 1.25 | 0.93 | 0.93 | 0.22 |
| Amount of sintering preventive (wt %) | Al: 3.23 | P: 1.29 | B: 1.78 | $SiO_2$: 1.12 |
| Soluble Na salt (ppm) | 1890 | 2879 | 3330 | 1356 |
| Soluble sulfate (ppm) | 3129 | 3330 | 2980 | 3103 |
| pH value of particles (–) | 5.3 | 6.1 | 6.2 | 5.2 |

|  | Example 26 | Example 27 | Example 28 | Example 29 |
|---|---|---|---|---|
| Kind of low-density acicular hematite particles | Example 11 | Example 12 | Example 13 | Example 14 |
| Densification | | | | |
| Temperature (° C.) | 650 | 700 | 750 | 700 |
| Time (min.) | 60 | 45 | 15 | 30 |
| High-density acicular hematite particles | | | | |
| Average major axial diameter (μm) | 0.146 | 0.107 | 0.095 | 0.188 |
| Average minor axial diameter (μm) | 0.0244 | 0.0184 | 0.0193 | 0.0288 |
| Geometric standard deviation σg (–) | 1.37 | 1.41 | 1.45 | 1.33 |
| Aspect ratio (–) | 5.98 | 5.82 | 4.92 | 6.53 |
| $S_{BET}$ (m²/g) | 50.1 | 57.5 | 51.5 | 40.1 |
| $S_{TEM}$ (m²/g) | 34.2 | 45.4 | 43.9 | 28.8 |
| $S_{BET}/S_{TEM}$ (–) | 1.47 | 1.27 | 1.17 | 1.39 |
| Al content (wt %) | 0.22 | 0.51 | 0.52 | 3.22 |
| Amount of sintering preventive (wt %) | P: 1.10 | P: 7.28 | $SiO_2$: 0.85 P: 1.35 | $SiO_2$: 1.69 |
| Soluble Na salt (ppm) | 1546 | 1678 | 1329 | 1022 |
| Soluble sulfate (ppm) | 2980 | 3789 | 3671 | 3223 |
| pH value of particles (–) | 5.4 | 5.0 | 5.3 | 5.0 |

|  | Example 30 | Example 31 | Example 32 |
|---|---|---|---|
| Kind of low-density acicular hematite particles | Example 15 | Example 16 | Example 17 |
| Densification | | | |
| Temperature (° C.) | 700 | 650 | 680 |
| Time (min.) | 30 | 60 | 60 |
| High-density acicular hematite particles | | | |
| Average major axial diameter (μm) | 0.190 | 0.175 | 0.175 |
| Average minor axial diameter (μm) | 0.0281 | 0.0253 | 0.0255 |
| Geometric standard deviation σg (–) | 1.32 | 1.36 | 1.38 |
| Aspect ratio (–) | 6.76 | 6.92 | 6.86 |
| $S_{BET}$ (m²/g) | 40.5 | 46.4 | 45.9 |
| $S_{TEM}$ (m²/g) | 29.4 | 32.6 | 32.4 |
| $S_{BET}/S_{TEM}$ (–) | 1.38 | 1.42 | 1.42 |
| Al content (wt %) | 3.22 | 4.50 | 4.51 |

TABLE 6-continued

| | | | |
|---|---|---|---|
| Amount of sintering preventive (wt %) | Ti: 3.55 P: 2.44 | P: 1.13 | Al: 3.61 |
| Soluble Na salt (ppm) | 1129 | 1658 | 1659 |
| Soluble sulfate (ppm) | 4895 | 769 | 1345 |
| pH value of particles (−) | 4.8 | 7.8 | 7.1 |

TABLE 7

| | Comp. Example 16 | Comp. Example 17 | Comp. Example 18 | Comp. Example 19 |
|---|---|---|---|---|
| Kind of low-density acicular hematite particles | Comp. Example 1 | Comp. Example 2 | Comp. Example 4 | Comp. Example 5 |
| Densification | | | | |
| Temperature (° C.) | 700 | 650 | 690 | 710 |
| Time (min.) | 15 | 15 | 30 | 60 |
| High-density acicular hematite particles | | | | |
| Average major axial diameter (μm) | 0.076 | 0.086 | 0.121 | 0.115 |
| Average minor axial diameter (μm) | 0.0321 | 0.0256 | 0.0198 | 0.0176 |
| Geometric standard deviation σg (−) | 1.96 | 1.71 | 1.56 | 1.35 |
| Aspect ratio (−) | 2.37 | 3.36 | 6.11 | 6.53 |
| $S_{BET}$ (m²/g) | 11.5 | 21.9 | 39.6 | 53.2 |
| $S_{TEM}$ (m²/g) | 29.0 | 34.5 | 42.0 | 47.1 |
| $S_{BET}/S_{TEM}$ (−) | 0.40 | 0.63 | 0.94 | 1.13 |
| Al content (wt %) | 0.67 | 0.67 | 0.67 | 0.67 |
| Amount of sintering preventive (wt %) | — | — | P: 1.09 | P: 1.36 |
| Soluble Na salt (ppm) | 1754 | 1845 | 1657 | 1489 |
| Soluble sulfate (ppm) | 3157 | 3765 | 3890 | 3678 |
| pH value of particles (−) | 5.5 | 5.6 | 5.2 | 5.1 |
| Resin adsorptivity (%) | 12.6 | 18.8 | 14.4 | 21.6 |

| | Comp. Example 20 | Comp. Example 21 | Comp. Example 22 | Comp. Example 23 |
|---|---|---|---|---|
| Kind of low-density acicular hematite particles | Comp. Example 6 | Comp. Example 7 | Comp. Example 8 | Comp. Example 9 |
| Densification | | | | |
| Temperature (° C.) | 560 | 720 | 730 | 520 |
| Time (min.) | 90 | 45 | 10 | 60 |
| High-density acicular hematite particles | | | | |
| Average major axial diameter (μm) | 0.116 | 0.116 | 0.115 | 0.116 |
| Average minor axial diameter (μm) | 0.0175 | 0.0177 | 0.0177 | 0.0174 |
| Geometric standard deviation σg (−) | 1.34 | 1.35 | 1.35 | 1.34 |
| Aspect ratio (−) | 6.63 | 6.55 | 6.50 | 6.67 |
| $S_{BET}$ (m²/g) | 61.2 | 53.9 | 58.5 | 73.5 |
| $S_{TEM}$ (m²/g) | 47.3 | 46.8 | 46.8 | 47.5 |
| $S_{BET}/S_{TEM}$ (−) | 1.29 | 1.15 | 1.25 | 1.55 |
| Al content (wt %) | 0.68 | 0.67 | 0.67 | 0.66 |
| Amount of sintering preventive (wt %) | P: 1.12 | SiO₂: 1.63 | SiO₂: 1.12 | P: 1.11 |
| Soluble Na salt (ppm) | 1580 | 1462 | 1765 | 1487 |
| Soluble sulfate (ppm) | 3217 | 3649 | 3795 | 3098 |
| pH value of particles (−) | 5.1 | 5.5 | 5.6 | 5.6 |
| Resin adsorptivity (%) | — | — | — | — |

| | Comp. Example 24 | Comp. Example 25 | Comp. Example 26 | Comp. Example 27 |
|---|---|---|---|---|
| Kind of low-density acicular hematite particles | Comp. Example 10 | Comp. Example 11 | Comp. Example 12 | Comp. Example 13 |
| Densification | | | | |
| Temperature (° C.) | 650 | 650 | 600 | 750 |
| Time (min.) | 60 | 45 | 15 | 30 |
| High-density acicular hematite particles | | | | |
| Average major axial diameter (μm) | 0.195 | 0.195 | 0.188 | 0.190 |
| Average minor axial diameter (μm) | 0.0289 | 0.0292 | 0.0295 | 0.0300 |
| Geometric standard deviation σg (−) | 1.34 | 1.33 | 1.32 | 1.33 |
| Aspect ratio (−) | 6.75 | 6.68 | 6.37 | 6.33 |
| $S_{BET}$ (m²/g) | 41.0 | 43.9 | 51.5 | 40.1 |
| $S_{TEM}$ (m²/g) | 28.6 | 28.3 | 28.1 | 27.7 |
| $S_{BET}/S_{TEM}$ (−) | 1.43 | 1.55 | 1.83 | 1.45 |
| Al content (wt %) | 3.22 | 3.23 | 3.21 | 3.20 |
| Amount of sintering preventive (wt %) | P: 2.25 | SiO₂: 1.83 | Al: 1.63 | Ti: 1.10 |
| Soluble Na salt (ppm) | 2167 | 2156 | 1256 | 1190 |
| Soluble sulfate (ppm) | 3679 | 3264 | 3690 | 4678 |
| pH value of particles (−) | 6.1 | 6.0 | 5.2 | 4.9 |
| Resin adsorptivity (%) | 36.5 | — | — | — |

| | Comp. Example 28 | Comp. Example 29 |
|---|---|---|
| Kind of low-density acicular hematite particles | Comp. Example 14 | Comp. Example 15 |
| Densification | | |
| Temperature (° C.) | 450 | 680 |
| Time (min.) | 30 | 30 |
| High-density acicular hematite particles | | |
| Average major axial diameter (μm) | 0.198 | 0.206 |
| Average minor axial diameter (μm) | 0.0278 | 0.0299 |
| Geometric standard deviation σg (−) | 1.32 | 1.37 |
| Aspect ratio (−) | 7.12 | 6.89 |
| $S_{BET}$ (m²/g) | 73.0 | 38.7 |
| $S_{TEM}$ (m²/g) | 29.6 | 27.6 |
| $S_{BET}/S_{TEM}$ (−) | 2.47 | 1.40 |
| Al content (wt %) | 3.23 | 0.006 |
| Amount of sintering preventive (wt %) | P: 1.10 | P: 1.65 |
| Soluble Na salt (ppm) | 2456 | 1280 |
| Soluble sulfate (ppm) | 3356 | 3103 |
| pH value of particles (−) | 5.9 | 5.6 |
| Resin adsorptivity (%) | — | — |

TABLE 8

|  | Example 33 | Example 34 | Example 35 | Example 36 | Example 37 |
|---|---|---|---|---|---|
| Kind of high-density acicular hematite particles | Example 18 | Example 19 | Example 20 | Example 21 | Example 22 |
| Wet pulverization |  |  |  |  |  |
| Yes or No | Yes | Yes | Yes | Yes | Yes |
| Amount of residue on sieve (wt %) | 0 | 0 | 0 | 0 | 0 |
| Heat treatment with aqueous alkali solution |  |  |  |  |  |
| pH value (−) | 13.8 | 13.5 | 13.6 | 13.4 | 13.1 |
| Temperature (° C.) | 98 | 95 | 93 | 90 | 97 |
| Time (min.) | 180 | 210 | 180 | 180 | 120 |

|  | Example 38 | Example 39 | Example 40 | Example 41 | Example 42 |
|---|---|---|---|---|---|
| Kind of high-density acicular hematite particles | Example 23 | Example 24 | Example 25 | Example 26 | Example 27 |
| Wet pulverization |  |  |  |  |  |
| Yes or No | Yes | Yes | Yes | Yes | Yes |
| Amount of residue on sieve (wt %) | 0 | 0 | 0 | 0 | 0 |
| Heat treatment with aqueous alkali solution |  |  |  |  |  |
| pH value (−) | 13.8 | 13.7 | 13.4 | 13.7 | 13.5 |
| Temperature (° C.) | 95 | 93 | 93 | 95 | 93 |
| Time (min.) | 90 | 120 | 180 | 180 | 140 |

|  | Example 43 | Example 44 | Example 45 | Example 46 | Example 47 |
|---|---|---|---|---|---|
| Kind of high-density acicular hematite particles | Example 28 | Example 29 | Example 30 | Example 31 | Example 32 |
| Wet pulverization |  |  |  |  |  |
| Yes or No | Yes | Yes | Yes | Yes | Yes |
| Amount of residue on sieve (wt %) | 0 | 0 | 0 | 0 | 0 |
| Heat treatment with aqueous alkali solution |  |  |  |  |  |
| pH value (−) | 13.5 | 13.1 | 13.1 | 13.3 | 13.7 |
| Temperature (° C.) | 98 | 97 | 90 | 91 | 95 |
| Time (min.) | 120 | 180 | 90 | 180 | 180 |

TABLE 9

|  | Example 33 | Example 34 | Example 35 | Example 36 |
|---|---|---|---|---|
| Acicular hematite particles washed with water after heat treatment with aqueous alkali solution |  |  |  |  |
| Average major axial diameter (μm) | 0.115 | 0.133 | 0.137 | 0.166 |
| Average minor axial diameter (μm) | 0.0179 | 0.0219 | 0.0223 | 0.0262 |
| Geometric standard deviation σg (−) | 1.34 | 1.35 | 1.34 | 1.37 |
| Aspect ratio (−) | 6.42 | 6.02 | 6.14 | 6.34 |
| $S_{BET}$ (m$^2$/g) | 57.4 | 52.2 | 49.0 | 41.2 |
| $S_{TEM}$ (m$^2$/g) | 46.3 | 38.0 | 37.3 | 31.7 |
| $S_{BET}/S_{TEM}$ (−) | 1.24 | 1.37 | 1.31 | 1.30 |
| Al content (wt %) | 0.67 | 0.67 | 0.67 | 1.25 |
| Amount of sintering preventive (wt %) | SiO$_2$: 0.84 | P: 0.38 | SiO$_2$: 1.37 P: 0.55 | P: 0.86 |
| Soluble Na salt (ppm) | 111 | 121 | 98 | 134 |
| Soluble sulfate (ppm) | 12 | 15 | 21 | 11 |
| pH value of particles (−) | 9.1 | 9.3 | 8.9 | 9.5 |
| Resin adsorptivity (%) | 78.8 | 80.6 | 83.6 | 71.2 |

|  | Example 37 | Example 38 | Example 39 | Example 40 |
|---|---|---|---|---|
| Acicular hematite particles washed with water after heat treatment with aqueous alkali solution |  |  |  |  |
| Average major axial diameter (μm) | 0.168 | 0.199 | 0.202 | 0.144 |
| Average minor axial diameter (μm) | 0.0261 | 0.0293 | 0.0291 | 0.0244 |
| Geometric standard deviation σg (−) | 1.37 | 1.41 | 1.41 | 1.35 |
| Aspect ratio (−) | 6.44 | 6.79 | 6.94 | 5.90 |
| $S_{BET}$ (m$^2$/g) | 45.5 | 41.9 | 43.1 | 51.9 |
| $S_{TEM}$ (m$^2$/g) | 31.8 | 28.2 | 28.3 | 34.2 |
| $S_{BET}/S_{TEM}$ (−) | 1.43 | 1.49 | 1.52 | 1.52 |
| Al content (wt %) | 1.25 | 0.93 | 0.93 | 0.22 |
| Amount of sintering preventive (wt %) | Al: 3.23 | P: 0.61 | B: 0.24 | SiO$_2$: 1.13 |
| Soluble Na salt (ppm) | 142 | 110 | 108 | 89 |
| Soluble sulfate (ppm) | 12 | 21 | 16 | 9 |
| pH value of particles (−) | 9.6 | 9.2 | 9.0 | 8.8 |
| Resin adsorptivity (%) | 78.1 | 88.9 | 85.5 | 80.1 |

|  | Example 41 | Example 42 | Example 43 | Example 44 |
|---|---|---|---|---|
| Acicular hematite particles washed with water after heat treatment with aqueous alkali solution |  |  |  |  |
| Average major axial diameter (μm) | 0.145 | 0.106 | 0.095 | 0.188 |
| Average minor axial diameter (μm) | 0.0244 | 0.0183 | 0.0193 | 0.0287 |
| Geometric standard deviation σg (−) | 1.37 | 1.41 | 1.45 | 1.33 |
| Aspect ratio (−) | 5.94 | 5.79 | 4.92 | 6.55 |
| $S_{BET}$ (m$^2$/g) | 50.5 | 58.0 | 52.3 | 40.3 |
| $S_{TEM}$ (m$^2$/g) | 34.2 | 45.7 | 43.9 | 28.8 |
| $S_{BET}/S_{TEM}$ (−) | 1.48 | 1.27 | 1.19 | 1.40 |
| Al content (wt %) | 0.22 | 0.51 | 0.52 | 3.22 |
| Amount of sintering preventive (wt %) | P: 0.36 | P: 2.89 | SiO$_2$: 0.83 P: 0.71 | SiO$_2$: 1.68 |
| Soluble Na salt (ppm) | 98 | 124 | 68 | 96 |
| Soluble sulfate (ppm) | 16 | 34 | 46 | 21 |
| pH value of particles (−) | 8.8 | 9.3 | 9.0 | 8.9 |

TABLE 9-continued

|  | | | |
|---|---|---|---|
| Resin adsorptivity (%) | 79.5 | 76.8 | 71.1 | 84.3 |

|  | Example 45 | Example 46 | Example 47 |
|---|---|---|---|
| Acicular hematite particles washed with water after heat treatment with aqueous alkali solution | | | |
| Average major axial diameter ($\mu$m) | 0.189 | 0.175 | 0.174 |
| Average minor axial diameter ($\mu$m) | 0.0281 | 0.0253 | 0.0255 |
| Geometric standard deviation $\sigma g$ (–) | 1.32 | 1.35 | 1.37 |
| Aspect ratio (–) | 6.73 | 6.92 | 6.82 |
| $S_{BET}$ (m$^2$/g) | 41.1 | 46.9 | 44.9 |
| $S_{TEM}$ (m$^2$/g) | 29.4 | 32.6 | 32.4 |
| $S_{BET}/S_{TEM}$ (–) | 1.40 | 1.44 | 1.39 |
| Al content (wt %) | 3.22 | 4.50 | 4.51 |
| Amount of sintering preventive (wt %) | Ti: 3.54 P: 1.13 | P: 0.56 | Al: 3.60 |
| Soluble Na salt (ppm) | 87 | 129 | 100 |
| Soluble sulfate (ppm) | 16 | 15 | 5 |
| pH value of particles (–) | 9.2 | 9.3 | 9.2 |
| Resin adsorptivity (%) | 80.8 | 71.9 | 84.6 |

TABLE 10

|  | Comp. Example 30 | Comp. Example 31 | Comp. Example 32 | Comp. Example 33 | Comp. Example 34 |
|---|---|---|---|---|---|
| Kind of acicular hematite particles | Comp. Example 20 | Comp. Example 21 | Comp. Example 22 | Comp. Example 23 | Comp. Example 25 |
| Wet pulverization | | | | | |
| Yes or No | Yes | Yes | Yes | No | No |
| Amount of residue on sieve (wt %) | 0 | 0 | 0 | 18.6 | 29.5 |
| Heat treatment with aqueous alkali solution | | | | | |
| pH value (–) | — | 12.1 | 13.2 | 13.2 | 10.3 |
| Temperature (° C.) | — | 95 | 68 | 90 | 97 |
| Time (min.) | — | 180 | 180 | 180 | 180 |

|  | Comp. Example 35 | Comp. Example 36 | Comp. Example 37 | Comp. Example 38 |
|---|---|---|---|---|
| Kind of acicular hematite particles | Comp. Example 26 | Comp. Example 27 | Comp. Example 28 | Comp. Example 29 |
| Wet pulverization | | | | |
| Yes or No | No | No | Yes | Yes |
| Amount of residue on sieve (wt %) | 30.4 | 21.6 | 0 | 0 |
| Heat treatment with aqueous alkali solution | | | | |
| pH value (–) | 13.5 | 13.4 | 9.3 | 13.6 |
| Temperature (° C.) | 95 | 93 | 95 | 93 |
| Time (min.) | 180 | 120 | 120 | 180 |

TABLE 11

|  | Comp. Example 30 | Comp. Example 31 | Comp. Example 32 |
|---|---|---|---|
| Acicular hematite particles washed with water after heat treatment with aqueous alkali solution | | | |
| Average major axial diameter ($\mu$m) | 0.115 | 0.116 | 0.115 |
| Average minor axial diameter ($\mu$m) | 0.175 | 0.0176 | 0.0177 |
| Geometric standard deviation $\sigma g$ (–) | 1.34 | 1.35 | 1.34 |
| Aspect ratio (–) | 6.57 | 6.59 | 6.50 |
| $S_{BET}$ (m$^2$/g) | 62.0 | 53.8 | 58.4 |
| $S_{TEM}$ (m$^2$/g) | 47.3 | 47.0 | 46.8 |
| $S_{BET}/S_{TEM}$ (–) | 1.31 | 1.14 | 1.25 |
| Al content (wt %) | 0.68 | 0.67 | 0.67 |
| Amount of sintering preventive (wt %) | P: 1.12 | SiO$_2$: 1.62 | SiO$_2$: 1.11 |
| Soluble Na salt (ppm) | 712 | 413 | 378 |
| Soluble sulfate (ppm) | 436 | 336 | 168 |
| pH value of particles (–) | 6.7 | 7.0 | 8.2 |
| Resin adsorptivity (%) | 64.1 | 59.3 | 64.6 |

|  | Comp. Example 33 | Comp. Example 34 | Comp. Example 35 |
|---|---|---|---|
| Acicular hematite particles washed with water after heat treatment with aqueous alkali solution | | | |
| Average major axial diameter ($\mu$m) | 0.117 | 0.198 | 0.192 |
| Average minor axial diameter ($\mu$m) | 0.0177 | 0.0294 | 0.0297 |
| Geometric standard deviation $\sigma g$ (–) | 1.37 | 1.37 | 1.41 |
| Aspect ratio (–) | 6.61 | 6.73 | 6.46 |
| $S_{BET}$ (m$^2$/g) | 73.9 | 43.0 | 51.9 |
| $S_{TEM}$ (m$^2$/g) | 46.7 | 28.1 | 27.9 |
| $S_{BET}/S_{TEM}$ (–) | 1.58 | 1.53 | 1.86 |
| Al content (wt %) | 0.66 | 3.23 | 3.21 |
| Amount of sintering preventive (wt %) | P: 0.61 | SiO$_2$: 1.80 | Al: 1.65 |
| Soluble Na salt (ppm) | 490 | 698 | 468 |
| Soluble sulfate (ppm) | 225 | 289 | 265 |
| pH value of particles (–) | 7.3 | 7.4 | 7.0 |
| Resin adsorptivity (%) | 53.1 | 46.5 | 41.6 |

|  | Comp. Example | Comp. Example | Comp. Example |
|---|---|---|---|

TABLE 11-continued

|  | 36 | 37 | 38 |
|---|---|---|---|
| Acicular hematite particles washed with water after heat treatment with aqueous alkali solution | | | |
| Average major axial diameter ($\mu$m) | 0.191 | 0.197 | 0.206 |
| Average minor axial diameter ($\mu$m) | 0.0302 | 0.0274 | 0.0300 |
| Geometric standard deviation $\sigma$g (–) | 1.41 | 1.37 | 1.35 |
| Aspect ratio (–) | 6.32 | 7.19 | 6.87 |
| $S_{BET}$ (m$^2$/g) | 40.7 | 74.8 | 37.8 |
| $S_{TEM}$ (m$^2$/g) | 27.5 | 30.0 | 27.5 |
| $S_{BET}/S_{TEM}$ (–) | 1.48 | 2.49 | 1.37 |
| Al content (wt %) | 3.20 | 3.23 | 0.006 |
| Amount of sintering preventive (wt %) | Ti: 1.00 | P: 0.96 | P: 0.61 |
| Soluble Na salt (ppm) | 435 | 549 | 116 |
| Soluble sulfate (ppm) | 214 | 310 | 56 |
| pH value of particles (–) | 7.5 | 7.1 | 8.8 |
| Resin adsorptivity (%) | 58.6 | 60.1 | 63.6 |

TABLE 12

|  | Example 48 | Example 49 | Example 50 | Example 51 |
|---|---|---|---|---|
| Kind of acicular hematite particles treated with aqueous alkali solution | Example 33 | Example 34 | Example 35 | Example 36 |
| Surface treatment | | | | |
| Kind | Sodium aluminate | #3 Water glass | Aluminum sulfate | Colloidal silica |
| Amount added (wt %) Coating material | 5.0 | 1.0 | 1.5 | 3.0 |
| Kind | Al* | Si* | Al* | Si* |
| Amount (wt %) | 4.76 | 0.98 | 1.47 | 2.90 |

|  | Example 52 | Example 53 |
|---|---|---|
| Kind of acicular hematite particles treated with aqueous alkali solution | Example 37 | Example 38 |
| Surface treatment | | |
| Kind | Aluminum acetate/ #3 Water glass | Aluminum sulfate/ #3 Water glass |
| Amount added (wt %) Coating material | 3.0/1.0 | 0.5/3.0 |
| Kind | Al*/Si* | Al*/Si* |
| Amount (wt %) | 2.91/0.97 | 0.49/2.86 |

|  | Example 54 | Example 55 | Example 56 |
|---|---|---|---|
| Kind of acicular hematite particles treated with aqueous alkali solution | Example 39 | Example 40 | Example 41 |
| Surface treatment | | | |
| Kind | Sodium aluminate | Sodium aluminate/ Colloidal silica | Sodium aluminate |
| Amount added (wt %) Coating material | 10. | 1.5/2.0 | 0.5 |
| Kind | Al* | Al*/Si* | Al* |
| Amount (wt %) | 9.09 | 1.48/1.96 | 0.49 |

|  | Example 57 | Example 58 | Example 59 |
|---|---|---|---|
| Kind of acicular hematite particles treated with aqueous alkali solution | Example 44 | Example 43 | Example 45 |
| Surface treatment | | | |
| Kind | Aluminum acetate | #3 Water glass | Sodium aluminate/ Aluminum acetate |
| Amount added (wt %) Coating material | 15.0 | 5.0 | 2.0/4.0 |
| Kind | Al* | Si* | Al* |
| Amount (wt %) | 13.05 | 4.75 | 5.80 |

|  | Example 60 | Example 61 | Example 62 |
|---|---|---|---|
| Kind of acicular hematite particles treated with aqueous alkali solution | Example 45 | Example 46 | Example 47 |
| Surface treatment | | | |
| Kind | #3 Water glass/ Colloidal silica | Sodium aluminate | Sodium aluminate |
| Amount added (wt %) Coating material | 0.2/0.3 | 7.5 | 20.0 |
| Kind | Si* | Al* | Al* |
| Amount (wt %) | 0.46 | 6.96 | 16.64 |

Al*: aluminum hydroxide, Si*: silicon oxide

TABLE 13

|  | Example 48 | Example 49 | Example 50 | Example 51 |
|---|---|---|---|---|
| Acicular hematite particles washed with water after surface treatment | | | | |
| Average major axial diameter ($\mu$m) | 0.115 | 0.133 | 0.137 | 0.165 |
| Average minor axial diameter ($\mu$m) | 0.0179 | 0.0220 | 0.0222 | 0.0262 |
| Geometric standard deviation $\sigma$g (–) | 1.35 | 1.35 | 1.34 | 1.36 |
| Aspect ratio (–) | 6.42 | 6.05 | 6.17 | 6.30 |
| $S_{BET}$ (m$^2$/g) | 57.2 | 54.0 | 47.8 | 43.6 |
| $S_{TEM}$ (m$^2$/g) | 46.3 | 37.9 | 37.5 | 31.7 |
| $S_{BET}/S_{TEM}$ (–) | 1.23 | 1.43 | 1.28 | 1.38 |
| Al content (wt %) | 0.67 | 0.67 | 0.67 | 1.25 |
| Amount of sintering preventive (wt %) | SiO$_2$: 0.81 | P: 0.37 | SiO$_2$: 1.35 P: 0.52 | P: 0.81 |
| Soluble Na salt (ppm) | 123 | 112 | 89 | 125 |
| Soluble sulfate (ppm) | 19 | 23 | 43 | 20 |
| pH value of particles (–) | 9.2 | 9.1 | 9.4 | 9.0 |
| Resin adsorptivity (%) | 80.1 | 81.5 | 80.8 | 88.3 |

TABLE 13-continued

|  | Example 52 | Example 53 | Example 54 | Example 55 |
|---|---|---|---|---|
| Acicular hematite particles washed with water after surface treatment | | | | |
| Average major axial diameter (μm) | 0.167 | 0.200 | 0.201 | 0.144 |
| Average minor axial diameter (μm) | 0.0261 | 0.0293 | 0.0292 | 0.0244 |
| Geometric standard deviation σg (−) | 1.37 | 1.42 | 1.41 | 1.35 |
| Aspect ratio (−) | 6.40 | 6.83 | 6.88 | 5.90 |
| $S_{BET}$ (m²/g) | 46.6 | 43.9 | 43.9 | 53.8 |
| $S_{TEM}$ (m²/g) | 31.8 | 28.2 | 28.3 | 34.2 |
| $S_{BET}/S_{TEM}$ (−) | 1.47 | 1.56 | 1.55 | 1.57 |
| Al content (wt %) | 1.25 | 0.93 | 0.93 | 0.22 |
| Amount of sintering preventive (wt %) | Al: 3.19 | P: 0.56 | B: 0.15 | SiO₂: 1.10 |
| Soluble Na salt (ppm) | 138 | 144 | 100 | 134 |
| Soluble sulfate (ppm) | 8 | 49 | 11 | 12 |
| pH value of particles (−) | 9.5 | 8.9 | 9.3 | 9.3 |
| Resin adsorptivity (%) | 81.9 | 93.6 | 94.2 | 88.9 |

|  | Example 56 | Example 57 | Example 58 | Example 59 |
|---|---|---|---|---|
| Acicular hematite particles washed with water after surface treatment | | | | |
| Average major axial diameter (μm) | 0.144 | 0.106 | 0.096 | 0.189 |
| Average minor axial diameter (μm) | 0.0244 | 0.0183 | 0.0193 | 0.0288 |
| Geometric standard deviation σg (−) | 1.35 | 1.41 | 1.42 | 1.33 |
| Aspect ratio (−) | 5.90 | 5.79 | 4.97 | 6.56 |
| $S_{BET}$ (m²/g) | 50.0 | 56.8 | 54.1 | 38.9 |
| $S_{TEM}$ (m²/g) | 34.2 | 45.7 | 43.9 | 28.7 |
| $S_{BET}/S_{TEM}$ (−) | 1.46 | 1.24 | 1.23 | 1.35 |
| Al content (wt %) | 0.22 | 0.51 | 0.52 | 3.22 |
| Amount of sintering preventive (wt %) | P: 0.36 | P: 2.66 | SiO₂: 0.80 P: 0.65 | SiO₂: 1.58 |
| Soluble Na salt (ppm) | 53 | 96 | 115 | 88 |
| Soluble sulfate (ppm) | 23 | 37 | 21 | 15 |
| pH value of particles (−) | 8.8 | 8.9 | 9.0 | 9.1 |
| Resin adsorptivity (%) | 85.6 | 77.6 | 75.6 | 90.6 |

|  | Example 60 | Example 61 | Example 62 |
|---|---|---|---|
| Acicular hematite particles washed with water after surface treatment | | | |
| Average major axial diameter (μm) | 0.189 | 0.175 | 0.175 |
| Average minor axial diameter (μm) | 0.0282 | 0.0253 | 0.0254 |
| Geometric standard deviation σg (−) | 1.33 | 1.36 | 1.36 |
| Aspect ratio (−) | 6.70 | 6.92 | 6.89 |
| $S_{BET}$ (m²/g) | 43.6 | 47.4 | 48.1 |
| $S_{TEM}$ (m²/g) | 29.3 | 32.6 | 32.5 |
| $S_{BET}/S_{TEM}$ (−) | 1.49 | 1.45 | 1.48 |
| Al content (wt %) | 3.22 | 4.50 | 4.51 |
| Amount of sintering preventive (wt %) | Ti: 3.32 P: 1.10 | P: 0.51 | Al: 3.16 |
| Soluble Na salt (ppm) | 129 | 76 | 102 |
| Soluble sulfate (ppm) | 13 | 8 | 23 |
| pH value of particles (−) | 9.6 | 9.2 | 9.1 |
| Resin adsorptivity (%) | 83.6 | 81.0 | 91.6 |

TABLE 14

|  | Example 63 | Example 64 | Example 65 | Example 66 | Example 67 |
|---|---|---|---|---|---|
| Production of non-magnetic coating film composition | | | | | |
| Kind of acicular hematite particles | Example 33 | Example 34 | Example 35 | Example 36 | Example 37 |
| Weight ratio of particles and resin (−) | 5.0 | 5.0 | 5.0 | 5.0 | 5.0 |
| Non-magnetic coating film composition | | | | | |
| Viscosity (cP) | 435 | 410 | 563 | 384 | 410 |
| Non-magnetic undercoat layer | | | | | |
| Thickness (μm) | 3.4 | 3.4 | 3.5 | 3.5 | 3.4 |
| Gloss (%) | 206 | 200 | 198 | 198 | 196 |
| Ra (nm) | 6.8 | 7.2 | 7.5 | 7.0 | 8.0 |
| Young's modulus (−) (relative value) | 121 | 122 | 124 | 127 | 129 |

|  | Example 68 | Example 69 | Example 70 | Example 71 | Example 72 |
|---|---|---|---|---|---|
| Production of non-magnetic coating film composition | | | | | |
| Kind of acicular hematite particles | Example 38 | Example 39 | Example 40 | Example 41 | Example 42 |
| Weight ratio of particles and resin (−) | 5.0 | 5.0 | 5.0 | 5.0 | 5.0. |
| Non-magnetic coating film composition | | | | | |
| Viscosity (cP) | 205 | 230 | 435 | 410 | 845 |
| Non-magnetic undercoat layer | | | | | |
| Thickness (μm) | 3.6 | 3.2 | 3.4 | 3.5 | 3.8 |
| Gloss (%) | 191 | 193 | 205 | 202 | 211 |
| Ra (nm) | 8.6 | 8.8 | 7.0 | 6.8 | 6.0 |
| Young's modulus (−) (relative value) | 131 | 135 | 118 | 119 | 116 |

TABLE 14-continued

|  | 73 | 74 | 75 | 76 | 77 |
|---|---|---|---|---|---|
| Production of non-magnetic coating film composition | | | | | |
| Kind of acicular hematite particles | Example 43 | Example 44 | Example 45 | Example 46 | Example 47 |
| Weight ratio of particles and resin (–) | 5.0 | 5.0 | 5.0 | 5.0 | 5.0 |
| Non-magnetic coating film composition | | | | | |
| Viscosity (cP) | 896 | 230 | 230 | 205 | 205 |
| Non-magnetic undercoat layer | | | | | |
| Thickness (μm) | 3.7 | 3.3 | 3.4 | 3.2 | 3.3 |
| Gloss (%) | 214 | 195 | 197 | 199 | 195 |
| Ra (nm) | 6.3 | 6.8 | 7.0 | 6.8 | 6.7 |
| Young's modulus (–) (relative value) | 118 | 128 | 126 | 122 | 125 |

TABLE 15

|  | Example 78 | Example 79 | Example 80 | Example 81 | Example 82 |
|---|---|---|---|---|---|
| Production of non-magnetic coating film composition | | | | | |
| Kind of acicular hematite particles | Example 48 | Example 49 | Example 50 | Example 51 | Example 52 |
| Weight ratio of particles and resin (–) | 5.0 | 5.0 | 5.0 | 5.0 | 5.0 |
| Non-magnetic coating film composition | | | | | |
| Viscosity (cP) | 384 | 435 | 435 | 307 | 384 |
| Non-magnetic undercoat layer | | | | | |
| Thickness (μm) | 3.3 | 3.3 | 3.4 | 3.3 | 3.4 |
| Gloss (%) | 216 | 206 | 202 | 205 | 200 |
| Ra (nm) | 6.0 | 6.6 | 6.8 | 6.4 | 7.0 |
| Young's modulus (–) (relative value) | 124 | 124 | 126 | 129 | 131 |

|  | Example 83 | Example 84 | Example 85 | Example 86 | Example 87 |
|---|---|---|---|---|---|
| Production of non-magnetic coating film composition | | | | | |
| Kind of acicular hematite particles | Example 53 | Example 54 | Example 55 | Example 56 | Example 57 |
| Weight ratio of particles and resin (–) | 5.0 | 5.0 | 5.0 | 5.0 | 5.0 |
| Non-magnetic coating film composition | | | | | |
| Viscosity (cP) | 154 | 128 | 384 | 333 | 742 |
| Non-magnetic undercoat layer | | | | | |
| Thickness (μm) | 3.5 | 3.5 | 3.4 | 3.3 | 3.5 |
| Gloss (%) | 196 | 196 | 206 | 206 | 216 |
| Ra (nm) | 7.5 | 7.9 | 6.8 | 6.2 | 5.4 |
| Young's modulus (–) (relative value) | 135 | 136 | 121 | 123 | 120 |

|  | Example 88 | Example 89 | Example 90 | Example 91 | Example 92 |
|---|---|---|---|---|---|
| Production of non-magnetic coating film composition | | | | | |
| Kind of acicular hematite particles | Example 58 | Example 59 | Example 60 | Example 61 | Example 62 |
| Weight ratio of particles and resin (–) | 5.0 | 5.0 | 5.0 | 5.0 | 5.0 |
| Non-magnetic coating film composition | | | | | |
| Viscosity (cP) | 712 | 179 | 154 | 179 | 179 |
| Non-magnetic undercoat layer | | | | | |
| Thickness (μm) | 3.5 | 3.3 | 3.4 | 3.3 | 3.3 |
| Gloss (%) | 218 | 198 | 198 | 201 | 199 |
| Ra (nm) | 5.9 | 6.0 | 6.3 | 6.1 | 6.3 |
| Young's modulus (–) (relative value) | 121 | 130 | 128 | 123 | 130 |

TABLE 16

|  | Comp. Example 39 | Comp. Example 40 | Comp. Example 41 | Comp. Example 42 | Comp. Example 43 |
|---|---|---|---|---|---|
| Production of non-magnetic coating film composition | | | | | |
| Kind of acicular hematite particles | Comp. Example 1 | Comp. Example 16 | Comp. Example 17 | Comp. Example 3 | Comp. Example 18 |
| Weight ratio of particles and resin (–) | 5.0 | 5.0 | 5.0 | 5.0 | 5.0 |
| Non-magnetic coating film composition | | | | | |
| Viscosity (cP) | 12800 | 230 | 333 | 11776 | 563 |
| Non-magnetic undercoat layer | | | | | |
| Thickness (μm) | 3.8 | 3.2 | 3.3 | 4.0 | 3.7 |
| Gloss (%) | 56 | 34 | 78 | 80 | 148 |

TABLE 16-continued

| | | | | | |
|---|---|---|---|---|---|
| Ra (nm) | 84.0 | 116.0 | 56.7 | 46.8 | 31.7 |
| Young's modulus (–) (relative value) | 84 | 76 | 88 | 97 | 103 |

| | Comp. Example 44 | Comp. Example 45 | Comp. Example 46 | Comp. Example 47 | Comp. Example 48 |
|---|---|---|---|---|---|
| Production of non-magnetic coating film composition | | | | | |
| Kind of acicular hematite particles | Comp. Example 19 | Comp. Example 30 | Comp. Example 31 | Comp. Example 32 | Comp. Example 33 |
| Weight ratio of particles and resin (–) | 5.0 | 5.0 | 5.0 | 5.0 | 5.0 |
| Non-magnetic coating film composition | | | | | |
| Viscosity (cP) | 435 | 563 | 435 | 384 | 512 |
| Non-magnetic undercoat layer | | | | | |
| Thickness ($\mu$m) | 3.5 | 3.7 | 3.3 | 3.5 | 3.7 |
| Gloss (%) | 156 | 168 | 175 | 182 | 164 |
| Ra (nm) | 28.5 | 16.9 | 15.2 | 13.1 | 18.8 |
| Young's modulus (–) (relative value) | 101 | 106 | 101 | 107 | 103 |

| | Comp. Example 49 | Comp. Example 50 | Comp. Example 51 | Comp. Example 52 | Comp. Example 53 | Comp. Example 54 |
|---|---|---|---|---|---|---|
| Production of non-magnetic coating film composition | | | | | | |
| Kind of acicular hematite particles | Comp. Example 24 | Comp. Example 34 | Comp. Example 35 | Comp. Example 36 | Comp. Example 37 | Comp. Example 38 |
| Weight ratio of particles and resin (–) | 5.0 | 5.0 | 5.0 | 5.0 | 5.0 | 5.0 |
| Non-magnetic coating film composition | | | | | | |
| Viscosity (cP) | 410 | 614 | 666 | 742 | 410 | 333 |
| Non-magnetic undercoat layer | | | | | | |
| Thickness ($\mu$m) | 3.7 | 3.6 | 3.8 | 3.4 | 3.5 | 3.2 |
| Gloss (%) | 160 | 146 | 139 | 148 | 166 | 198 |
| Ra (nm) | 20.2 | 25.5 | 38.6 | 34.5 | 20.4 | 8.0 |
| Young's modulus (–) (relative value) | 109 | 106 | 107 | 109 | 112 | 128 |

TABLE 17

| | Ex. 93 | Ex. 94 | Ex. 95 | Ex. 96 | Ex. 97 |
|---|---|---|---|---|---|
| Magnetic recording medium using magnetic iron-based metal particles | | | | | |
| Kind of non-magnetic undercoat layer | Ex. 63 | Ex. 64 | Ex. 65 | Ex. 66 | Ex. 67 |
| Kind of magnetic iron-based metal particles | (I) | (I) | (I) | (I) | (I) |
| Weight ratio of magnetic particles and resin (–) | 5.0 | 5.0 | 5.0 | 5.0 | 5.0 |
| Thickness of magnetic layer ($\mu$m) | 1.1 | 1.2 | 1.2 | 1.1 | 1.1 |
| Coercive force (Oe) | 1940 | 1938 | 1931 | 1949 | 1930 |
| Br/Bm (–) | 0.88 | 0.88 | 0.89 | 0.88 | 0.88 |
| Gloss (%) | 239 | 235 | 233 | 235 | 230 |
| Ra (nm) | 6.4 | 6.8 | 6.9 | 6.4 | 6.9 |
| Young's modulus (–) (relative value) | 133 | 134 | 136 | 140 | 140 |
| Durability | | | | | |
| Running durability (min) | 22.6 | 26.7 | 22.3 | 28.9 | 26.4 |
| Scratch resistance | A | A | B | A | A |
| Linear absorption coefficient ($\mu$m$^{-1}$) | 1.21 | 1.25 | 1.24 | 1.30 | 1.29 |
| Corrosiveness | | | | | |
| Percentage of change in coercive force (%) | 4.6 | 5.7 | 8.5 | 6.5 | 7.4 |
| Percentage of change in Bm (%) | 6.8 | 7.9 | 7.4 | 6.9 | 5.7 |

| | Ex. 98 | Ex. 99 | Ex. 100 | Ex. 101 | Ex. 102 |
|---|---|---|---|---|---|
| Magnetic recording medium using magnetic iron-based metal particles | | | | | |
| Kind of non-magnetic undercoat layer | Ex. 68 | Ex. 69 | Ex. 70 | Ex. 71 | Ex. 72 |
| Kind of magnetic iron-based metal particles | (I) | (I) | (II) | (II) | (II) |
| Weight ratio of magnetic particles and resin (–) | 5.0 | 5.0 | 5.0 | 5.0 | 5.0 |
| Thickness of magnetic layer ($\mu$m) | 1.1 | 1.2 | 1.3 | 1.2 | 1..1 |
| Coercive force (Oe) | 1910 | 1934 | 1710 | 1714 | 1725 |
| Br/Bm (–) | 0.89 | 0.88 | 0.87 | 0.87 | 0.88 |
| Gloss (%) | 225 | 221 | 228 | 229 | 238 |
| Ra (nm) | 7.3 | 7.3 | 6.8 | 6.5 | 5.3 |
| Young's modulus (–) (relative value) | 144 | 146 | 128 | 131 | 128 |
| Durability | | | | | |
| Running durability (min) | 30≦ | 30≦ | 22.5 | 24.5 | 18.6 |
| Scratch resistance | A | A | A | A | B |
| Linear absorption coefficient ($\mu$m$^{-1}$) | 1.33 | 1.35 | 1.41 | 1.43 | 1.21 |
| Corrosiveness | | | | | |
| Percentage of change in coercive force (%) | 6.5 | 6.9 | 7.8 | 4.6 | 6.8 |

TABLE 17-continued

|  |  |  |  |  |  |
|---|---|---|---|---|---|
| Percentage of change in Bm (%) | 4.8 | 4.9 | 6.8 | 7.2 | 7.8 |

|  | Ex. 103 | Ex. 104 | Ex. 105 | Ex. 106 | Ex. 107 |
|---|---|---|---|---|---|
| Magnetic recording medium using magnetic iron-based metal particles |  |  |  |  |  |
| Kind of non-magnetic undercoat layer | Ex. 73 | Ex. 74 | Ex. 75 | Ex. 76 | Ex. 77 |
| Kind of magnetic iron-based metal particles | (II) | (II) | (II) | (II) | (II) |
| Weight ratio of magnetic particles and resin (−) | 5.0 | 5.0 | 5.0 | 5.0 | 5.0 |
| Thickness of magnetic layer (μm) | 1.1 | 1.1 | 1.2 | 1.2 | 1.3 |
| Coercive force (Oe) | 1690 | 1730 | 1723 | 1698 | 1702 |
| Br/Bm (−) | 0.88 | 0.89 | 0.88 | 0.88 | 0.87 |
| Gloss (%) | 238 | 219 | 222 | 227 | 220 |
| Ra (nm) | 5.6 | 6.4 | 6.5 | 6.0 | 6.5 |
| Young's modulus (−) (relative value) | 130 | 138 | 138 | 133 | 136 |
| Durability |  |  |  |  |  |
| Running durability (min) | 16.8 | 28.9 | 29.0 | 25.7 | 27.1 |
| Scratch resistance | B | A | A | B | A |
| Linear absorption coefficient (μm$^{-1}$) | 1.23 | 1.25 | 1.24 | 1.24 | 1.22 |
| Corrosiveness |  |  |  |  |  |
| Percentage of change in coercive force (%) | 7.1 | 8.8 | 3.6 | 4.7 | 4.7 |
| Percentage of change in Bm (%) | 8.9 | 6.4 | 7.0 | 5.7 | 8.7 |

(I): Major axial diameter = 0.11 μm; Minor axial diameter = 0.018 μm; Aspect ratio = 6.1; Hc = 1880 Oe; σs = 128 emu/g; pH value = 9.9.
(II): Major axial diameter = 0.14 μm; Minor axial diameter = 0.021 μm; Aspect ratio = 6.7; Hc = 1650 Oe; σs = 134 emu/g; pH value = 10.0.

TABLE 18

|  | Ex. 108 | Ex. 109 | Ex. 110 | Ex. 111 | Ex. 112 |
|---|---|---|---|---|---|
| Magnetic recording medium using magnetic iron-based metal particles |  |  |  |  |  |
| Kind of non-magnetic undercoat layer | Ex. 78 | Ex. 79 | Ex. 80 | Ex. 81 | Ex. 82 |
| Kind of magnetic iron-based metal particles | (I) | (I) | (I) | (I) | (I) |
| Weight ratio of magnetic particles and resin (−) | 5.0 | 5.0 | 5.0 | 5.0 | 5.0 |
| Thickness of magnetic layer (μm) | 1.1 | 1.1 | 1.2 | 1.1 | 1.1 |
| Coercive force (Oe) | 1954 | 1945 | 1940 | 1950 | 1.949 |
| Br/Bm (−) | 0.89 | 0.88 | 0.89 | 0.89 | 0.89 |
| Gloss (%) | 241 | 238 | 240 | 237 | 236 |
| Ra (nm) | 6.0 | 6.4 | 6.3 | 6.4 | 6.3 |
| Young's modulus (−) (relative value) | 136 | 135 | 139 | 141 | 144 |
| Durability |  |  |  |  |  |
| Running durability (min) | 28.9 | 29.9 | 27.5 | 30≦ | 28.8 |
| Scratch resistance | A | A | A | A | A |
| Linear absorption coefficient (μm$^{-1}$) | 1.22 | 1.26 | 1.27 | 1.32 | 1.32 |
| Corrosiveness |  |  |  |  |  |
| Percentage of change in coercive force (%) | 3.2 | 4.6 | 5.3 | 3.8 | 7.1 |
| Percentage of change in Bm (%) | 4.8 | 6.0 | 5.6 | 5.1 | 4.3 |

|  | Ex. 113 | Ex. 114 | Ex. 115 | Ex. 116 | Ex. 117 |
|---|---|---|---|---|---|
| Magnetic recording medium using magnetic iron-based metal particles |  |  |  |  |  |
| Kind of non-magnetic undercoat layer | Ex. 83 | Ex. 84 | Ex. 85 | Ex. 86 | Ex. 87 |
| Kind of magnetic iron-based metal particles | (I) | (I) | (II) | (II) | (II) |
| Weight ratio of magnetic particles and resin (−) | 5.0 | 5.0 | 5.0 | 5.0 | 5.0 |
| Thickness of magnetic layer (μm) | 1.1 | 1.2 | 1.1 | 1.2 | 1.1 |
| Coercive force (Oe) | 1946 | 1956 | 1723 | 1734 | 1734 |
| Br/Bm (−) | 0.88 | 0.90 | 0.88 | 0.88 | 0.88 |
| Gloss (%) | 228 | 226 | 229 | 231 | 234 |
| Ra (nm) | 6.8 | 6.8 | 6.0 | 6.0 | 5.4 |
| Young's modulus (−) (relative value) | 146 | 147 | 133 | 133 | 132 |
| Durability |  |  |  |  |  |
| Running durability (min) | 30≦ | 30≦ | 30≦ | 30≦ | 20.7 |
| Scratch resistance | A | A | A | A | A |
| Linear absorption coefficient (μm$^{-1}$) | 1.33 | 1.36 | 1.43 | 1.44 | 1.25 |
| Corrosiveness |  |  |  |  |  |
| Percentage of change in coercive force (%) | 6.1 | 5.0 | 6.3 | 3.5 | 4.0 |
| Percentage of change in Bm (%) | 3.7 | 4.0 | 5.1 | 4.7 | 5.2 |

|  | Ex. 118 | Ex. 119 | Ex. 120 | Ex. 121 | Ex. 122 |
|---|---|---|---|---|---|
| Magnetic recording medium using magnetic iron-based metal particles |  |  |  |  |  |
| Kind of non-magnetic undercoat layer | Ex. 88 | Ex. 89 | Ex. 90 | Ex. 91 | Ex. 92 |
| Kind of magnetic iron-based metal particles | (II) | (II) | (II) | (II) | (II) |
| Weight ratio of magnetic particles and resin (−) | 5.0 | 5.0 | 5.0 | 5.0 | 5.0 |
| Thickness of magnetic layer (μm) | 1.1 | 1.1 | 1.2 | 1.1 | 1.1 |
| Coercive force (Oe) | 1708 | 1723 | 1735 | 1713 | 1732 |
| Br/Bm (−) | 0.89 | 0.89 | 0.88 | 0.88 | 0.89 |
| Gloss (%) | 237 | 227 | 230 | 231 | 225 |
| Ra (nm) | 5.4 | 6.1 | 6.3 | 6.4 | 6.2 |
| Young's modulus (−) (relative value) | 133 | 138 | 141 | 135 | 138 |
| Durability |  |  |  |  |  |
| Running durability (min) | 22.8 | 28.7 | 27.8 | 29.5 | 25.8 |
| Scratch resistance | A | A | A | A | A |
| Linear absorption coefficient (μm$^{-1}$) | 1.24 | 1.25 | 1.24 | 1.23 | 1.25 |
| Corrosiveness |  |  |  |  |  |
| Percentage of change in coercive force (%) | 3.7 | 6.9 | 2.8 | 4.1 | 3.5 |
| Percentage of change in Bm (%) | 6.1 | 5.8 | 5.9 | 4.3 | 3.6 |

TABLE 18-continued (I): Major axial diameter = 0.11 μm; Minor axial diameter = 0.018 μm; Aspect ratio = 6.1; Hc = 1880 Oe; σs = 128 emu/g; pH value = 9.9.
(II): Major axial diameter = 0.14 μm; Minor axial diameter = 0.021 μm; Aspect ratio = 6.7; Hc = 1650 Oe; σs = 134 emu/g; pH value = 10.0.

TABLE 19

|  | Comp. Ex. 55 | Comp. Ex. 56 | Comp. Ex. 57 | Comp. Ex. 58 |
|---|---|---|---|---|
| Magnetic recording medium using magnetic iron-based metal particles | | | | |
| Kind of non-magnetic undercoat layer | Comp. Ex. 39 | Comp. Ex. 40 | Comp. Ex. 41 | Comp. Ex. 42 |
| Kind of magnetic iron-based metal particles | (I) | (I) | (I) | (I) |
| Weight ratio of magnetic particies and resin (−) | 5.0 | 5.0 | 5.0 | 5.0 |
| Thickness of magnetic layer (μm) | 1.3 | 1.2 | 1.2 | 1.2 |
| Coercive force (Oe) | 1890 | 1880 | 1895 | 1901 |
| Br/Bm (−) | 0.82 | 0.78 | 0.83 | 0.83 |
| Gloss (%) | 146 | 112 | 156 | 161 |
| Ra (nm) | 64.0 | 78.8 | 42.6 | 32.4 |
| Young's modulus (−) (relative value) | 93 | 87 | 99 | 107 |
| Durability | | | | |
| Running durability (min) | 0.8 | 1.2 | 0.4 | 4.1 |
| Scratch resistance | D | C | D | C |
| Linear absorption coefficient (μm$^{-1}$) | 0.70 | 0.72 | 0.84 | 0.91 |
| Corrosiveness | | | | |
| Percentage of change in coercive force (%) | 45.6 | 38.9 | 49.0 | 28.6 |
| Percentage of change in Bm (%) | 25.7 | 25.1 | 36.8 | 24.5 |

|  | Comp. Ex. 59 | Comp. Ex. 60 | Comp. Ex. 61 | Comp. Ex. 62 |
|---|---|---|---|---|
| Magnetic recording medium using magnetic iron-based metal particles | | | | |
| Kind of non-magnetic undercoat layer | Comp. Ex. 43 | Comp. Ex. 44 | Comp. Ex. 451 | Comp. Ex. 46 |
| Kind of magnetic iron-based metal particles | (I) | (I) | (I) | (I) |
| Weight ratio of magnetic particles and resin (−) | 5.0 | 5.0 | 5.0 | 5.0 |
| Thickness of magnetic layer (μm) | 1.2 | 1.3 | 1.1 | 1.3 |
| Coercive force (Oe) | 1911 | 1905 | 1918 | 1914 |
| Br/Bm (−) | 0.84 | 0.84 | 0.85 | 0.83 |
| Gloss (%) | 176 | 186 | 189 | 193 |
| Ra (nm) | 25.8 | 24.8 | 15.1 | 11..9 |
| Young's modulus (−) (relative value) | 113 | 111 | 117 | 114 |
| Durability | | | | |
| Running durability (min) | 6.0 | 3.6 | 9.8 | 10.3 |
| Scratch resistance | C | C | C | B |
| Linear absorption coefficient (μm$^{-1}$) | 1.03 | 1.06 | 1.12 | 1.08 |
| Corrosiveness | | | | |
| Percentage of change in coercive force (%) | 23.6 | 31.3 | 18.0 | 14.7 |
| Percentage of change in Bm (%) | 28.9 | 23.1 | 18.8 | 14.3 |

TABLE 19-continued

|  | Comp. Ex. 63 | Comp. Ex. 64 | Comp. Ex. 65 | Comp. Ex. 66 |
|---|---|---|---|---|
| Magnetic recording medium using magnetic iron-based metal particles | | | | |
| Kind of non-magnetic undercoat layer | Comp. Ex. 47 | Comp. Ex. 48 | Comp. Ex. 49 | Comp. Ex. 50 |
| Kind of magnetic iron-based metal particles | (I) | (I) | (I) | (I) |
| Weight ratio of magnetic particles and resin (−) | 5.0 | 5.0 | 5.0 | 5.0 |
| Thickness of magnetic layer (μm) | 1.1 | 1.2 | 1.1 | 1.0 |
| Coercive force (Oe) | 1903 | 1905 | 1896 | 1906 |
| Br/Bm (−) | 0.85 | 0.84 | 0.83 | 0.82 |
| Gloss (%) | 193 | 178 | 167 | 165 |
| Ra (nm) | 13.1 | 15.6 | 21.6 | 21.6 |
| Young's modulus (−) (relative value) | 121 | 131 | 123 | 117 |
| Durability | | | | |
| Running durability (min) | 8.9 | 8.6 | 5.8 | 4.3 |
| Scratch resistance | C | C | C | D |
| Linear absorption coefficient (μm$^{-1}$) | 1.00 | 1.18 | 1.20 | 1.21 |
| Corrosiveness | | | | |
| Percentage of change in coercive force (%) | 16.8 | 17.9 | 36.9 | 21.7 |
| Percentage of change in Bm (%) | 15.3 | 17.9 | 23.9 | 18.0 |

|  | Comp. Ex. 67 | Comp. Ex. 68 | Comp. Ex. 69 | Comp. Ex. 70 |
|---|---|---|---|---|
| Magnetic recording medium using magnetic iron-based metal particles | | | | |
| Kind of non-magnetic undercoat layer | Comp. Ex. 51 | Comp. Ex. 52 | Comp. Ex. 53 | Comp. Ex. 54 |
| Kind of magnetic iron-based metal particles | (I) | (I) | (I) | (I) |
| Weight ratio of magnetic particles and resin (−) | 5.0 | 5.0 | 5.0 | 5.0 |
| Thickness of magnetic layer (μm) | 1.3 | 1.3 | 1.2 | 1.1 |
| Coercive force (Oe) | 1893 | 1899 | 1913 | 1925 |
| Br/Bm (−) | 0.84 | 0.85 | 0.85 | 0.88 |
| Gloss (%) | 150 | 163 | 171 | 225 |
| Ra (nm) | 28.0 | 26.3 | 12.8 | 7.8 |
| Young's modulus (−) (relative value) | 123 | 123 | 124 | 139 |
| Durability | | | | |
| Running durability (min) | 3.8 | 8.8 | 9.9 | 9.4 |
| Scratch resistance | D | C | C | B |
| Linear absorption coefficient (μm$^{-1}$) | 1.21 | 1.15 | 1.20 | 1.29 |
| Corrosiveness | | | | |
| Percentage of change in coercive force (%) | 16.8 | 18.6 | 16.0 | 8.6 |
| Percentage of change in Bm (%) | 21.0 | 16.9 | 13.8 | 6.2 |

(I): Major axial diameter = 0.11 μm; Minor axial diameter = 0.018 μm; Aspect ratio = 6.1; Hc = 1880 Oe; σs = 138 emu/g; pH value = 9.9.

TABLE 20

|  | Starting material (I) | Starting material (II) | Starting material (III) |
|---|---|---|---|
| Production of acicular goethite particles | | | |
| Production method | (B) | (C) | (D) |
| Kind of Al added | Aluminum sulfate | Aluminum acetate | Aluminum nitrate |
| Acicular goethite particles | | | |
| Average major axial diameter ($\mu$m) | 0.146 | 0.178 | 0.135 |
| Average minor axial diameter ($\mu$m) | 0.0195 | 0.0225 | 0.0187 |
| Aspect ratio (–) | 7.49 | 7.91 | 7.22 |
| Geometric standard deviation $\sigma g$ (–) | 1.36 | 1.45 | 1.30 |
| BET specific surface area (m$^2$/g) | 198.4 | 175.4 | 225.9 |
| Al content (wt %) | 2.31 | 1.23 | 4.56 |
| Soluble Na salt (ppm) | 415 | 568 | 1325 |
| Soluble sulfate (ppm) | 359 | 543 | 1865 |
| pH value of particles (–) | 6.8 | 7.2 | 5.2 |

|  | Starting material (IV) | Starting material (V) |
|---|---|---|
| Production of acicular goethite particles | | |
| Production method | (A) | (C) |
| Kind of Al added | Sodium aluminate | |
| Acicular goethite particles | | |
| Average major axial diameter ($\mu$m) | 0.201 | 0.264 |
| Average minor axial diameter ($\mu$m) | 0.0236 | 0.0318 |
| Aspect ratio (–) | 8.52 | 8.30 |
| Geometric standard deviation $\sigma g$ (–) | 1.42 | 1.41 |
| BET specific surface area (m$^2$/g) | 91.8 | 61.2 |
| Al content (wt %) | 0.83 | 0.003 |
| Soluble Na salt (ppm) | 1265 | 514 |
| Soluble sulfate (ppm) | 387 | 435 |
| pH value of particles (–) | 8.6 | 7.1 |

(Note) PRODUCTION METHOD:
(A): A method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.
(B): A method of producing spindle-shaped goethite particles by oxidizing a suspension containing FeCO$_3$ which is obtained by reacting an aqueous ferrous salt solution with an aqueous alkali carbonate solution, by passing an oxygen-containing gas thereinto after aging the suspension, if necessary.
(C): A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the Fe$^{2+}$ in the aqueous ferrous salt solution, to the aqueous ferrous salt solution containing the acicular goethite seed particles, and passing an oxygen-containing gas into the aqueous ferrous salt solution.

TABLE 20-continued (D): A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

TABLE 21

|  | Example 125 | Example 126 | Example 127 |
|---|---|---|---|
| Kind of starting material | Starting material in Example 123 | Starting material (I) | Starting material (I) |
| Sintering preventive | | | |
| Kind | Hexametaphosphate soda | #3 Water glass | #3 Water glass/phosphoric acid |
| Amount added (wt %) | P: 0.80 | SiO$_2$: 1.30 P: 0.50 | SiO$_2$: 1.00 |
| Heating and dehydration | | | |
| Temperature (° C.) | 320 | 310 | 350 |
| Time (min.) | 45 | 60 | 45 |

|  | Example 128 | Example 129 | Example 130 |
|---|---|---|---|
| Kind of starting material | Starting material (II) | Starting material (II) | Starting material (III) |
| Sintering preventive | | | |
| Kind | #3 Water glass | Titanyl sulfate | Phosphoric acid |
| Amount added (wt %) | SiO$_2$: 2.00 | Ti: 3.00 | P: 0.75 |
| Heating and dehydration | | | |
| Temperature (° C.) | 330 | 330 | 300 |
| Time (min.) | 75 | 60 | 90 |

|  | Example 131 | Example 132 | Example 133 |
|---|---|---|---|
| Kind of starting material | Starting material (III) | Starting material (IV) | Starting material (IV) |
| Sintering preventive | | | |
| Kind | Boric acid | #3 Water glass | #3 Water glass/Hexametaphosphate soda |
| Amount added (wt %) | B: 0.50 | SiO$_2$: 1.50 | SiO$_2$: 0.50 P: 0.75 |
| Heating and dehydration | | | |
| Temperature (° C.) | 310 | 350 | 300 |
| Time (min.) | 75 | 60 | 60 |

TABLE 22

| | Example 125 | Example 126 | Example 127 |
|---|---|---|---|
| Low-density hematite particles | | | |
| Average major axial diameter (μm) | 0.135 | 0.120 | 0.123 |
| Average minor axial diameter (μm) | 0.0191 | 0.0191 | 0.0189 |
| Geometric standard deviation σg (-) | 1.35 | 1.36 | 1.37 |
| Aspect ratio (-) | 7.07 | 6.28 | 6.51 |
| $S_{BET}$ (m²/g) | 178.9 | 211.2 | 225.0 |
| $S_{TEM}$ (m²/g) | 43.1 | 43.5 | 43.8 |
| $S_{BET}/S_{TEM}$ (-) | 4.15 | 4.86 | 5.13 |
| Al content (wt %) | 0.91 | 2.51 | 2.53 |
| Amount of sintering preventive (wt %) | P: 0.70 | SiO₂: 1.22 | SiO₂: 0.94 P: 0.44 |
| Soluble Na salt (ppm) | 1265 | 1077 | 1356 |
| Soluble sulfate (ppm) | 569 | 752 | 865 |
| pH value of particles (-) | 6.5 | 7.0 | 7.0 |

| | Example 128 | Example 129 | Example 130 |
|---|---|---|---|
| Low-density hematite particles | | | |
| Average major axial diameter (μm) | 0.142 | 0.140 | 0.111 |
| Average minor axial diameter (μm) | 0.0201 | 0.0206 | 0.0175 |
| Geometric standard deviation σg (-) | 1.45 | 1.45 | 1.32 |
| Aspect ratio (-) | 7.06 | 6.80 | 6.34 |
| $S_{BET}$ (m²/g) | 205.4 | 195.3 | 168.2 |
| $S_{TEM}$ (m²/g) | 41.0 | 40.1 | 47.4 |
| $S_{BET}/S_{TEM}$ (-) | 5.01 | 4.87 | 3.55 |
| Al content (wt %) | 1.35 | 1.31 | 4.98 |
| Amount of sintering preventive (wt %) | SiO₂: 1.81 | Ti: 3.22 | P: 0.63 |
| Soluble Na salt (ppm) | 1546 | 1759 | 2356 |
| Soluble sulfate (ppm) | 1056 | 983 | 2654 |
| pH value of particles (-) | 6.5 | 7.2 | 6.9 |

| | Example 131 | Example 132 | Example 133 |
|---|---|---|---|
| Low-density hematite particles | | | |
| Average major axial diameter (μm) | 0.108 | 0.164 | 0.168 |
| Average minor axial diameter (μm) | 0.0177 | 0.0242 | 0.0240 |
| Geometric standard deviation σg (-) | 1.33 | 1.43 | 1.42 |
| Aspect ratio (-) | 6.10 | 6.78 | 7.00 |
| $S_{BET}$ (m²/g) | 175.3 | 138.0 | 146.5 |
| $S_{TEM}$ (m²/g) | 47.0 | 34.1 | 34.3 |
| $S_{BET}/S_{TEM}$ (-) | 3.73 | 4.04 | 4.27 |
| Al content (wt %) | 4.93 | 1.01 | 1.03 |
| Amount of sintering preventive (wt %) | B: 0.21 | SiO₂: 1.36 | SiO₂: 0.44 P: 0.67 |
| Soluble Na salt (ppm) | 2564 | 1236 | 1498 |
| Soluble sulfate (ppm) | 2850 | 854 | 792 |
| pH value of particles (-) | 6.5 | 7.7 | 7.9 |

TABLE 23

| | Comp. Example 71 | Comp. Example 72 | Comp. Example 73 |
|---|---|---|---|
| Kind of starting material | Starting material (V) | Starting material (V) | Starting material (V) |
| Sintering preventive | | | |
| Kind | — | — | #3 Water glass |
| Amount added (wt %) | — | — | SiO₂: 0.75 |
| Heating and dehydration | | | |
| Temperature (° C.) | 350 | 350 | 350 |
| Time (min.) | 60 | 30 | 60 |

| | Comp. Example 74 | Comp. Example 75 | Comp. Example 76 |
|---|---|---|---|
| Kind of starting material | Starting material (V) | Starting material (V) | Starting material (V) |
| Sintering preventive | | | |
| Kind | Phosphoric acid | Colloidal silica | Phosphoric acid |
| Amount added (wt %) | P: 1.00 | SiO₂: 1.25 | P: 0.50 |
| Heating and dehydration | | | |
| Temperature (° C.) | — | 320 | 300 |
| Time (min.) | — | 30 | 30 |

| | Comp. Example 77 | Comp. Example 78 | Comp. Example 79 |
|---|---|---|---|
| Kind of starting material | Starting material (V) | Starting material (V) | Starting material (V) |
| Sintering preventive | | | |
| Kind | #3 Water glass | #3 Water glass | Phosphoric acid |
| Amount added (wt %) | SiO₂: 1.50 | SiO₂: 1.00 | P: 1.00 |
| Heating and dehydration | | | |
| Temperature (° C.) | 350 | 350 | 310 |
| Time (min.) | 60 | 60 | 60 |

| | Comp. Example 80 | Comp. Example 81 | Comp. Example 82 |
|---|---|---|---|
| Kind of starting material | Particles in Examples 123 | Particles in Examples 123 | Particles in Examples 123 |
| Sintering preventive | | | |
| Kind | Hexametaphosphate soda | #3 Water glass | Boric acid |
| Amount added (wt %) | P: 1.25 | SiO₂: 1.50 | B: 0.75 |
| Heating and dehydration | | | |
| Temperature (° C.) | 350 | 350 | 330 |
| Time (min.) | 90 | 60 | 60 |

| | Comp. Example 83 | Comp. Example 84 |
|---|---|---|
| Kind of starting | Particles in Examples 123 | Particles in Examples 123 |

TABLE 23-continued

| | | |
|---|---|---|
| material Sintering preventive | | |
| Kind | Titanyl sulfate | Phosphoric acid |
| Amount added (wt %) | Ti: 0.50 | P: 1.00 |
| Heating and dehydration | | |
| Temperature (° C.) | 350 | 330 |
| Time (min.) | 30 | 45 |

TABLE 24

| | Comp. Example 71 | Comp. Example 72 | Comp. Example 73 | Comp. Example 74 |
|---|---|---|---|---|
| Low-density hematite particles | | | | |
| Average major axial diameter ($\mu$m) | 0.213 | 0.214 | 0.214 | — |
| Average minor axial diameter ($\mu$m) | 0.0298 | 0.0296 | 0.0297 | — |
| Geometric standard deviation $\sigma g$ (–) | 1.42 | 1.41 | 1.41 | — |
| Aspect ratio (–) | 7.15 | 7.23 | 7.21 | — |
| $S_{BET}$ (m$^2$/g) | 78.9 | 81.5 | 123.8 | — |
| $S_{TEM}$ (m$^2$/g) | 27.6 | 27.8 | 27.7 | — |
| $S_{BET}/S_{TEM}$ (–) | 2.86 | 2.93 | 4.47 | — |
| Al content (wt %) | 0.003 | 0.003 | 0.003 | — |
| Amount of sintering preventive (wt %) | — | — | SiO$_2$: 0.70 | — |
| Soluble Na salt (ppm) | 657 | 756 | 1189 | — |
| Soluble sulfate (ppm) | 564 | 567 | 547 | — |
| pH of particles (–) | 6.3 | 6.5 | 7.0 | — |
| Resin adsorptivity (%) | 8.7 | — | 13.8 | — |

| | Comp. Example 75 | Comp. Example 76 | Comp. Example 77 | Comp. Example 78 |
|---|---|---|---|---|
| Low-density hematite particles | | | | |
| Average major axial diameter ($\mu$m) | 0.213 | 0.215 | 0.214 | 0.213 |
| Average minor axial diameter ($\mu$m) | 0.0296 | 0.0299 | 0.0298 | 0.0297 |
| Geometric standard deviation $\sigma g$ (–) | 1.42 | 1.43 | 1.41 | 1.42 |
| Aspect ratio (–) | 7.20 | 7.19 | 7.18 | 7.17 |
| $S_{BET}$ (m$^2$/g) | 131.5 | 125.9 | 135.6 | 123.6 |
| $S_{TEM}$ (m$^2$/g) | 27.8 | 27.5 | 27.6 | 27.7 |
| $S_{BET}/S_{TEM}$ (–) | 4.73 | 4.58 | 4.91 | 4.46 |
| Al content (wt %) | 0.003 | 0.003 | 0.003 | 0.003 |
| Amount of sintering preventive (wt %) | SiO$_2$: 1.38 | P: 0.46 | SiO$_2$: 1.26 | SiO$_2$: 0.89 |
| Soluble Na salt (ppm) | 1245 | 1345 | 1232 | 1426 |
| Soluble sulfate (ppm) | 657 | 589 | 686 | 631 |
| pH of particles (–) | 7.3 | 7.1 | 7.1 | 7.3 |
| Resin adsorptivity (%) | — | — | — | — |

| | Comp. Example 79 | Comp. Example 80 | Comp. Example 81 | Comp. Example 82 |
|---|---|---|---|---|
| Low-density hematite particles | | | | |
| Average major axial diameter ($\mu$m) | 0.213 | 0.135 | 0.134 | 0.135 |
| Average minor axial diameter ($\mu$m) | 0.0300 | 0.0191 | 0.0190 | 0.0189 |
| Geometric standard deviation $\sigma g$ (–) | 1.43 | 1.36 | 1.35 | 1.35 |
| Aspect ratio (–) | 7.10 | 7.07 | 7.05 | 7.14 |
| $S_{BET}$ (m$^2$/g) | 126.5 | 185.9 | 173.6 | 185.0 |
| $S_{TEM}$ (m$^2$/g) | 27.4 | 43.1 | 43.4 | 43.5 |
| $S_{BET}/S_{TEM}$ (–) | 4.61 | 4.31 | 4.00 | 4.25 |
| Al content (wt %) | 0.003 | 0.91 | 0.91 | 0.91 |
| Amount of sintering preventive (wt %) | P: 0.76 | P: 1.16 | SiO$_2$: 1.40 | B: 0.39 |
| Soluble Na salt (ppm) | 1127 | 1287 | 1325 | 1124 |
| Soluble sulfate (ppm) | 568 | 564 | 678 | 769 |
| pH of particles (–) | 7.3 | 6.9 | 6.8 | 7.0 |
| Resin adsorptivity (%) | — | — | — | — |

| | Comp. Example 83 | Comp. Example 84 |
|---|---|---|
| Low-density hematite particles | | |
| Average major axial diameter ($\mu$m) | 0.133 | 0.136 |
| Average minor axial diameter ($\mu$m) | 0.0199 | 0.0201 |
| Geometric standard deviation $\sigma g$ (–) | 1.34 | 1.35 |
| Aspect ratio (–) | 6.68 | 6.77 |
| $S_{BET}$ (m$^2$/g) | 156.9 | 179.2 |
| $S_{TEM}$ (m$^2$/g) | 41.5 | 41.1 |
| $S_{BET}/S_{TEM}$ (–) | 3.78 | 4.36 |
| Al content (wt %) | 0.91 | 0.91 |
| Amount of sintering preventive (wt %) | Ti: 0.55 | P: 0.83 |
| Soluble Na salt (ppm) | 1546 | 1438 |
| Soluble sulfate (ppm) | 867 | 687 |
| pH of particles (–) | 6.8 | 7.0 |
| Resin adsorptivity (%) | — | — |

TABLE 25

|  | Example 134 | Example 135 | Example 136 |
|---|---|---|---|
| Kind of low-density acicular hematite particles | Example 125 | Example 126 | Example 127 |
| Densification |  |  |  |
| Temperature (° C.) | 650 | 680 | 630 |
| Time (min.) | 20 | 30 | 60 |
| High-density acicular hematite particles |  |  |  |
| Average major axial diameter ($\mu$m) | 0.134 | 0.120 | 0.122 |
| Average minor axial diameter ($\mu$m) | 0.0192 | 0.0193 | 0.0190 |
| Geometric standard deviation $\sigma g$ (–) | 1.38 | 1.41 | 1.41 |
| Aspect ratio (–) | 6.98 | 6.22 | 6.42 |
| $S_{BET}$ (m$^2$/g) | 48.9 | 53.8 | 54.1 |
| $S_{TEM}$ (m$^2$/g) | 42.9 | 43.1 | 43.6 |
| $S_{BET}/S_{TEM}$ (–) | 1.14 | 1.25 | 1.24 |
| Al content (wt %) | 0.91 | 2.51 | 2.53 |
| Amount of sintering preventive (wt %) | P: 0.70 | SiO$_2$: 1.22 | SiO$_2$: 0.95 P: 0.44 |
| Soluble Na salt (ppm) | 1633 | 2466 | 2018 |
| Soluble sulfate (ppm) | 2376 | 2879 | 2345 |
| pH value of particles (–) | 5.0 | 5.4 | 5.3 |

|  | Example 137 | Example 138 | Example 139 |
|---|---|---|---|
| Kind of low-density acicular hematite particles | Example 128 | Example 129 | Example 130 |
| Densification |  |  |  |
| Temperature (° C.) | 730 | 650 | 720 |
| Time (min.) | 15 | 90 | 30 |
| High-density acicular hematite particles |  |  |  |
| Average major axial diameter ($\mu$m) | 0.141 | 0.140 | 0.110 |
| Average minor axial diameter ($\mu$m) | 0.0203 | 0.0206 | 0.0177 |
| Geometric standard deviation $\sigma g$ (–) | 1.48 | 1.47 | 1.36 |
| Aspect ratio (–) | 6.95 | 6.80 | 6.21 |
| $S_{BET}$ (m$^2$/g) | 43.6 | 45.3 | 57.5 |
| $S_{TEM}$ (m$^2$/g) | 40.6 | 40.1 | 47.0 |
| $S_{BET}/S_{TEM}$ (–) | 1.07 | 1.13 | 1.22 |
| Al content (wt %) | 1.35 | 1.31 | 4.98 |
| Amount of sintering preventive (wt %) | SiO$_2$: 1.80 | Ti: 3.20 | P: 0.64 |
| Soluble Na salt (ppm) | 1968 | 1890 | 2879 |
| Soluble sulfate (ppm) | 3607 | 2135 | 4153 |
| pH value of particles (–) | 5.1 | 5.7 | 4.8 |

|  | Example 140 | Example 141 | Exanple 142 |
|---|---|---|---|
| Kind of low-density acicular hematite particles | Example 131 | Example 132 | Example 133 |
| Densification |  |  |  |
| Temperature (° C.) | 700 | 680 | 650 |
| Time (min.) | 30 | 450 | 60 |
| High-density acicular hematite particles |  |  |  |
| Average major axial diameter ($\mu$m) | 0.108 | 0.162 | 0.165 |
| Average minor axial diameter ($\mu$m) | 0.0176 | 0.0242 | 0.0242 |
| Geometric standard deviation $\sigma g$ (–) | 1.37 | 1.46 | 1.46 |
| Aspect ratio (–) | 6.14 | 6.69 | 6.82 |
| $S_{BET}$ (m$^2$/g) | 56.5 | 37.4 | 40.0 |
| $S_{TEM}$ (m$^2$/g) | 47.3 | 34.2 | 34.1 |
| $S_{BET}/S_{TEM}$ (–) | 1.20 | 1.09 | 1.17 |
| Al content (wt %) | 4.93 | 1.01 | 1.03 |
| Amount of sintering preventive (wt %) | B: 0.23 | SiO$_2$: 1.35 | SiO$_2$: 0.44 P: 0.68 |
| Soluble Na salt (ppm) | 3330 | 1356 | 1546 |
| Soluble sulfate (ppm) | 4789 | 2176 | 2673 |
| pH value of particles (–) | 4.6 | 5.2 | 5.8 |

TABLE 26

|  | Comp. Example 85 | Comp. Example 86 | Comp. Example 87 | Comp. Example 88 |
|---|---|---|---|---|
| Kind of low-density acicular hematite particles | Starting material (V) | Comp. Example 72 | Comp. Example 74 | Comp. Example 75 |
| Densification |  |  |  |  |
| Temperature (° C.) | 680 | 650 | 700 | 700 |
| Time (min.) | 30 | 30 | 30 | 45 |
| High-density acicular hematite particles |  |  |  |  |
| Average major axial diameter ($\mu$m) | 0.086 | 0.136 | 0.159 | 0.212 |
| Average minor axial diameter ($\mu$m) | 0.0379 | 0.0347 | 0.0330 | 0.0310 |
| Geometric standard deviation $\sigma g$ (–) | 1.96 | 1.71 | 1.56 | 1.51 |
| Aspect ratio (–) | 2.27 | 3.92 | 4.82 | 6.84 |
| $S_{BET}$ (m$^2$/g) | 12.4 | 18.9 | 24.7 | 31.7 |
| $S_{TEM}$ (m$^2$/g) | 24.8 | 25.0 | 25.7 | 26.6 |
| $S_{BET}/S_{TEM}$ (–) | 0.50 | 0.76 | 0.96 | 1.19 |
| Al content (wt %) | 0.003 | 0.003 | 0.003 | 0.003 |
| Amount of sintering preventive (wt %) | — | — | P: 0.87 | SiO$_2$: 1.38 |
| Soluble Na salt (ppm) | 1578 | 1456 | 1768 | 1546 |
| Soluble sulfate (ppm) | 3246 | 3562 | 3125 | 2986 |
| pH value of particles (–) | 5.3 | 5.2 | 5.5 | 5.7 |
| Resin adsorptivity (%) | 7.4 | 10.4 | 11.5 | 18.5 |

|  | Comp. Example 89 | Comp. Example 90 | Comp. Example 91 | Comp. Example 92 |
|---|---|---|---|---|
| Kind of low-density acicular hematite particles | Comp. Example 76 | Comp. Example 77 | Comp. Example 78 | Comp. Example 79 |
| Densification |  |  |  |  |
| Temperature (° C.) | 560 | 720 | 700 | 570 |
| Time (min.) | 60 | 30 | 30 | 30 |
| High-density acicular hematite particles |  |  |  |  |
| Average major axial diameter ($\mu$m) | 0.214 | 0.211 | 0.212 | 0.213 |

TABLE 26-continued

|  | | | | |
|---|---|---|---|---|
| Average minor axial diameter (μm) | 0.0297 | 0.0299 | 0.0301 | 0.0300 |
| Geometric standard deviation σg (-) | 1.42 | 1.43 | 1.46 | 1.42 |
| Aspect ratio (-) | 7.21 | 7.06 | 7.04 | 7.10 |
| $S_{BET}$ (m²/g) | 44.0 | 33.5 | 36.5 | 43.2 |
| $S_{TEM}$ (m²/g) | 27.7 | 27.5 | 27.4 | 27.5 |
| $S_{BET}/S_{TEM}$ (-) | 1.59 | 1.22 | 1.33 | 1.57 |
| Al content (wt %) | 0.003 | 0.003 | 0.003 | 0.003 |
| Amount of sintering preventive (wt %) | P: 0.46 | SiO₂: 1.25 | SiO₂: 0.90 | P: 0.76 |
| Soluble Na salt (ppm) | 1678 | 1539 | 1675 | 1690 |
| Soluble sulfate (ppm) | 2849 | 3128 | 2870 | 3176 |
| pH value of particles (-) | 5.5 | 5.0 | 5.5 | 5.4 |
| Resin adsorptivity (%) | — | — | — | — |

|  | Comp. Example 93 | Comp. Example 94 | Comp. Example 95 | Comp. Example 96 |
|---|---|---|---|---|
| Kind of low-density acicular hematite particles | Comp. Example 80 | Comp. Example 81 | Comp. Example 82 | Comp. Example 83 |
| Densification | | | | |
| Temperature (° C.) | 680 | 680 | 600 | 750 |
| Time (min.) | 30 | 60 | 60 | 30 |
| High-density acicular hematite particles | | | | |
| Average major axial diameter (μm) | 0.133 | 0.134 | 0.135 | 0.130 |
| Average minor axial diameter (μm) | 0.0191 | 0.0192 | 0.0188 | 0.0190 |
| Geometric standard deviation σg (-) | 1.36 | 1.36 | 1.35 | 1.35 |
| Aspect ratio (-) | 6.96 | 6.98 | 7.18 | 6.84 |
| $S_{BET}$ (m²/g) | 53.1 | 49.6 | 60.7 | 50.0 |
| $S_{TEM}$ (m²/g) | 43.2 | 42.9 | 43.8 | 43.4 |
| $S_{BET}/S_{TEM}$ (-) | 1.23 | 1.16 | 1.39 | 1.15 |
| Al content (wt %) | 0.91 | 0.91 | 0.91 | 0.91 |
| Amount of sintering preventive (wt %) | P: 1.15 | SiO₂: 1.41 | B: 0.40 | Ti: 0.55 |
| Soluble Na salt (ppm) | 2256 | 2187 | 1458 | 1297 |
| Soluble sulfate (ppm) | 2468 | 2678 | 2597 | 3018 |
| pH value of particles (-) | 6.2 | 6.0 | 5.5 | 5.7 |
| Resin adsorptivity (%) | 31.3 | — | — | — |

|  | Comp. Example 97 |
|---|---|
| Kind of low-density acicular hematite particles | Comp. Example 84 |
| Densification | |
| Temperature (° C.) | 450 |
| Time (min.) | 30 |
| High-density acicular hematite particles | |
| Average major axial diameter (μm) | 0.135 |
| Average minor axial diameter (μm) | 0.0189 |
| Geometric standard deviation σg (-) | 1.36 |
| Aspect ratio (-) | 7.14 |
| $S_{BET}$ (m²/g) | 86.4 |
| $S_{TEM}$ (m²/g) | 43.5 |
| $S_{BET}/S_{TEM}$ (-) | 1.98 |
| Al content (wt %) | 0.91 |
| Amount of sintering preventive (wt %) | P: 0.83 |
| Soluble Na salt (ppm) | 2156 |
| Soluble sulfate (ppm) | 2658 |
| pH value of particles (-) | 5.4 |
| Resin adsorptivity (%) | — |

TABLE 27

|  | Example 143 | Example 144 | Example 145 | Example 146 | Example 147 |
|---|---|---|---|---|---|
| Kind of high-density acicular hematite particles | Example 134 | Example 135 | Example 136 | Example 137 | Example 138 |
| Wet pulverization | | | | | |
| Yes or No | Yes | Yes | Yes | Yes | Yes |
| Amount of residue on sieve (wt %) | 0 | 0 | 0 | 0 | 0 |
| Heat treatment with aqueous alkali solution | | | | | |
| pH value (-) | 13.7 | 13.6 | 13.5 | 13.8 | 13.9 |
| Temperature (° C.) | 98 | 98 | 95 | 95 | 97 |
| Time (min.) | 180 | 240 | 180 | 210 | 180 |

|  | Example 148 | Example 149 | Example 150 | Example 151 |
|---|---|---|---|---|
| Kind of high-density acicular hematite particles | Example 139 | Example 140 | Example 141 | Example 142 |
| Wet pulverization | | | | |
| Yes or No | Yes | Yes | Yes | Yes |
| Amount of residue on sieve (wt %) | 0 | 0 | 0 | 0 |
| Heat treatment with aqueous alkali solution | | | | |
| pH value (-) | 13.6 | 13.5 | 13.3 | 13.1 |
| Temperature (° C.) | 93 | 91 | 98 | 97 |
| Time (min.) | 150 | 180 | 240 | 180 |

TABLE 28

|  | Example 143 | Example 144 | Example 145 | Example 146 |
|---|---|---|---|---|
| Acicular hematite particles washed with water after heat treatment with aqueous alkali solution | | | | |
| Average major axial diameter (μm) | 0.134 | 0.120 | 0.121 | 0.141 |
| Average minor axial diameter (μm) | 0.0192 | 0.0193 | 0.0190 | 0.0203 |
| Geometric standard deviation σg (-) | 1.35 | 1.36 | 1.36 | 1.44 |
| Aspect ratio (-) | 6.98 | 6.22 | 6.37 | 6.95 |
| $S_{BET}$ (m²/g) | 48.9 | 53.9 | 55.0 | 44.1 |

TABLE 28-continued

|  |  |  |  |  |
|---|---|---|---|---|
| $S_{TEM}$ (m²/g) | 42.9 | 43.1 | 43.7 | 40.6 |
| $S_{BET}/S_{TEM}$ (-) | 1.14 | 1.25 | 1.26 | 1.09 |
| Al content (wt %) | 0.91 | 2.51 | 2.53 | 1.35 |
| Amount of sintering preventive (wt %) | P: 0.35 | $SiO_2$: 1.16 | $SiO_2$: 0.90 P: 0.21 | $SiO_2$: 1.66 |
| Soluble Na salt (ppm) | 89 | 72 | 68 | 118 |
| Soluble sulfate (ppm) | 8 | 6 | 13 | 21 |
| pH value of particles (-) | 9.3 | 9.4 | 9.3 | 9.7 |
| Resin adsorptivity (%) | 83.8 | 86.8 | 89.1 | 90.3 |

|  | Example 147 | Example 148 | Example 149 | Example 150 |
|---|---|---|---|---|
| Acicular hematite particles washed with water after heat treatment with aqueous alkali solution |  |  |  |  |
| Average major axial diameter (μm) | 0.141 | 0.110 | 0.108 | 0.162 |
| Average minor axial diameter (μm) | 0.0205 | 0.0176 | 0.0176 | 0.0240 |
| Geometric standard deviation σg (-) | 1.45 | 1.31 | 1.32 | 1.42 |
| Aspect ratio (-) | 6.88 | 6.25 | 6.14 | 6.75 |
| $S_{BET}$ (m²/g) | 45.7 | 57.1 | 56.9 | 38.1 |
| $S_{TEM}$ (m²/g) | 40.3 | 47.2 | 47.3 | 34.4 |
| $S_{BET}/S_{TEM}$ (-) | 1.14 | 1.21 | 1.20 | 1.11 |
| Al content (wt %) | 1.31 | 4.98 | 4.93 | 1.01 |
| Amount of sintering preventive (wt %) | Ti: 3.22 | P: 0.32 | B: 0.08 | $SiO_2$: 1.25 |
| Soluble Na salt (ppm) | 90 | 134 | 116 | 43 |
| Soluble sulfate (ppm) | 7 | 6 | 11 | 3 |
| pH value of particles (-) | 9.3 | 9.5 | 9.0 | 9.0 |
| Resin adsorptivity (%) | 81.4 | 92.1 | 93.8 | 83.9 |

|  | Example 151 |
|---|---|
| Acicular hematite particles washed with water after heat treatment with aqueous alkali solution |  |
| Average major axial diameter (μm) | 0.164 |
| Average minor axial diameter (μm) | 0.0240 |
| Geometric standard deviation σg (-) | 1.42 |
| Aspect ratio (-) | 6.83 |
| $S_{BET}$ (m²/g) | 39.7 |
| $S_{TEM}$ (m²/g) | 34.4 |
| $S_{BET}/S_{TEM}$ (-) | 1.15 |
| Al content (wt %) | 1.03 |
| Amount of sintering preventive (wt %) | $SiO_2$: 0.43 P: 0.30 |
| Soluble Na salt (ppm) | 25 |
| Soluble sulfate (ppm) | 4 |
| pH value of particles (-) | 8.9 |
| Resin adsorptivity (%) | 86.9 |

TABLE 29

|  | Comp. Example 98 | Comp. Example 99 | Comp. Example 100 | Comp. Example 101 | Comp. Example 102 |
|---|---|---|---|---|---|
| Kind of acicular hematite particles | Comp. Example 89 | Comp. Example 90 | Comp. Example 91 | Comp. Example 92 | Comp. Example 94 |
| Wet pulverization |  |  |  |  |  |
| Yes or No | Yes | Yes | Yes | No | No |
| Amount of residue on sieve (wt %) | 0 | 0 | 0 | 21.8 | 31.8 |
| Heat treatment with aqueous alkali solution |  |  |  |  |  |
| pH value (-) | — | 12.0 | 13.1 | 13.1 | 10.5 |
| Temperature (° C.) | — | 95 | 58 | 90 | 90 |
| Time (min.) | — | 180 | 180 | 180 | 180 |

|  | Comp. Example 103 | Comp. Example 104 | Comp. Example 105 |
|---|---|---|---|
| Kind of acicular hematite particles | Comp. Example 95 | Comp. Example 96 | Comp. Example 97 |
| Wet pulverization |  |  |  |
| Yes or No | No | Yes | Yes |
| Amount of residue on sieve (wt %) | 29.7 | 0 | 0 |
| Heat treatment with aqueous alkali solution |  |  |  |
| pH value (-) | 13.3 | 13.3 | 9.1 |
| Temperature (° C.) | 90 | 40 | 95 |
| Time (min.) | 180 | 180 | 180 |

TABLE 30

|  | Comp. Example 98 | Comp. Example 99 | Comp. Example 100 | Comp. Example 101 |
|---|---|---|---|---|
| Acicular hematite particles washed with water after heat treatment with aqueous alkali solution |  |  |  |  |
| Average major axial diameter (μm) | 0.214 | 0.211 | 0.212 | 0.213 |
| Average minor axial diameter (μm) | 0.0297 | 0.0298 | 0.0300 | 0.0300 |
| Geometric standard deviation σg (-) | 1.41 | 1.42 | 1.43 | 1.42 |
| Aspect ratio (-) | 7.21 | 7.08 | 7.07 | 7.10 |
| $S_{BET}$ (m²/g) | 43.8 | 33.9 | 36.8 | 43.2 |
| $S_{TEM}$ (m²/g) | 27.7 | 27.6 | 27.5 | 27.4 |
| $S_{BET}/S_{TEM}$ (-) | 1.58 | 1.23 | 1.34 | 1.57 |
| Al content (wt %) | 0.004 | 0.004 | 0.004 | 0.004 |
| Amount of sintering preventive (wt %) | P: 0.46 | $SiO_2$: 1.24 | $SiO_2$: 0.88 | P: 0.40 |
| Soluble Na salt (ppm) | 785 | 456 | 371 | 326 |
| Soluble sulfate (ppm) | 489 | 325 | 173 | 168 |
| pH value of particles (-) | 6.7 | 6.6 | 7.3 | 7.1 |
| Resin adsorptivity (%) | 35.7 | 44.6 | 50.7 | 37.5 |

TABLE 30-continued

|  | Comp. Example 102 | Comp. Example 103 | Comp. Example 104 | Comp. Example 105 |
|---|---|---|---|---|
| Acicular hematite particles washed with water after heat treatment with aqueous alkali solution |  |  |  |  |
| Average major axial diameter ($\mu$m) | 0.134 | 0.135 | 0.131 | 0.135 |
| Average minor axial diameter ($\mu$m) | 0.0192 | 0.0188 | 0.0190 | 0.0189 |
| Geometric standard deviation $\sigma g$ (–) | 1.37 | 1.36 | 1.35 | 1.36 |
| Aspect ratio (–) | 6.98 | 7.18 | 6.89 | 7.14 |
| $S_{BET}$ (m$^2$/g) | 50.0 | 61.1 | 50.3 | 88.1 |
| $S_{TEM}$ (m$^2$/g) | 42.9 | 43.8 | 43.4 | 43.5 |
| $S_{BET}/S_{TEM}$ (–) | 1.16 | 1.40 | 1.16 | 2.02 |
| Al content (wt %) | 0.91 | 0.91 | 0.91 | 0.91 |
| Amount of sintering preventive (wt %) | SiO$_2$: 1.41 | B: 0.18 | Ti: 0.56 | P: 0.84 |
| Soluble Na salt (ppm) | 467 | 345 | 356 | 487 |
| Soluble sulfate (ppm) | 256 | 177 | 170 | 290 |
| pH value of particles (–) | 7.0 | 7.4 | 7.3 | 6.8 |
| Resin adsorptivity (%) | 46.8 | 53.7 | 53.1 | 45.9 |

TABLE 31

|  | Example 152 | Example 153 | Example 154 | Example 155 |
|---|---|---|---|---|
| Kind of acicular hematite particles treated with aqueous alkali solution | Example 143 | Example 144 | Example 145 | Example 146 |
| Surface treatment |  |  |  |  |
| Kind | Sodium aluminate | #3 Water glass | Sodium aluminate | Colloidal silica |
| Amount added (wt %) | 3.0 | 1.5 | 1.5 | 3.0 |
| Coating material |  |  |  |  |
| Kind | Al* | Si* | Al* | Si* |
| Amount (wt %) | 2.91 | 1.45 | 1.47 | 2.89 |

|  | Example 156 | Example 157 |
|---|---|---|
| Kind of acicular hematite particles treated with aqueous alkali solution | Example 147 | Example 148 |
| Surface treatment |  |  |
| Kind | Aluminum acetate/ #3 Water glass | Sodium aluminate/ Colloidal silica |
| Amount added (wt %) Coating material | 5.0/1.0 | 1.0/5.0 |
| Kind | Al*/Si* | Al*/Si* |
| Amount (wt %) | 4.73/0.96 | 0.98/4.66 |

TABLE 31-continued

|  | Example 158 | Example 159 | Example 160 |
|---|---|---|---|
| Kind of acicular hematite particles treated with aqueous alkali solution | Example 149 | Example 150 | Example 151 |
| Surface treatment |  |  |  |
| Kind | Sodium aluminate | Aluminum acetate/ Colloidal silica | Sodium aluminate |
| Amount added (wt %) Coating material | 10.0 | 1.5/2.0 | 0.5 |
| Kind | Al* | Al*/Si* | Al* |
| Amount (wt %) | 8.99 | 1.47/1.93 | 0.49 |

Al*: aluminum hydroxide, Si*: silicon oxide

TABLE 32

|  | Example 152 | Example 153 | Example 154 | Example 155 |
|---|---|---|---|---|
| Acicular hematite particles washed with water after surface treatment |  |  |  |  |
| Average major axial diameter ($\mu$m) | 0.134 | 0.121 | 0.121 | 0.141 |
| Average minor axial diameter ($\mu$m) | 0.0192 | 0.0193 | 0.0190 | 0.0202 |
| Geometric standard deviation $\sigma g$ (–) | 1.35 | 1.36 | 1.36 | 1.44 |
| Aspect ratio (–) | 6.98 | 6.27 | 6.37 | 6.98 |
| $S_{BET}$ (m$^2$/g) | 49.3 | 54.1 | 56.1 | 46.9 |
| $S_{TEM}$ (m$^2$/g) | 42.9 | 43.0 | 43.7 | 40.8 |
| $S_{BET}/S_{TEM}$ (–) | 1.15 | 1.26 | 1.28 | 1.15 |
| Al content (wt %) | 0.91 | 2.51 | 2.53 | 1.35 |
| Amount of sintering preventive (wt %) | P: 0.33 | SiO$_2$: 1.16 | SiO$_2$: 0.90 P: 0.20 | SiO$_2$: 1.66 |
| Soluble Na salt (ppm) | 56 | 63 | 78 | 96 |
| Soluble sulfate (ppm) | 3 | 3 | 5 | 12 |
| pH value of particles (–) | 9.2 | 9.4 | 9.3 | 9.1 |
| Resin adsorptivity (%) | 85.1 | 87.0 | 90.1 | 92.5 |

|  | Example 156 | Example 157 | Example 158 | Example 159 |
|---|---|---|---|---|
| Acicular hematite particles washed with water after surface treatment |  |  |  |  |
| Average major axial diameter ($\mu$m) | 0.140 | 0.109 | 0.108 | 0.162 |
| Average minor axial diameter ($\mu$m) | 0.0204 | 0.0176 | 0.0177 | 0.0239 |
| Geometric standard deviation $\sigma g$ (–) | 1.44 | 1.31 | 1.31 | 1.42 |
| Aspect ratio (–) | 6.86 | 6.19 | 6.10 | 6.78 |
| $S_{BET}$ (m$^2$/g) | 46.0 | 58.3 | 59.7 | 39.5 |
| $S_{TEM}$ (m$^2$/g) | 40.5 | 47.2 | 47.0 | 34.6 |
| $S_{BET}/S_{TEM}$ (–) | 1.14 | 1.23 | 1.27 | 1.14 |
| Al content (wt %) | 1.31 | 4.98 | 4.93 | 1.01 |
| Amount of sintering preventive (wt %) | Ti: 3.04 | P: 0.30 | B: 0.07 | SiO$_2$: 1.25 |
| Soluble Na salt (ppm) | 54 | 91 | 89 | 32 |
| Soluble sulfate (ppm) | 4 | 5 | 2 | 8 |

TABLE 32-continued

| | | | | |
|---|---|---|---|---|
| pH value of particles (−) | 9.3 | 9.5 | 9.5 | 9.3 |
| Resin adsorptivity (%) | 86.9 | 92.0 | 94.6 | 89.0 |

| | Example 160 |
|---|---|
| Acicular hematite particles washed with water after surface treatment | |
| Average major axial diameter (μm) | 0.163 |
| Average minor axial diameter (μm) | 0.0240 |
| Geometric standard deviation σg (−) | 1.41 |
| Aspect ratio (−) | 6.79 |
| $S_{BET}$ (m²/g) | 40.1 |
| $S_{TEM}$ (m²/g) | 34.4 |
| $S_{BET}/S_{TEM}$ (−) | 1.17 |
| Al content (wt %) | 1.03 |
| Amount of sintering preventive (wt %) | $SiO_2$: 0.43 P: 0.30 |
| Soluble Na salt (ppm) | 27 |
| Soluble sulfate (ppm) | 4 |
| pH value of particles (−) | 9.1 |
| Resin adsorptivity (%) | 90.4 |

TABLE 33

| | Example 161 | Example 162 | Example 163 | Example 164 | Example 165 |
|---|---|---|---|---|---|
| Production of non-magnetic coating film composition | | | | | |
| Kind of acicular hematite particles | Example 143 | Example 144 | Example 145 | Example 146 | Example 147 |
| Weight ratio of particles and resin (−) | 5.0 | 5.0 | 5.0 | 5.0 | 5.0 |
| Non-magnetic coating film composition | | | | | |
| Viscosity (cP) | 384 | 435 | 410 | 307 | 333 |
| Non-magnetic undercoat layer | | | | | |
| Thickness (μm) | 3.4 | 3.3 | 3.4 | 3.4 | 3.2 |
| Gloss (%) | 207 | 211 | 215 | 207 | 209 |
| Ra (nm) | 6.4 | 6.0 | 6.0 | 6.4 | 6.6 |
| Young's modulus (−) (relative value) | 128 | 124 | 125 | 129 | 131 |

| | Example 166 | Example 167 | Example 168 | Example 169 | Example 170 |
|---|---|---|---|---|---|
| Production of non-magnetic coating film composition | | | | | |
| Kind of acicular hematite particles | Example 148 | Example 149 | Example 150 | Example 151 | Example 152 |
| Weight ratio of particles and resin (−) | 5.0 | 5.0 | 5.0 | 5.0 | 5.0 |
| Non-magnetic coating film composition | | | | | |
| Viscosity (cP) | 512 | 563 | 256 | 256 | 282 |
| Non-magnetic undercoat layer | | | | | |
| Thickness (μm) | 3.5 | 3.3 | 3.3 | 3.4 | 3.3 |
| Gloss (%) | 218 | 216 | 202 | 205 | 212 |
| Ra (nm) | 5.8 | 5.7 | 6.1 | 6.2 | 5.9 |
| Young's modulus (−) (relative value) | 122 | 121 | 131 | 132 | 129 |

| | Example 171 | Example 172 | Example 173 | Example 174 | Example 175 |
|---|---|---|---|---|---|
| Production of non-magnetic coating film composition | | | | | |
| Kind of acicular hematite particles | Example 153 | Example 154 | Example 155 | Example 156 | Example 157 |
| Weight ratio of particles and resin (−) | 5.0 | 5.0 | 5.0 | 5.0 | 5.0 |
| Non-magnetic coating film composition | | | | | |
| Viscosity (cP) | 333 | 307 | 205 | 230 | 486 |
| Non-magnetic undercoat layer | | | | | |
| Thickness (μm) | 3.2 | 3.3 | 3.2 | 3.2 | 3.4 |
| Gloss (%) | 218 | 223 | 217 | 218 | 225 |
| Ra (nm) | 5.6 | 5.7 | 6.0 | 6.2 | 5.5 |
| Young's modulus (−) (relative value) | 125 | 125 | 130 | 131 | 125 |

| | Example 176 | Example 177 | Example 178 |
|---|---|---|---|
| Production of non-magnetic | | | |

TABLE 33-continued coating film composition

| Kind of acicular hematite particles | Example 158 | Example 159 | Example 160 |
|---|---|---|---|
| Weight ratio of particles and resin (-) | 5.0 | 5.0 | 5.0 |

Non-magnetic coating film composition

| | | | |
|---|---|---|---|
| Viscosity (cP) | 435 | 230 | 205 |

Non-magnetic undercoat layer

| | | | |
|---|---|---|---|
| Thickness (µm) | 3.3 | 3.3 | 3.4 |
| Gloss (%) | 227 | 209 | 210 |
| Ra (nm) | 5.4 | 6.0 | 5.8 |
| Young's modulus (-) (relative value) | 124 | 133 | 133 |

TABLE 34

| | Comp. Example 106 | Comp. Example 107 | Comp. Example 108 | Comp. Example 109 | Comp. Example 110 |
|---|---|---|---|---|---|

Production of non-magnetic coating film composition

| Kind of acicular hematite particles | Starting material (V) | Comp. Example 85 | Comp. Example 86 | Comp. Example 73 | Comp. Example 87 |
|---|---|---|---|---|---|
| Weight ratio of particles and resin (-) | 5.0 | 5.0 | 5.0 | 5.0 | 5.0 |

Non-magnetic coating film composition

| | | | | | |
|---|---|---|---|---|---|
| Viscosity (cP) | 10240 | 128 | 154 | 14080 | 207 |

Non-magnetic undercoat layer

| | | | | | |
|---|---|---|---|---|---|
| Thickness (µm) | 3.7 | 3.2 | 3.3 | 3.6 | 3.3 |
| Gloss (%) | 35 | 42 | 68 | 73 | 135 |
| Ra (nm) | 118.0 | 95.4 | 65.2 | 47.2 | 37.8 |
| Young's modulus (-) (relative value) | 96 | 98 | 103 | 100 | 113 |

| | Comp. Example 111 | Comp. Example 112 | Comp. Example 113 | Comp. Example 114 | Comp. Example 115 |
|---|---|---|---|---|---|

Production of non-magnetic coating film

TABLE 34-continued composition

| Kind of acicular hematite particles | Comp. Example 88 | Comp. Example 98 | Comp. Example 99 | Comp. Example 100 | Comp. Example 101 |
|---|---|---|---|---|---|
| Weight ratio of particles and resin (-) | 5.0 | 5.0 | 5.0 | 5.0 | 5.0 |

Non-magnetic coating film composition

| | | | | | |
|---|---|---|---|---|---|
| Viscosity (cP) | 384 | 973 | 333 | 384 | 435 |

Non-magnetic undercoat layer

| | | | | | |
|---|---|---|---|---|---|
| Thickness (µm) | 3.4 | 3.3 | 3.2 | 3.3 | 3.3 |
| Gloss (%) | 146 | 172 | 175 | 171 | 154 |
| Ra (nm) | 29.0 | 17.0 | 13.0 | 14.2 | 32.6 |
| Young's modulus (-) (relative value) | 110 | 115 | 119 | 113 | 108 |

| | Comp. Example 116 | Comp. Example 117 | Comp. Example 118 | Comp. Example 119 | Comp. Example 120 |
|---|---|---|---|---|---|

Production of non-magnetic coating film composition

| Kind of acicular hematite particles | Comp. Example 93 | Comp. Example 102 | Comp. Example 103 | Comp. Example 104 | Comp. Example 105 |
|---|---|---|---|---|---|
| Weight ratio of particles and resin (-) | 5.0 | 5.0 | 5.0 | 5.0 | 5.0 |

Non-magnetic coating film composition

| | | | | | |
|---|---|---|---|---|---|
| Viscosity (cP) | 512 | 410 | 768 | 384 | 1229 |

Non-magnetic undercoat layer

| | | | | | |
|---|---|---|---|---|---|
| Thickness (µm) | 3.4 | 3.3 | 3.4 | 3.3 | 3.5 |
| Gloss (%) | 164 | 185 | 188 | 194 | 191 |
| Ra (nm) | 19.6 | 10.8 | 10.2 | 9.2 | 9.6 |
| Young's modulus (-) (relative value) | 96 | 116 | 113 | 118 | 108 |

TABLE 35

| | Kind of magnetic particles | | | |
|---|---|---|---|---|
| | magnetic iron-based | magnetic iron-based | magnetic iron-based | magnetic iron-based |

|  | alloy particles (a) | alloy particles (b) | alloy particles (c) | alloy particles (d) |
|---|---|---|---|---|
| Average major axial diameter (μm) | 0.110 | 0.098 | 0.101 | 0.125 |
| Average minor axial diameter (μm) | 0.0150 | 0.0134 | 0.0144 | 0.0184 |
| Aspect ratio (–) | 7.33 | 7.31 | 7.01 | 6.79 |
| Geometric standard deviation (–) | 1.36 | 1.35 | 1.38 | 1.35 |
| Coercive force (Oe) | 1915 | 1938 | 2065 | 1896 |
| Saturation magnetization (emu/g) | 131.6 | 130.5 | 128.9 | 130.8 |
| Content of existent Al |  |  |  |  |
| Central portion (wt %) | 2.61 | 1.32 | 1.38 | 0.01 |
| Surface layer portion (wt %) | 1.36 | 2.84 | 2.65 | 0.01 |
| Surface coating film (wt %) | 0.01 | 0.01 | 0.78 | 0.01 |
| Content of existent Nd (wt %) | 0.01 | 0.36 | 2.78 | 0.01 |
| Resin adsorptivity (%) | 72.5 | 80.1 | 83.6 | 57.6 |

TABLE 36

| | Ex. 179 | Ex. 180 | Ex. 181 | Ex. 182 | Ex. 183 |
|---|---|---|---|---|---|
| Magnetic recording medium using magnetic iron-based metal particles | | | | | |
| Kind of non-magnetic undercoat layer | Ex. 161 | Ex. 162 | Ex. 163 | Ex. 164 | Ex. 165 |
| Kind of magnetic iron-based metal particles | * | (a) | (a) | (a) | (a) |
| Weight ratio of magnetic particles and resin (–) | 5.0 | 5.0 | 5.0 | 5.0 | 5.0 |
| Thickness of magnetic layer (μm) | 1.0 | 1.1 | 1.1 | 1.2 | 1.1 |
| Coercive force (Oe) | 1978 | 1990 | 1985 | 1978 | 1983 |
| Br/Bm (–) | 0.88 | 0.88 | 0.88 | 0.88 | 0.89 |
| Gloss (%) | 232 | 236 | 236 | 228 | 230 |
| Ra (nm) | 6.2 | 6.0 | 6.0 | 6.4 | 6.4 |
| Young's modulus (–) (relative value) | 132 | 128 | 130 | 133 | 134 |
| Durability | | | | | |
| Running durability (min) | 30≦ | 29.6 | 25.8 | 28.4 | 26.5 |
| Scratch resistance | A | A | B | A | B |
| Linear absorption coefficient (μm$^{-1}$) | 1.23 | 1.24 | 1.25 | 1.28 | 1.30 |
| Corrosiveness | | | | | |
| Percentage of change in coercive force (%) | 3.6 | 4.6 | 5.3 | 5.1 | 6.2 |
| Percentage of change in Bm (%) | 4.8 | 6.9 | 5.8 | 5.9 | 7.5 |

| | Ex. 184 | Ex. 185 | Ex. 186 | Ex. 187 | Ex. 188 |
|---|---|---|---|---|---|
| Magnetic recording medium using magnetic iron-based metal particles | | | | | |

TABLE 36-continued

| | Ex. 166 | Ex. 167 | Ex. 168 | Ex. 169 | Ex. 170 |
|---|---|---|---|---|---|
| Kind of non-magnetic undercoat layer | | | | | |
| Kind of magnetic iron-based metal particles | * | * | (b) | (b) | (a) |
| Weight ratio of magnetic particles and resin (–) | 5.0 | 5.0 | 5.0 | 5.0 | 5.0 |
| Thickness of magnetic layer (μm) | 1.1 | 1.1 | 1.1 | 1.0 | 1.0 |
| Coercive force (Oe) | 1967 | 1971 | 1998 | 1989 | 1965 |
| Br/Bm (–) | 0.88 | 0.88 | 0.89 | 0.89 | 0.88 |
| Gloss (%) | 231 | 235 | 219 | 223 | 238 |
| Ra (nm) | 6.2 | 6.0 | 5.8 | 6.0 | 5.8 |
| Young's modulus (–) (relative value) | 127 | 125 | 134 | 133 | 134 |
| Durability | | | | | |
| Running durability (min) | 30≦ | 30≦ | 30≦ | 30≦ | 29.4 |
| Scratch resistance | A | A | A | A | A |
| Linear absorption coefficient (μm$^{-1}$) | 1.22 | 1.23 | 1.31 | 1.33 | 1.24 |
| Corrosiveness | | | | | |
| Percentage of change in coercive force (%) | 4.8 | 4.9 | 3.7 | 2.1 | 6.4 |
| Percentage of change in Bm (%) | 5.1 | 3.9 | 5.5 | 4.1 | 5.6 |

| | Ex. 189 | Ex. 190 | Ex. 191 | Ex. 192 | Ex. 193 |
|---|---|---|---|---|---|
| Magnetic recording medium using magnetic iron-based metal particles | | | | | |
| Kind of non-magnetic undercoat layer | Ex. 171 | Ex. 172 | Ex. 173 | Ex. 174 | Ex. 175 |
| Kind of magnetic iron-based metal particles | (b) | (b) | (c) | (c) | (c) |
| Weight ratio of magnetic particles and resin (–) | 5.0 | 5.0 | 5.0 | 5.0 | 5.0 |
| Thickness of magnetic layer (μm) | 1.0 | 1.1 | 1.1 | 1.1 | 1.1 |
| Coercive force (Oe) | 1987 | 1985 | 2135 | 2148 | 2153 |
| Br/Bm (–) | 0.88 | 0.89 | 0.89 | 0.89 | 0.90 |
| Gloss (%) | 240 | 242 | 235 | 232 | 245 |
| Ra (nm) | 5.4 | 5.2 | 5.9 | 5.9 | 5.5 |
| Young's modulus (–) (relative value) | 130 | 128 | 134 | 135 | 129 |
| Durability | | | | | |
| Running durability (min) | 30≦ | 30≦ | 30≦ | 30≦ | 30≦ |
| Scratch resistance | A | A | A | A | A |
| Linear absorption coefficient (μm$^{-1}$) | 1.25 | 1.24 | 1.28 | 1.30 | 1.23 |
| Corrosiveness | | | | | |
| Percentage of change in coercive force (%) | 4.1 | 5.3 | 2.6 | 1.8 | 2.5 |
| Percentage of change in Bm (%) | 5.7 | 4.3 | 4.0 | 3.2 | 2.7 |

| | Ex. 194 | Ex. 195 | Ex. 196 |
|---|---|---|---|
| Magnetic recording medium using magnetic iron-based metal particles | | | |
| Kind of non-magnetic undercoat layer | Ex. 176 | Ex. 177 | Ex. 178 |
| Kind of magnetic iron-based metal particles | (c) | (c) | (c) |
| Weight ratio of | 5.0 | 5.0 | 5.0 |

TABLE 36-continued

|  | | | |
|---|---|---|---|
| magnetic particles and resin (−) | | | |
| Thickness of magnetic layer (μm) | 1.1 | 1.0 | 1.0 |
| Coercive force (Oe) | 2121 | 2118 | 2147 |
| Br/Bm (−) | 0.91 | 0.90 | 0.89 |
| Gloss (%) | 241 | 228 | 226 |
| Ra (nm) | 5.9 | 6.0 | 6.2 |
| Young's modulus (−) (relative value) | 127 | 139 | 138 |
| Durability | | | |
| Running durability (min) | 30≦ | 30≦ | 30≦ |
| Scratch resistance | A | A | A |
| Linear absorption coefficient (μm⁻¹) | 1.22 | 1.34 | 1.33 |
| Corrosiveness | | | |
| Percentage of change in coercive force (%) | 2.7 | 1.6 | 2.7 |
| Percentage of change in Bm (%) | 2.5 | 1.8 | 1.4 |

(Note)
*: Particles in Example 124
(a): magnetic iron-based metal particles (a)
(b): magnetic iron-based metal particles (b)
(c): magnetic iron-based metal particles (c)

TABLE 37

|  | Comp. Ex. 121 | Comp. Ex. 122 | Comp. Ex. 123 | Comp. Ex. 124 | Comp. Ex. 125 |
|---|---|---|---|---|---|
| Magnetic recording medium using magnetic iron-based metal particles | | | | | |
| Kind of non-magnetic undercoat layer | Comp. Ex. 106 | Comp. Ex. 107 | Comp. Ex. 108 | Comp. Ex. 109 | Comp. Ex. 110 |
| Kind of magnetic iron-based metal particles | * | (a) | (a) | (a) | (a) |
| Weight ratio of magnetic particles and resin (−) | 5.0 | 5.0 | 5.0 | 5.0 | 5.0 |
| Thickness of magnetic layer (μm) | 1.3 | 1.2 | 1.2 | 1.2 | 1.2 |
| Coercive force (Oe) | 1910 | 1923 | 1934 | 1932 | 1940 |
| Br/Bm (−) | 0.79 | 0.78 | 0.79 | 0.80 | 0.83 |
| Gloss (%) | 134 | 142 | 164 | 168 | 177 |
| Ra (nm) | 73.0 | 69.7 | 41.6 | 38.9 | 26.4 |
| Young's modulus (−) (relative value) | 102 | 102 | 108 | 115 | 119 |
| Durability | | | | | |
| Running durability (min) | 0.6 | 0.6 | 0.8 | 3.7 | 6.0 |
| Scratch resistance | D | D | D | D | D |
| Linear absorption coefficient (μm⁻¹) | 0.82 | 0.97 | 1.02 | 1.04 | 1.06 |
| Corrosiveness | | | | | |
| Percentage of change in coercive force (%) | 47.5 | 36.7 | 38.0 | 32.6 | 23.1 |
| Percentage of change in Bm (%) | 35.8 | 45.1 | 38.5 | 34.6 | 31.4 |

TABLE 37-continued

|  | Comp. Ex. 126 | Comp. Ex. 127 | Comp. Ex. 128 | Comp. Ex. 129 | Comp. Ex. 130 |
|---|---|---|---|---|---|
| Magnetic recording medium using magnetic iron-based metal particles | | | | | |
| Kind of non-magnetic undercoat layer | Comp. Ex. 111 | Comp. Ex. 112 | Comp. Ex. 113 | Comp. Ex. 114 | Comp. Ex. 115 |
| Kind of magnetic iron-based metal particles | (a) | (a) | (a) | (a) | (a) |
| Weight ratio of magnetic particles and resin (−) | 5.0 | 5.0 | 5.0 | 5.0 | 5.0 |
| Thickness of magnetic layer (μm) | 1.3 | 1.1 | 1.3 | 1.1 | 1.2 |
| Coercive force (Oe) | 1947 | 1934 | 1965 | 1972 | 1943 |
| Br/Bm (−) | 0.84 | 0.85 | 0.85 | 0.85 | 0.83 |
| Gloss (%) | 179 | 193 | 197 | 192 | 169 |
| Ra (nm) | 25.0 | 16.3 | 11.2 | 12.0 | 28.6 |
| Young's modulus (−) (relative value) | 113 | 119 | 124 | 116 | 113 |
| Durability | | | | | |
| Running durability (min) | 4.6 | 10.2 | 13.5 | 9.0 | 9.3 |
| Scratch resistance | D | C | C | D | C |
| Linear absorption coefficient (μm⁻¹) | 1.08 | 1.17 | 1.18 | 1.16 | 1.15 |
| Corrosiveness | | | | | |
| Percentage of change in coercive force (%) | 34.2 | 20.1 | 14.6 | 17.4 | 18.8 |
| Percentage of change in Bm (%) | 26.8 | 28.2 | 18.7 | 18.7 | 21.5 |

|  | Comp. Ex. 131 | Comp. Ex. 132 | Comp. Ex. 133 | Comp. Ex. 134 | Comp. Ex. 135 |
|---|---|---|---|---|---|
| Magnetic recording medium using magnetic iron-based metal particles | | | | | |
| Kind of non-magnetic undercoat layer | Comp. Ex. 116 | Comp. Ex. 117 | Comp. Ex. 118 | Comp. Ex. 119 | Comp. Ex. 120 |
| Kind of magnetic iron-based metal particles | (d) | (d) | (d) | (d) | (d) |
| Weight ratio of magnetic particles and resin (−) | 5.0 | 5.0 | 5.0 | 5.0 | 5.0 |
| Thickness of magnetic layer (μm) | 1.1 | 1.0 | 1.3 | 1.3 | 1.2 |
| Coercive force (Oe) | 1896 | 1906 | 1893 | 1899 | 1913 |
| Br/Bm (−) | 0.85 | 0.85 | 0.86 | 0.86 | 0.85 |
| Gloss (%) | 180 | 196 | 206 | 213 | 215 |
| Ra (nm) | 21.7 | 10.8 | 9.6 | 8.8 | 8.2 |
| Young's modulus (−) (relative value) | 99 | 121 | 119 | 123 | 116 |
| Durability | | | | | |
| Running durability (min) | 13.5 | 16.5 | 18.3 | 19.6 | 17.4 |
| Scratch resistance | C | C | C | C | C |
| Linear absorption coefficient (μm⁻¹) | 1.11 | 1.21 | 1.23 | 1.23 | 1.24 |

TABLE 37-continued

Corrosiveness

| | | | | | |
|---|---|---|---|---|---|
| Percentage of change in coercive force (%) | 37.9 | 21.8 | 18.6 | 14.8 | 18.0 |
| Percentage of change in Bm (%) | 32.8 | 28.0 | 27.9 | 21.8 | 16.9 |

(Note)
*: Particles in Examples 124
(a): magnetic iron-based metal particles (a)
(d): magnetic iron-based metal particles (d)

What is claimed is:

1. Acicular hematite particles containing 0.05 to 50% by weight of aluminum, calculated as Al, approximately uniformly within the particle; having an average major axial diameter of not more than 0.3 μm and a pH value of the particles of not less than 8, and containing not more than 300 ppm soluble sodium salts, calculated as Na, and not more than 150 ppm soluble sulfates, calculated as $SO_4$.

2. Acicular hematite particles according to claim 1, which further have an average minor axial diameter of 0.0025 to 0.15 μm, an aspect ratio of not less than 2:1, a BET specific surface area ($S_{BET}$) of not less than 35 m²/g, a geometrical standard deviation of not more than 1.50, a resin adsorptivity of not less than 65%, and an $S_{BET}/S_{TEM}$ value of 0.5 to 2.5, wherein said $S_{TEM}$ is a value calculated from the major axial diameter and the minor axial diameter of said particles which were measured from said particles in an electron micrograph.

3. Acicular hematite particles according to claim 1, which contain aluminum of 0.5 to 50% by weight, calculated as Al within the particles, have an average major axial diameter of 0.005 to 0.3 μm and a pH value of the particles of 8.5 to 12, and contain soluble sodium salts of 0.01 to 250 ppm soluble sodium, calculated as Na and soluble sulfates of 0.01 to 70 ppm soluble sulfate, calculated as $SO_4$.

4. Acicular hematite particles according to claim 1, which further have an average minor axial diameter of 0.01 to 0.10 μm, an aspect ratio of 3:1 to 20:1, a BET specific surface area of 40 to 150 m²/g, a geometrical standard deviation of 1.01 to 1.40, a resin adsorptivity of not less than 70%, and an $S_{BET}/S_{TEM}$ value of 0.7 to 2.0.

5. Acicular hematite particles according to claim 1, which further have a coating comprising at least one selected from the group consisting of a hydroxide of aluminum, an oxide of aluminum, a hydroxide of silicon and an oxide of silicon, which is coated on the surfaces of said acicular hematite particles.

6. Acicular hematite particles according to claim 5, wherein the amount of coating material is 0.01 to 50 wt % calculated as either of Al and $SiO_2$ based on the total weight of particles.

* * * * *